(12) United States Patent
Zaloom

(10) Patent No.: US 6,366,889 B1
(45) Date of Patent: Apr. 2, 2002

(54) OPTIMIZING OPERATIONAL EFFICIENCY AND REDUCING COSTS OF MAJOR ENERGY SYSTEM AT LARGE FACILITIES

(76) Inventor: Joseph A. Zaloom, 5597 Seminary Rd., #1402S, Falls Church, VA (US) 22041

(*) Notice: Subject to any disclaimer, the term of this patent is extended or adjusted under 35 U.S.C. 154(b) by 0 days.

(21) Appl. No.: 09/313,666

(22) Filed: May 18, 1999

Related U.S. Application Data

(60) Provisional application No. 60/085,903, filed on May 18, 1998.

(51) Int. Cl.[7] .............................................. G06F 17/60
(52) U.S. Cl. ............................ 705/7; 705/11; 705/400; 705/412
(58) Field of Search ................................ 700/286, 291; 702/57, 61; 705/7, 11, 400, 412

(56) References Cited

U.S. PATENT DOCUMENTS

| | | | | |
|---|---|---|---|---|
| 4,021,615 A | | 5/1977 | James et al. ................. | 179/2 A |
| 5,061,916 A | * | 10/1991 | French et al. ................ | 340/522 |
| 5,216,623 A | | 6/1993 | Barrett et al. ................ | 364/550 |
| 5,404,136 A | | 4/1995 | Marsden ................ | 340/870.03 |
| 5,432,710 A | * | 7/1995 | Ishimaru et al. ............ | 705/412 |
| 5,479,358 A | * | 12/1995 | Shimoda et al. ............ | 700/291 |
| 5,566,084 A | | 10/1996 | Cmar ......................... | 364/492 |
| 5,730,356 A | * | 3/1998 | Mongan ..................... | 237/19 |
| 5,924,486 A | * | 7/1999 | Ehlers et al. ................ | 165/238 |
| 6,078,785 A | * | 6/2000 | Bush ............................ | 455/7 |
| 6,216,956 B1 | * | 4/2001 | Ehlers et al. ................. | 236/47 |

FOREIGN PATENT DOCUMENTS

WO  WO 99/28843  *  6/1999

OTHER PUBLICATIONS

"Industrial: Planergy Wins Sematech Contract"; Energy Conservation News, Dec. 1, 1996, vol. 19, No. 5.*
"Unicom Launches eQuator(SM)"; PR Newswire, Aug. 9, 1999, p. 8396.*

* cited by examiner

Primary Examiner—Edward R. Cosimano
(74) Attorney, Agent, or Firm—Nixon Peabody LLP; Charles M. Leedom, Jr.

(57) ABSTRACT

A computer implemented system and method for assisting in the visual analysis of the operational efficiency of major energy consuming systems at large facilities and particularly the consumption of electricity at commercial, governmental, or industrial facilities. The system and method allows for visually analyzing current and historic patterns of energy consumption in a facility (such as electricity, gas, steam, water or other energy) to determine the presence of possible operating errors, equipment problems, or hard-to-detect billing errors. An important step of the method is creating documented patterns representing unusual circumstances which could represent inefficient operation of the facility, for which solutions are known based on analysis of energy consumption by several large facilities over long periods, to allow identification of the nature of similarly inefficient facility operation as shown in the graphs produced by the disclosed method and to allow identification of possible solutions.

37 Claims, 46 Drawing Sheets

SAMPLE LARGE ELECTRIC ACCOUNT
BUILDING PARAMETERS

| | |
|---|---|
| FACILITY NAME: | Sample Large Electric Account |
| FACILITY ADDRESS: | Sample Address |
| USUAL OPERATING HOURS: | 8:00 am - 6:00 pm ← [2] |
| FUNCTION: | Office Building ← [6] |
| ACCOUNT NUMBER: | Sample Acct. No. |
| GROSS SQUARE FEET: | 1,432,000 ← [4] |
| ELECTRIC SPACE HEATING: | NO |
| UTILITY: | PEPCO |
| RATE: | GT-3A |
| TAXABLE? | NO |
| SPECIAL REMARKS: | |

| SAMPLE LARGE ELECTRIC ACCOUNT |||||||||||||
|---|---|---|---|---|---|---|---|---|---|---|---|---|
| ELECTRICITY CONSUMPTION & COST BREAKDOWN (FY 1997 - FY 1999) |||||||||||||
| ADDRESS: Sample Address | | | | RATE: GT-3A | | | | ACCOUNT NUMBER: | | | Sample Acct. No. | |
| 1996-1997 | OCT | NOV | DEC | JAN | FEB | MAR | APR | MAY | JUN | JUL | AUG | SEP |
| Mtr Reading Date | Oct-16 | Nov-14 | Dec-16 | Jan-16 | Feb-14 | Mar-19 | Apr-18 | May-20 | Jun-20 | Jul-22 | Aug-21 | Sep-18 |
| Number of Days | 30 | 29 | 32 | 31 | 29 | 33 | 30 | 32 | 31 | 32 | 30 | 28 |
| On-Peak kWh | 772,800 | 692,900 | 627,600 | 568,100 | 588,600 | 631,400 | 659,300 | 736,400 | 757,800 | 779,700 | 779,900 | 649,100 |
| Intermediate kWh | 570,700 | 526,700 | 493,700 | 466,200 | 470,200 | 486,300 | 511,200 | 551,306 | 612,900 | 678,500 | 624,800 | 559,800 |
| Off-Peak kWh | 722,200 | 664,600 | 719,200 | 668,300 | 673,400 | 730,300 | 617,000 | 744,600 | 937,400 | 1,206,600 | 1,079,000 | 964,600 |
| Total kWh | | | | | | | | | | | | |
| On-Peak kW | 5,441 | | | | | | | | 5,062 | 5,062 | 5,151 | 5,162 |
| Maximum kW | 8,455 | 5,672 | 4,459 | 4,260 | 4,363 | 4,971 | 4,993 | 5,117 | 5,052 | 5,760 | 5,155 | 5,162 |
| Fuel Adjustment | | | | | | | | | | | | |
| Env. Cost Recovery | 0.00161 | 0.00161 | 0.00163 | 0.00165 | 0.00165 | 0.00165 | 0.00165 | 0.00165 | 0.00164 | 0.00164 | 0.00164 | 0.00164 |
| DC Sr. Rec. Surch. | 0.00000 | 0.00000 | 0.00000 | 0.00000 | 0.00000 | 0.00000 | 0.00000 | 0.00000 | 0.00000 | 0.00000 | 0.00000 | 0.00000 |
| On-Peak kWh | $41,137 | $26,536 | $26,525 | $24,049 | $24,915 | $26,728 | $27,905 | $30,605 | $40,332 | $41,504 | $41,514 | $34,556 |
| Intermediate kWh | $23,473 | $22,274 | $20,676 | $19,880 | $19,685 | $20,989 | $23,619 | $23,210 | $26,871 | $27,534 | $27,789 | $22,654 |
| Off-Peak kWh | $19,761 | $23,695 | $21,749 | $20,209 | $20,364 | $21,782 | $19,668 | $22,517 | $25,675 | $33,104 | $29,584 | $26,968 |
| kW Transmission | $68,285 | | | | | | | | $63,403 | $71,435 | $64,645 | $64,783 |
| kW Distribution | $55,914 | $58,686 | $45,705 | $43,685 | $44,721 | $50,953 | $53,166 | $52,449 | $51,783 | $58,425 | $52,639 | $52,911 |
| Cost Recovery | | | | | | | | | | | | |
| Rider GT-3 Discount | -$18,906 | -$16,513 | -$9,661 | -$8,867 | -$9,046 | -$9,906 | -$9,810 | -$10,589 | -$16,825 | -$18,952 | -$17,651 | -$16,464 |
| Fuel Adjustment | | | | | | | | | | | | |
| Curtailment Credit | | | | | | | | | | | | |
| Env. Rec. Surch. | | | | | | | | | | | | |
| Sales Tax | | | | | | | | | | | | |
| Computed Bill | $198,346 | $115,040 | $161,247 | $93,442 | $95,729 | $109,696 | $107,890 | $118,485 | $193,382 | $237,565 | $203,752 | $190,382 |
| Actual Bill | | | | | | | | | | | | |
| Discrepancy | $0 | $0 | -$16 | $0 | $0 | $7 | -$16 | $0 | -$50 | $0 | $0 | -$2 |
| % Disc. | | | | | | | | | | | | |
| Large Comp. Error | | | | | | | | | | | | |
| Split Combined Bill | | | | | | | | | | | | |
| Rate/Surch. Change | | | x | | | | x | | x | | | |
| Proration Discrep. | | | x | | | | x | | x | | | |

| DAY NUM | OCT 98 | NOV 98 | DEC 98 | JAN 99 | FEB 99 | MAR 99 | APR 99 | MAY 99 | JUN 99 | JUL 99 | AUG 99 | SEP 99 |
|---|---|---|---|---|---|---|---|---|---|---|---|---|
| 1 | 4,978 | 1,543 | | | | | | | | | | |
| 2 | 4,464 | 4,524 | | | | | | | | | | |
| 3 | 1,538 | 3,991 | | | | | | | | | | |
| 4 | 1,545 | 3,988 | | | | | | | | | | |
| 5 | 4,581 | 4,029 | | | | | | | | | | |
| 6 | 4,644 | 3,946 | | | | | | | | | | |
| 7 | 4,632 | 1,543 | | | | | | | | | | |
| 8 | 5,004 | 1,466 | | | | | | | | | | |
| 9 | 4,716 | 3,981 | | | | | | | | | | |
| 10 | 1,598 | 4,046 | | | | | | | | | | |
| 11 | 1,461 | 1,828 | | | | | | | | | | |
| 12 | 1,754 | 4,032 | | | | | | | | | | |
| 13 | 4,862 | 3,950 | | | | | | | | | | |
| 14 | 4,903 | 1,526 | | | | | | | | | | |
| 15 | 4,726 | 1,435 | | | | | | | | | | |
| 16 | 4,848 | 4,024 | | | | | | | | | | |
| 17 | 1,730 | 3,857 | | | | | | | | | | |
| 18 | 1,468 | | | | | | | | | | | |
| 19 | 4,889 | | | | | | | | | | | |
| 20 | 4,881 | | | | | | | | | | | |
| 21 | 4,442 | | | | | | | | | | | |
| 22 | 4,490 | | | | | | | | | | | |
| 23 | 4,384 | | | | | | | | | | | |
| 24 | 1,924 | | | | | | | | | | | |
| 25 | 1,507 | | | | | | | | | | | |
| 26 | 4,718 | | | | | | | | | | | |
| 27 | 4,428 | | | | | | | | | | | |
| 28 | 4,593 | | | | | | | | | | | |
| 29 | 4,600 | | | | | | | | | | | |
| 30 | 4,447 | | | | | | | | | | | |
| 31 | 1,532 | | | | | | | | | | | |
| MIN | 1,461 | 1,435 | 0 | 0 | 0 | 0 | 0 | 0 | 0 | 0 | 0 | 0 |
| MAX | 5,004 | 4,524 | 0 | 0 | 0 | 0 | 0 | 0 | 0 | 0 | 0 | 0 |

SAMPLE LARGE ELECTRIC ACCOUNT
DAILY ELECTRIC PEAK DEMAND (kW) RECORDS
FY 1999

SAMPLE LARGE ELECTRIC ACCOUNT
DAILY ELECTRIC ENERGY CONSUMPTION (kWh) RECORDS

FY 1999

Sample Acct. No.

| DAY NUM | OCT 98 | NOV 98 | DEC 98 | JAN 99 | FEB 99 | MAR 99 | APR 99 | MAY 99 | JUN 99 | JUL 99 | AUG 99 | SEP 99 |
|---|---|---|---|---|---|---|---|---|---|---|---|---|
| 1 | 89,791 | 35,316 | | | | | | | | | | |
| 2 | 73,124 | 74,258 | | | | | | | | | | |
| 3 | 35,723 | 65,593 | | | | | | | | | | |
| 4 | 35,813 | 67,876 | | | | | | | | | | |
| 5 | 79,943 | 66,620 | | | | | | | | | | |
| 6 | 77,575 | 64,339 | | | | | | | | | | |
| 7 | 81,095 | 34,958 | | | | | | | | | | |
| 8 | 83,885 | 32,491 | | | | | | | | | | |
| 9 | 75,488 | 65,729 | | | | | | | | | | |
| 10 | 35,288 | 67,024 | | | | | | | | | | |
| 11 | 33,805 | 38,210 | | | | | | | | | | |
| 12 | 37,783 | 68,462 | | | | | | | | | | |
| 13 | 82,596 | 65,148 | | | | | | | | | | |
| 14 | 79,238 | 33,226 | | | | | | | | | | |
| 15 | 77,892 | 32,112 | | | | | | | | | | |
| 16 | 74,215 | 68,270 | | | | | | | | | | |
| 17 | 37,966 | 21,456 | | | | | | | | | | |
| 18 | 33,172 | | | | | | | | | | | |
| 19 | 79,801 | | | | | | | | | | | |
| 20 | 74,988 | | | | | | | | | | | |
| 21 | 75,773 | | | | | | | | | | | |
| 22 | 69,261 | | | | | | | | | | | |
| 23 | 66,812 | | | | | | | | | | | |
| 24 | 36,270 | | | | | | | | | | | |
| 25 | 33,274 | | | | | | | | | | | |
| 26 | 73,804 | | | | | | | | | | | |
| 27 | 71,029 | | | | | | | | | | | |
| 28 | 77,041 | | | | | | | | | | | |
| 29 | 79,436 | | | | | | | | | | | |
| 30 | 72,728 | | | | | | | | | | | |
| 31 | 38,196 | | | | | | | | | | | |
| MIN | 33,172 | 21,456 | 0 | 0 | 0 | 0 | 0 | 0 | 0 | 0 | 0 | 0 |
| MAX | 89,791 | 74,258 | 0 | 0 | 0 | 0 | 0 | 0 | 0 | 0 | 0 | 0 |

Fig. 4c

SAMPLE LARGE ELECTRIC ACCOUNT
DAILY TIME OF THE PEAK DAY DEMAND RECORDS
FY 1997

| DAY NUM | OCT 96 | NOV 96 | DEC 96 | JAN 97 | FEB 97 | MAR 97 | APR 97 | MAY 97 | JUN 97 | JUL 97 | AUG 97 | SEP 97 |
|---|---|---|---|---|---|---|---|---|---|---|---|---|
| 1 | 12.00 | 12.75 | 12.50 | 0.25 | 0.25 | 0.25 | 12.25 | 13.25 | 13.50 | 11.00 | 10.50 | 16.50 |
| 2 | 11.25 | 0.50 | 13.00 | 11.75 | 16.00 | 15.50 | 11.50 | 13.50 | 12.75 | 12.50 | 0.25 | 13.50 |
| 3 | 12.25 | 7.00 | 13.50 | 12.50 | 12.50 | 11.75 | 13.00 | 0.25 | 12.00 | 13.50 | 16.50 | 10.00 |
| 4 | 10.75 | 12.50 | 13.50 | 0.50 | 10.50 | 14.50 | 13.75 | 16.25 | 12.00 | 17.50 | 15.75 | 15.25 |
| 5 | 12.50 | 12.25 | 14.25 | 14.25 | 16.25 | 12.00 | 0.25 | 13.25 | 14.75 | 0.25 | 10.75 | 12.25 |
| 6 | 18.50 | 14.75 | 11.50 | 12.75 | 12.25 | 11.75 | 18.00 | 12.25 | 10.25 | 17.50 | 18.00 | 13.75 |
| 7 | 10.75 | 15.25 | 16.50 | 10.25 | 10.50 | 11.00 | 13.25 | 12.75 | 13.25 | 15.25 | 12.75 | 19.50 |
| 8 | 13.25 | 14.00 | 14.25 | 11.75 | 0.25 | 0.25 | 12.50 | 12.75 | 15.50 | 12.25 | 12.25 | 15.00 |
| 9 | 12.50 | 0.25 | 10.75 | 11.50 | 18.00 | 15.75 | 11.75 | 12.50 | 13.50 | 12.75 | 14.25 | 13.50 |
| 10 | 12.50 | 12.50 | 13.00 | 12.00 | 12.50 | 13.00 | 11.50 | 0.25 | 14.50 | 10.00 | 13.25 | 14.75 |
| 11 | 12.50 | 14.25 | 12.50 | 14.25 | 11.75 | 15.00 | 9.25 | 14.25 | 14.75 | 11.50 | 10.75 | 14.75 |
| 12 | 0.25 | 12.25 | 13.25 | 14.25 | 12.25 | 12.50 | 0.25 | 15.25 | 13.25 | 0.25 | 12.75 | 12.25 |
| 13 | 14.75 | 12.50 | 10.50 | 13.00 | 10.50 | 11.50 | 15.75 | 13.25 | 13.25 | 13.75 | 11.75 | 15.25 |
| 14 | 14.75 | 15.25 | 0.25 | 13.00 | 12.25 | 11.00 | 14.00 | 12.75 | 14.50 | 15.00 | 10.25 | 14.25 |
| 15 | 12.75 | 12.25 | 15.25 | 11.50 | 0.25 | 12.50 | 12.25 | 13.00 | 16.00 | 14.75 | 10.75 | 13.25 |
| 16 | 13.50 | 0.25 | 12.25 | 12.25 | 13.75 | 13.50 | 12.50 | 11.25 | 15.75 | 13.50 | 14.75 | 12.75 |
| 17 | 11.50 | 15.75 | 12.50 | 12.25 | 13.75 | 10.00 | 14.50 | 11.50 | 15.75 | 15.25 | 2.00 | 15.00 |
| 18 | 12.50 | 12.50 | 12.25 | 12.75 | 12.25 | 13.50 | 12.00 | 24.00 | 14.75 | 14.75 | 10.50 | 12.75 |
| 19 | 16.25 | 12.00 | 10.50 | 15.00 | 11.75 | 10.25 | 12.75 | 14.75 | 13.50 | 0.25 | 15.25 | 14.00 |
| 20 | 15.75 | 12.50 | 12.00 | 15.00 | 10.50 | 14.00 | 11.25 | 10.25 | 16.25 | 24.00 | 15.25 | 16.50 |
| 21 | 12.25 | 12.50 | 0.25 | 13.25 | 10.50 | 12.00 | 10.25 | 15.00 | 0.25 | 15.50 | 11.75 | 16.50 |
| 22 | 14.75 | 12.75 | 7.50 | 12.00 | 13.25 | 3.25 | 12.00 | 12.00 | 17.00 | 15.25 | 14.00 | 12.25 |
| 23 | 14.00 | 11.25 | 11.25 | 12.75 | 24.00 | 13.75 | 13.75 | 10.25 | 13.00 | 9.75 | 14.75 | 15.00 |
| 24 | 14.75 | 14.25 | 11.00 | 12.25 | 12.00 | 11.50 | 13.25 | 1.75 | 11.50 | 12.25 | 16.50 | 12.00 |
| 25 | 11.00 | 13.25 | 0.25 | 13.75 | 11.50 | 14.25 | 11.75 | 12.50 | 13.25 | 13.25 | 14.50 | 15.00 |
| 26 | 15.25 | 12.25 | 13.00 | 14.50 | 12.25 | 12.25 | 15.25 | 13.50 | 12.25 | 17.00 | 14.50 | 14.50 |
| 27 | 11.75 | 12.25 | 12.75 | 12.75 | 13.25 | 11.75 | 14.50 | 11.25 | 12.50 | 13.50 | 16.25 | 0.25 |
| 28 | 13.50 | 5.50 | 0.25 | 15.25 | 13.50 | 10.00 | 11.25 | 15.75 | 0.25 | 14.50 | 14.00 | 15.25 |
| 29 | 12.75 | 12.25 | 15.75 | 10.25 | | 9.25 | 10.50 | 15.00 | 15.75 | 13.00 | 12.25 | 15.50 |
| 30 | 15.00 | 12.00 | 12.75 | 13.25 | | 12.75 | 15.00 | 15.00 | 12.50 | 17.00 | 17.00 | 14.25 |
| 31 | 12.50 | | 12.25 | 10.50 | | 13.75 | | 16.75 | | 15.50 | 14.00 | |
| MIN | 0.25 | 0.25 | 0.25 | 0.25 | 0.25 | 0.25 | 0.25 | 0.25 | 0.25 | 0.25 | 0.25 | 0.25 |
| MAX | 18.50 | 15.75 | 16.50 | 15.25 | 24.00 | 15.75 | 18.25 | 24.00 | 17.00 | 24.00 | 18.25 | 19.50 |

Fig. 5a

SAMPLE LARGE ELECTRIC ACCOUNT
DAILY TIME OF THE PEAK DAY DEMAND RECORDS
FY 1998

Sample Acct. No.

| DAY NUM | OCT 97 | NOV 97 | DEC 97 | JAN 98 | FEB 98 | MAR 98 | APR 98 | MAY 98 | JUN 98 | JUL 98 | AUG 98 | SEP 98 |
|---|---|---|---|---|---|---|---|---|---|---|---|---|
| 1 | 11.75 | 14.75 | 12.25 | 8.25 | 13.75 | 15.75 | 11.25 | 10.25 | 12.25 | 12.50 | 0.25 | 12.00 |
| 2 | 12.00 | 15.00 | 11.75 | 11.25 | 11.50 | 11.25 | 11.75 | 0.25 | 9.50 | 13.25 | 14.50 | 12.50 |
| 3 | 12.50 | 10.25 | 10.25 | 0.25 | 12.25 | 12.25 | 13.00 | 23.25 | 12.50 | 12.00 | 15.25 | 12.25 |
| 4 | 14.75 | 12.50 | 10.75 | 17.50 | 12.75 | 12.25 | 0.25 | 15.25 | 14.50 | 13.00 | 11.00 | 13.50 |
| 5 | 15.75 | 10.00 | 10.75 | 12.50 | 15.25 | 10.75 | 20.25 | 11.25 | 12.00 | 13.50 | 13.75 | 0.25 |
| 6 | 14.50 | 10.75 | 12.25 | 11.25 | 10.50 | 10.50 | 12.75 | 15.25 | 13.50 | 15.25 | 12.75 | 15.00 |
| 7 | 13.50 | 12.50 | 13.75 | 10.25 | 13.50 | 14.75 | 10.25 | 15.25 | 1.00 | 15.25 | 12.00 | 11.50 |
| 8 | 10.00 | 11.50 | 11.75 | 15.00 | 18.25 | 16.00 | 16.00 | 12.50 | 13.50 | 15.25 | 0.25 | 10.00 |
| 9 | 15.25 | 15.50 | 12.25 | 10.75 | 12.25 | 13.75 | 12.00 | 13.00 | 14.50 | 15.00 | 15.00 | 13.75 |
| 10 | 14.50 | 12.00 | 15.25 | 0.25 | 11.00 | 12.50 | 11.50 | 20.50 | 12.00 | 13.25 | 15.50 | 15.00 |
| 11 | 0.25 | 12.50 | 14.25 | 15.75 | 11.75 | 12.25 | 13.00 | 10.50 | 15.75 | 0.25 | 15.00 | 15.25 |
| 12 | 16.25 | 10.50 | 11.50 | 12.25 | 12.00 | 12.25 | 1.75 | 12.75 | 4.50 | 16.00 | 13.75 | 14.00 |
| 13 | 14.75 | 10.75 | 14.50 | 12.25 | 12.00 | 10.75 | 15.25 | 9.75 | 15.25 | 15.00 | 9.00 | |
| 14 | 15.50 | 12.00 | 14.25 | 12.50 | 0.25 | 0.25 | 12.50 | 14.75 | 3.25 | 15.25 | 13.25 | 15.00 |
| 15 | 15.25 | 0.25 | 12.00 | 14.25 | 12.50 | 19.00 | 15.50 | 14.00 | 15.00 | 16.50 | 13.75 | 15.50 |
| 16 | 14.25 | 15.75 | 11.00 | 11.00 | 13.50 | 12.75 | 14.75 | 0.25 | 12.25 | 12.75 | 2.50 | 12.25 |
| 17 | 11.25 | 10.00 | 11.00 | 0.25 | 15.25 | 11.00 | 15.25 | 0.25 | 15.25 | 16.50 | 14.50 | 14.25 |
| 18 | 13.50 | 10.50 | 11.50 | 15.75 | 11.75 | 12.25 | 0.25 | 15.25 | 17.75 | 0.25 | 14.50 | 10.50 |
| 19 | 14.25 | 10.75 | 11.00 | 15.00 | 12.00 | 11.75 | 14.50 | 14.00 | 17.75 | 21.25 | 15.00 | 0.25 |
| 20 | 11.50 | 10.50 | 12.25 | 12.75 | 15.00 | 11.00 | 15.25 | 12.50 | 12.75 | 12.25 | 15.50 | 9.25 |
| 21 | 15.00 | 10.75 | 0.25 | 11.50 | 12.00 | 0.25 | 10.75 | 13.25 | 18.25 | 15.25 | 15.25 | 12.75 |
| 22 | 12.25 | 12.00 | 11.25 | 12.25 | 18.50 | 15.25 | 11.00 | 11.50 | 14.25 | 12.00 | 13.50 | 14.00 |
| 23 | 12.25 | 17.00 | 12.25 | 12.25 | 12.25 | 14.25 | 15.00 | 0.25 | 15.00 | 11.50 | 23.75 | 12.50 |
| 24 | 10.75 | 10.75 | 11.25 | 13.00 | 14.75 | 9.75 | 10.75 | 15.75 | 12.00 | 14.50 | 1.00 | 15.25 |
| 25 | 13.75 | 11.50 | 7.25 | 13.25 | 12.25 | 10.75 | 0.25 | 20.25 | 13.25 | 0.25 | 12.00 | 13.50 |
| 26 | 16.00 | 11.00 | 13.75 | 16.50 | 12.25 | 8.50 | 24.00 | 12.75 | 14.25 | 2.50 | 12.75 | 0.25 |
| 27 | 12.50 | 7.25 | 0.25 | | 12.50 | 14.25 | 12.50 | 10.75 | 0.25 | 12.00 | 16.25 | 15.00 |
| 28 | 14.50 | 12.00 | 17.50 | 11.50 | 14.75 | 0.50 | 11.25 | 14.75 | 1.50 | 14.75 | 12.50 | 12.50 |
| 29 | 11.75 | 0.25 | 13.00 | 15.00 | | 12.50 | 13.50 | 12.25 | 15.25 | 11.00 | 0.25 | 15.50 |
| 30 | 14.75 | 15.50 | 11.75 | 12.50 | | 14.75 | 13.50 | 13.50 | 11.25 | 14.50 | 21.00 | 14.75 |
| 31 | 12.25 | | 11.75 | 14.75 | | 13.25 | | 4.75 | | 14.25 | 13.25 | |
| MIN | 0.25 | 0.25 | 0.25 | 0.25 | 0.25 | 0.25 | 0.25 | 0.25 | 0.25 | 0.25 | 0.25 | 0.25 |
| MAX | 16.25 | 17.00 | 17.50 | 17.50 | 18.50 | 19.00 | 24.00 | 23.25 | 17.75 | 21.25 | 23.75 | 15.50 |

Fig. 5b

SAMPLE LARGE ELECTRIC ACCOUNT
DAILY TIME OF THE PEAK DAY DEMAND RECORDS
FY 1999

Sample Acct No.

| DAY NUM | OCT 98 | NOV 98 | DEC 98 | JAN 99 | FEB 99 | MAR 99 | APR 99 | MAY 99 | JUN 99 | JUL 99 | AUG 99 | SEP 99 |
|---|---|---|---|---|---|---|---|---|---|---|---|---|
| 1 | 10.50 | 17.75 | | | | | | | | | | |
| 2 | 14.75 | 11.25 | | | | | | | | | | |
| 3 | 11.50 | 11.25 | | | | | | | | | | |
| 4 | 19.50 | 13.25 | | | | | | | | | | |
| 5 | 13.25 | 11.75 | | | | | | | | | | |
| 6 | 14.25 | 10.50 | | | | | | | | | | |
| 7 | 15.00 | 13.25 | | | | | | | | | | |
| 8 | 10.00 | 17.50 | | | | | | | | | | |
| 9 | 13.25 | 12.75 | | | | | | | | | | |
| 10 | 13.75 | 10.75 | | | | | | | | | | |
| 11 | 13.00 | 23.75 | | | | | | | | | | |
| 12 | 14.50 | 11.00 | | | | | | | | | | |
| 13 | 14.50 | 10.50 | | | | | | | | | | |
| 14 | 15.50 | 12.00 | | | | | | | | | | |
| 15 | 11.50 | 17.50 | | | | | | | | | | |
| 16 | 8.75 | 15.25 | | | | | | | | | | |
| 17 | 14.75 | 9.50 | | | | | | | | | | |
| 18 | 15.00 | | | | | | | | | | | |
| 19 | 13.00 | | | | | | | | | | | |
| 20 | 14.25 | | | | | | | | | | | |
| 21 | 15.00 | | | | | | | | | | | |
| 22 | 14.50 | | | | | | | | | | | |
| 23 | 14.25 | | | | | | | | | | | |
| 24 | 10.75 | | | | | | | | | | | |
| 25 | 23.75 | | | | | | | | | | | |
| 26 | 14.25 | | | | | | | | | | | |
| 27 | 13.50 | | | | | | | | | | | |
| 28 | 15.50 | | | | | | | | | | | |
| 29 | 15.50 | | | | | | | | | | | |
| 30 | 11.00 | | | | | | | | | | | |
| 31 | 0.25 | | | | | | | | | | | |
| MIN | 0.25 | 9.50 | | | | | | | | | | |
| MAX | 23.75 | 23.75 | | | | | | | | | | |

Fig. 5c

SAMPLE LARGE ELECTRIC ACCOUNT
BILLING PEAK DAY (kW) RECORDS

[18]

Sample Acct. No.

| FY 1997 | OCT 96 T 10/1 | NOV 96 R 10/17 | DEC 96 R 11/14 | JAN 97 W 12/18 | FEB 97 R 1/30 | MAR 97 T 3/18 | APR 97 F 4/4 | MAY 97 M 5/19 | JUN 97 W 6/18 | JUL 97 T 6/24 | AUG 97 W 8/13 | SEP 97 R 9/25 |
|---|---|---|---|---|---|---|---|---|---|---|---|---|
| 12:00 AM | 1,639 | 1,636 | 1,795 | 1,586 | 1,639 | 1,576 | 1,564 | 2,282 | 2,841 | 3,064 | 3,151 | 3,150 |
| 12:15 AM | 1,615 | 1,629 | 1,792 | 1,579 | 1,673 | 1,516 | 1,572 | 2,834 | 2,844 | 3,076 | 3,148 | 3,146 |
| 12:30 AM | 1,564 | 1,624 | 1,800 | 1,576 | 1,658 | 1,478 | 1,576 | 3,057 | 2,860 | 3,091 | 3,088 | 3,141 |
| 12:45 AM | 1,526 | 1,612 | 1,797 | 1,572 | 2,157 | 1,471 | 1,567 | 3,220 | 2,856 | 3,106 | 3,016 | 3,115 |
| 1:00 AM | 1,480 | 1,581 | 1,788 | 1,569 | 2,126 | 1,456 | 1,552 | 3,088 | 2,853 | 3,110 | 2,986 | 3,105 |
| 1:15 AM | 1,449 | 1,560 | 1,783 | 1,569 | 2,119 | 1,459 | 1,560 | 2,940 | 2,856 | 3,100 | 2,947 | 3,096 |
| 1:30 AM | 1,442 | 1,550 | 1,790 | 1,564 | 2,114 | 1,464 | 1,562 | 2,906 | 2,865 | 3,100 | 2,925 | 3,081 |
| 1:45 AM | 1,440 | 1,538 | 1,788 | 1,552 | 2,119 | 1,452 | 1,552 | 2,894 | 2,889 | 3,110 | 2,941 | 3,084 |
| 2:00 AM | 1,430 | 1,536 | 1,773 | 1,562 | 2,128 | 1,444 | 1,550 | 2,892 | 2,954 | 3,098 | 2,837 | 3,081 |
| 2:15 AM | 1,425 | 1,538 | 1,765 | 1,540 | 2,126 | 1,440 | 1,562 | 2,889 | 3,004 | 3,088 | 2,916 | 3,079 |
| 2:30 AM | 1,425 | 1,531 | 1,783 | 1,504 | 2,126 | 1,442 | 1,567 | 2,892 | 3,007 | 3,076 | 2,923 | 3,074 |
| 2:45 AM | 1,423 | 1,526 | 1,788 | 1,468 | 2,121 | 1,442 | 1,564 | 2,884 | 2,988 | 3,081 | 2,932 | 3,064 |
| 3:00 AM | 1,437 | 1,526 | 1,778 | 1,442 | 2,128 | 1,442 | 1,560 | 2,875 | 2,968 | 3,096 | 2,930 | 3,084 |
| 3:15 AM | 1,461 | 1,548 | 1,766 | 1,425 | 2,133 | 1,437 | 1,555 | 2,877 | 2,985 | 3,117 | 2,832 | 3,088 |
| 3:30 AM | 1,471 | 1,740 | 1,761 | 1,416 | 2,124 | 1,435 | 1,564 | 2,870 | 2,992 | 3,127 | 2,956 | 3,127 |
| 3:45 AM | 1,489 | 2,311 | 2,020 | 1,408 | 2,126 | 1,444 | 1,569 | 2,848 | 2,985 | 3,115 | 2,964 | 3,158 |
| 4:00 AM | 2,042 | 3,194 | 2,438 | 1,550 | 2,191 | 1,440 | 1,667 | 2,839 | 2,988 | 3,098 | 2,937 | 3,185 |
| 4:15 AM | 2,986 | 3,652 | 2,594 | 1,987 | 2,275 | 1,435 | 1,564 | 2,844 | 2,980 | 3,081 | 2,959 | 3,177 |
| 4:30 AM | 3,398 | 3,573 | 2,598 | 2,284 | 2,306 | 1,437 | 1,564 | 2,856 | 2,971 | 3,100 | 3,045 | 3,175 |
| 4:45 AM | 3,350 | 3,475 | 2,623 | 2,304 | 2,306 | 1,454 | 1,624 | 2,844 | 2,973 | 3,098 | 3,072 | 3,166 |
| 5:00 AM | 3,278 | 3,398 | 2,635 | 2,306 | 2,304 | 1,692 | 1,893 | 2,832 | 2,976 | 3,105 | 3,045 | 3,187 |
| 5:15 AM | 3,249 | 3,391 | 2,644 | 2,292 | 2,320 | 1,860 | 2,116 | 2,856 | 2,983 | 3,103 | 3,055 | 3,228 |
| 5:30 AM | 3,268 | 3,400 | 2,654 | 2,284 | 2,354 | 2,035 | 2,148 | 2,875 | 2,995 | 3,124 | 3,055 | 3,259 |
| 5:45 AM | 3,314 | 3,417 | 2,678 | 2,330 | 2,402 | 2,098 | 2,184 | 2,892 | 3,009 | 3,172 | 3,084 | 3,278 |
| 6:00 AM | 3,352 | 3,472 | 2,714 | 2,378 | 2,440 | 2,138 | 2,217 | 2,925 | 3,024 | 3,194 | 3,136 | 3,309 |
| 6:15 AM | 3,412 | 3,492 | 2,743 | 2,436 | 2,498 | 2,189 | 2,239 | 2,968 | 3,057 | 3,196 | 3,139 | 3,379 |
| 6:30 AM | 3,489 | 3,540 | 2,832 | 2,529 | 2,616 | 2,244 | 2,304 | 3,087 | 3,148 | 3,259 | 3,199 | 3,518 |
| 6:45 AM | 3,614 | 3,650 | 2,985 | 2,659 | 2,767 | 2,400 | 2,438 | 3,196 | 3,285 | 3,438 | 3,362 | 3,734 |
| 7:00 AM | 3,835 | 3,825 | 3,177 | 2,870 | 2,997 | 2,661 | 2,649 | 3,391 | 3,499 | 3,855 | 3,602 | 4,005 |
| 7:15 AM | 4,149 | 4,120 | 3,427 | 3,199 | 3,312 | 2,976 | 3,004 | 3,708 | 3,789 | 3,940 | 3,928 | 4,262 |
| 7:30 AM | 4,442 | 4,401 | 3,681 | 3,477 | 3,578 | 3,252 | 3,338 | 4,017 | 4,003 | 4,216 | 4,207 | 4,406 |
| 7:45 AM | 4,629 | 4,576 | 3,895 | 3,662 | 3,787 | 3,456 | 3,513 | 4,240 | 4,125 | 4,458 | 4,382 | 4,604 |
| 8:00 AM | 4,766 | 4,732 | 4,032 | 3,787 | 3,919 | 3,530 | 3,624 | 4,387 | 4,245 | 4,548 | 4,521 | 4,605 |
| 8:15 AM | 4,876 | 4,869 | 4,128 | 3,873 | 3,974 | 3,662 | 3,710 | 4,514 | 4,341 | 4,644 | 4,541 | 4,682 |
| 8:30 AM | 4,960 | 4,941 | 4,178 | 3,952 | 4,048 | 3,729 | 3,794 | 4,615 | 4,411 | 4,723 | 4,711 | 4,752 |
| 8:45 AM | 5,028 | 4,992 | 4,216 | 4,024 | 4,123 | 3,801 | 3,873 | 4,694 | 4,488 | 4,737 | 4,776 | 4,816 |
| 9:00 AM | 5,092 | 5,054 | 4,289 | 4,077 | 4,192 | 3,873 | 3,979 | 4,785 | 4,528 | 4,773 | 4,884 | 4,886 |
| 9:15 AM | 5,148 | 5,085 | 4,317 | 4,120 | 4,243 | 3,928 | 4,044 | 4,857 | 4,588 | 4,845 | 4,968 | 4,944 |
| 9:30 AM | 5,210 | 5,140 | 4,360 | 4,152 | 4,255 | 3,967 | 4,353 | 4,903 | 4,634 | 4,903 | 5,030 | 5,004 |
| 9:45 AM | 5,253 | 5,236 | 4,375 | 4,178 | 4,286 | 3,993 | 4,792 | 4,944 | 4,660 | 4,939 | 5,056 | 5,025 |
| 10:00 AM | 5,296 | 5,352 | 4,380 | 4,190 | 4,324 | 4,041 | 4,941 | 4,970 | 4,689 | 4,965 | 5,071 | 5,047 |
| 10:15 AM | 5,337 | 5,368 | 4,392 | 4,195 | 4,341 | 4,113 | 4,674 | 4,950 | 4,701 | 5,001 | 5,080 | 5,063 |
| 10:30 AM | 5,349 | 5,349 | 4,408 | 4,224 | 4,339 | 4,149 | 4,792 | 4,999 | 4,706 | 5,042 | 5,080 | 5,073 |
| 10:45 AM | 5,368 | 5,385 | 4,420 | 4,231 | 4,339 | 4,101 | 4,802 | 5,008 | 4,684 | 5,191 | 5,100 | 5,078 |
| 11:00 AM | 5,364 | 5,402 | 4,416 | 4,228 | 4,351 | 4,079 | 4,814 | 5,020 | 4,629 | 5,498 | 5,116 | 5,095 |
| 11:15 AM | 5,368 | 5,426 | 4,430 | 4,233 | 4,353 | 4,137 | 4,852 | 5,028 | 4,608 | 5,692 | 5,128 | 5,133 |
| 11:30 AM | 5,376 | 5,472 | 4,437 | 4,240 | 4,339 | 4,176 | 4,867 | 5,042 | 4,620 | 5,700 | 5,143 | 5,157 |
| 11:45 AM | 5,404 | 5,460 | 4,436 | 4,257 | 4,334 | 4,118 | 4,836 | 5,068 | 4,704 | 5,686 | 5,155 | 5,157 |

Fig. 6a

SAMPLE LARGE ELECTRIC ACCOUNT
BILLING PEAK DAY (kW) RECORDS

| FY 1998 | OCT 97<br>F 10/10 | NOV 97<br>R 10/30 | DEC 97<br>T 11/18 | JAN 98<br>R 1/8 | FEB 98<br>T 1/27 | MAR 98<br>M 3/9 | APR 98<br>R 4/16 | MAY 98<br>F 4/17 | JUN 98<br>R 6/18 | JUL 98<br>F 6/26 | AUG 98<br>M 8/10 | SEP 98<br>F 8/28 |
|---|---|---|---|---|---|---|---|---|---|---|---|---|
| 12:00 PM | 4,487 | 3,792 | 4,005 | 4,543 | 4,024 | 4,036 | 4,557 | 5,308 | 4,977 | 5,244 | 5,030 | 5,588 |
| 12:15 PM | 4,519 | 3,789 | 4,005 | 4,536 | 4,008 | 4,051 | 4,560 | 5,332 | 5,008 | 5,236 | 5,071 | 5,583 |
| 12:30 PM | 4,516 | 3,777 | 3,996 | 4,504 | 4,012 | 4,058 | 4,545 | 5,344 | 5,028 | 5,210 | 5,092 | 5,576 |
| 12:45 PM | 4,480 | 3,782 | 3,979 | 4,507 | 4,022 | 4,051 | 4,543 | 5,344 | 5,023 | 5,150 | 5,083 | 5,112 |
| 1:00 PM | 4,466 | 3,777 | 3,960 | 4,519 | 4,020 | 4,171 | 4,552 | 5,328 | 5,008 | 4,929 | 5,107 | 5,056 |
| 1:15 PM | 4,454 | 3,772 | 3,957 | 4,531 | 4,032 | 4,339 | 4,548 | 5,301 | 5,008 | 4,977 | 5,136 | 5,071 |
| 1:30 PM | 4,370 | 3,765 | 3,962 | 4,509 | 4,063 | 4,459 | 4,567 | 5,318 | 5,020 | 5,224 | 5,148 | 5,059 |
| 1:45 PM | 4,288 | 3,753 | 3,962 | 4,485 | 4,060 | 4,492 | 4,548 | 5,325 | 5,016 | 5,390 | 5,114 | 5,066 |
| 2:00 PM | 4,629 | 3,746 | 3,960 | 4,497 | 4,048 | 4,416 | 4,485 | 5,316 | 5,008 | 5,628 | 5,042 | 5,078 |
| 2:15 PM | 5,006 | 3,760 | 3,950 | 4,492 | 4,048 | 4,401 | 4,845 | 5,320 | 5,001 | 5,793 | 5,008 | 5,054 |
| 2:30 PM | 5,040 | 4,065 | 3,940 | 4,504 | 4,188 | 4,408 | 5,342 | 5,332 | 5,004 | 5,772 | 4,927 | 5,056 |
| 2:45 PM | 5,035 | 4,358 | 3,926 | 4,538 | 4,368 | 4,420 | 5,419 | 5,349 | 5,004 | 5,604 | 4,533 | 5,078 |
| 3:00 PM | 5,025 | 4,351 | 3,912 | 4,557 | 4,396 | 4,428 | 5,366 | 5,359 | 4,996 | 5,721 | 4,423 | 5,049 |
| 3:15 PM | 5,032 | 4,231 | 3,909 | 4,557 | 4,389 | 4,425 | 5,328 | 5,368 | 4,996 | 5,760 | 5,323 | 5,037 |
| 3:30 PM | 5,013 | 4,111 | 3,912 | 4,531 | 4,392 | 4,425 | 5,299 | 5,364 | 4,994 | 5,635 | 5,959 | 5,044 |
| 3:45 PM | 4,984 | 4,084 | 3,892 | 4,512 | 4,370 | 4,404 | 5,275 | 5,323 | 4,984 | 5,628 | 5,733 | 5,020 |
| 4:00 PM | 4,975 | 4,056 | 3,854 | 4,516 | 4,353 | 4,370 | 5,251 | 5,282 | 4,956 | 5,589 | 5,560 | 4,996 |
| 4:15 PM | 4,922 | 4,032 | 3,828 | 4,509 | 4,346 | 4,339 | 5,253 | 5,248 | 4,929 | 5,544 | 5,517 | 4,975 |
| 4:30 PM | 4,836 | 3,998 | 3,796 | 4,464 | 4,315 | 4,310 | 5,244 | 5,210 | 4,908 | 5,524 | 5,493 | 4,939 |
| 4:45 PM | 4,749 | 3,948 | 3,751 | 4,401 | 4,266 | 4,262 | 5,200 | 5,164 | 4,874 | 5,496 | 5,479 | 4,932 |
| 5:00 PM | 4,668 | 3,888 | 3,715 | 4,358 | 4,200 | 4,195 | 5,148 | 5,112 | 4,831 | 5,428 | 5,365 | 4,910 |
| 5:15 PM | 4,567 | 3,811 | 3,667 | 4,262 | 4,149 | 4,130 | 5,044 | 5,044 | 4,778 | 5,359 | 5,292 | 4,836 |
| 5:30 PM | 4,444 | 3,734 | 3,585 | 4,116 | 4,063 | 4,063 | 4,936 | 4,970 | 4,708 | 5,283 | 5,220 | 4,769 |
| 5:45 PM | 4,329 | 3,643 | 3,472 | 3,996 | 3,964 | 3,969 | 4,852 | 4,884 | 4,624 | 5,164 | 4,936 | 4,656 |
| 6:00 PM | 4,216 | 3,552 | 3,357 | 3,866 | 3,849 | 3,880 | 4,720 | 4,740 | 4,543 | 5,028 | 4,550 | 4,500 |
| 6:15 PM | 4,068 | 3,446 | 3,235 | 3,717 | 3,729 | 3,518 | 4,596 | 4,576 | 4,442 | 4,908 | 4,513 | 4,358 |
| 6:30 PM | 3,926 | 3,242 | 3,052 | 3,573 | 3,618 | 3,129 | 4,486 | 4,418 | 4,293 | 4,807 | 4,185 | 4,231 |
| 6:45 PM | 3,801 | 2,865 | 2,848 | 3,403 | 3,388 | 2,983 | 4,296 | 4,224 | 4,130 | 4,692 | 4,058 | 4,087 |
| 7:00 PM | 3,705 | 2,551 | 2,671 | 3,151 | 2,768 | 2,760 | 3,751 | 4,032 | 3,988 | 4,560 | 3,926 | 3,955 |
| 7:15 PM | 3,612 | 2,320 | 2,551 | 2,608 | 2,277 | 2,414 | 2,769 | 3,321 | 3,973 | 4,461 | 3,837 | 3,866 |
| 7:30 PM | 3,511 | 2,126 | 2,467 | 2,160 | 2,160 | 2,198 | 2,186 | 2,801 | 3,787 | 4,375 | 3,744 | 3,775 |
| 7:45 PM | 3,434 | 2,044 | 2,383 | 2,083 | 2,068 | 2,126 | 2,104 | 2,455 | 3,715 | 4,228 | 3,669 | 3,703 |
| 8:00 PM | 3,360 | 1,982 | 2,323 | 2,018 | 1,980 | 2,047 | 2,090 | 2,395 | 3,667 | 4,101 | 3,616 | 3,655 |
| 8:15 PM | 3,247 | 1,944 | 2,268 | 1,946 | 1,822 | 1,946 | 2,020 | 2,311 | 3,602 | 4,023 | 3,554 | 3,573 |
| 8:30 PM | 3,160 | 1,900 | 2,217 | 1,900 | 1,884 | 1,855 | 1,951 | 2,076 | 3,528 | 3,957 | 3,480 | 3,506 |
| 8:45 PM | 3,136 | 1,862 | 2,186 | 1,869 | 1,848 | 1,809 | 1,927 | 1,888 | 3,480 | 3,936 | 3,445 | 3,484 |
| 9:00 PM | 3,100 | 1,838 | 2,162 | 1,824 | 1,809 | 1,792 | 1,888 | 1,838 | 3,448 | 3,907 | 3,400 | 3,448 |
| 9:15 PM | 3,050 | 1,819 | 2,143 | 1,790 | 1,778 | 1,771 | 1,850 | 1,797 | 3,420 | 3,873 | 3,340 | 3,391 |
| 9:30 PM | 3,012 | 1,790 | 2,119 | 1,761 | 1,756 | 1,742 | 1,814 | 1,773 | 3,393 | 3,844 | 3,315 | 3,357 |
| 9:45 PM | 2,971 | 1,771 | 2,100 | 1,725 | 1,732 | 1,718 | 1,797 | 1,742 | 3,369 | 3,830 | 3,278 | 3,345 |
| 10:00 PM | 2,940 | 1,761 | 1,966 | 1,694 | 1,716 | 1,701 | 1,780 | 1,706 | 3,340 | 3,808 | 3,240 | 3,326 |
| 10:15 PM | 2,906 | 1,747 | 1,814 | 1,660 | 1,704 | 1,696 | 1,771 | 1,663 | 3,295 | 3,768 | 3,211 | 3,302 |
| 10:30 PM | 2,877 | 1,730 | 1,785 | 1,641 | 1,684 | 1,684 | 1,754 | 1,622 | 3,268 | 3,736 | 3,206 | 3,285 |
| 10:45 PM | 2,860 | 1,704 | 1,771 | 1,615 | 1,665 | 1,670 | 1,723 | 1,596 | 3,251 | 3,722 | 3,201 | 3,264 |
| 11:00 PM | 2,846 | 1,677 | 1,771 | 1,598 | 1,658 | 1,663 | 1,716 | 1,576 | 3,237 | 3,693 | 3,177 | 3,249 |
| 11:15 PM | 2,839 | 1,646 | 1,749 | 1,593 | 1,653 | 1,648 | 1,711 | 1,574 | 3,232 | 3,657 | 3,136 | 3,199 |
| 11:30 PM | 2,805 | 1,632 | 1,742 | 1,574 | 1,644 | 1,629 | 1,701 | 1,567 | 3,230 | 3,648 | 3,076 | 3,148 |
| 11:45 PM | 2,768 | 1,529 | 1,737 | 1,550 | 1,644 | 1,620 | 1,684 | 1,550 | 3,180 | 3,633 | 3,038 | 3,136 |

Fig. 6b

| SAMPLE LARGE ELECTRIC ACCOUNT | | | | | | | | | | | | |
|---|---|---|---|---|---|---|---|---|---|---|---|---|
| BILLING PEAK DAY (kW) RECORDS | | | | | | | | | | | | |
| FY 1999 | OCT 98 R 9/17 | NOV 98 W 10/20 | DEC 98 | JAN 99 | FEB 99 | MAR 99 | APR 99 | MAY 99 | JUN 99 | JUL 99 | AUG 99 | SEP 99 |
| 12:00 AM | 3,208 | 1,492 | | | | | | | | | | |
| 12:15 AM | 3,199 | 1,468 | | | | | | | | | | |
| 12:30 AM | 3,153 | 1,447 | | | | | | | | | | |
| 12:45 AM | 3,134 | 1,461 | | | | | | | | | | |
| 1:00 AM | 3,172 | 1,456 | | | | | | | | | | |
| 1:15 AM | 3,194 | 1,447 | | | | | | | | | | |
| 1:30 AM | 3,192 | 1,447 | | | | | | | | | | |
| 1:45 AM | 3,204 | 1,442 | | | | | | | | | | |
| 2:00 AM | 3,206 | 1,435 | | | | | | | | | | |
| 2:15 AM | 3,189 | 1,416 | | | | | | | | | | |
| 2:30 AM | 3,184 | 1,403 | | | | | | | | | | |
| 2:45 AM | 3,192 | 1,406 | | | | | | | | | | |
| 3:00 AM | 3,196 | 1,408 | | | | | | | | | | |
| 3:15 AM | 3,199 | 1,401 | | | | | | | | | | |
| 3:30 AM | 3,194 | 1,425 | | | | | | | | | | |
| 3:45 AM | 3,172 | 1,435 | | | | | | | | | | |
| 4:00 AM | 3,170 | 1,416 | | | | | | | | | | |
| 4:15 AM | 3,180 | 1,615 | | | | | | | | | | |
| 4:30 AM | 3,151 | 2,105 | | | | | | | | | | |
| 4:45 AM | 3,158 | 2,421 | | | | | | | | | | |
| 5:00 AM | 3,168 | 2,551 | | | | | | | | | | |
| 5:15 AM | 3,158 | 2,644 | | | | | | | | | | |
| 5:30 AM | 3,206 | 2,618 | | | | | | | | | | |
| 5:45 AM | 3,278 | 2,611 | | | | | | | | | | |
| 6:00 AM | 3,336 | 2,632 | | | | | | | | | | |
| 6:15 AM | 3,400 | 2,680 | | | | | | | | | | |
| 6:30 AM | 3,484 | 2,750 | | | | | | | | | | |
| 6:45 AM | 3,592 | 2,836 | | | | | | | | | | |
| 7:00 AM | 3,806 | 3,057 | | | | | | | | | | |
| 7:15 AM | 4,075 | 3,398 | | | | | | | | | | |
| 7:30 AM | 4,281 | 3,700 | | | | | | | | | | |
| 7:45 AM | 4,430 | 3,883 | | | | | | | | | | |
| 8:00 AM | 4,524 | 3,984 | | | | | | | | | | |
| 8:15 AM | 4,622 | 4,070 | | | | | | | | | | |
| 8:30 AM | 4,730 | 4,156 | | | | | | | | | | |
| 8:45 AM | 4,802 | 4,236 | | | | | | | | | | |
| 9:00 AM | 4,857 | 4,298 | | | | | | | | | | |
| 9:15 AM | 4,924 | 4,358 | | | | | | | | | | |
| 9:30 AM | 4,982 | 4,404 | | | | | | | | | | |
| 9:45 AM | 5,006 | 4,442 | | | | | | | | | | |
| 10:00 AM | 5,030 | 4,478 | | | | | | | | | | |
| 10:15 AM | 5,068 | 4,485 | | | | | | | | | | |
| 10:30 AM | 5,088 | 4,488 | | | | | | | | | | |
| 10:45 AM | 5,102 | 4,497 | | | | | | | | | | |
| 11:00 AM | 5,124 | 4,509 | | | | | | | | | | |
| 11:15 AM | 5,119 | 4,543 | | | | | | | | | | |
| 11:30 AM | 5,078 | 4,567 | | | | | | | | | | |
| 11:45 AM | 5,068 | 4,548 | | | | | | | | | | |

DAILY HEATING & COOLING DEGREE HOUR RECORDS

| DAY NUM | Jan 97 Heat | Feb 97 Heat | Mar 97 Heat | Apr 97 Heat | Apr 97 Cool | May 97 Heat | May 97 Cool | Jun 97 Cool | Jul 97 Cool | Aug 97 Cool | Sep 97 Cool | Oct 97 Cool | Oct 97 Heat | Nov 97 Heat | Dec 97 Heat |
|---|---|---|---|---|---|---|---|---|---|---|---|---|---|---|---|
| 1 | 752 | 631 | 353 | 393 | 0 | 52 | 6 | 6 | 55 | 78 | 124 | 0 | 90 | 136 | 476 |
| 2 | 495 | 540 | 69 | 238 | 0 | 137 | 0 | 0 | 75 | 74 | 112 | 0 | 249 | 213 | 549 |
| 3 | 244 | 409 | 555 | 171 | 0 | 56 | 2 | 0 | 184 | 123 | 3 | 0 | 151 | 280 | 569 |
| 4 | 184 | 596 | 533 | 104 | 0 | 168 | 0 | 0 | 125 | 68 | 0 | 5 | 84 | 395 | 357 |
| 5 | 180 | 493 | 418 | 119 | 0 | 144 | 0 | 0 | 21 | 22 | 0 | 46 | 16 | 493 | 534 |
| 6 | 294 | 524 | 410 | 133 | 0 | 81 | 0 | 0 | 63 | 15 | 3 | 61 | 1 | 434 | 720 |
| 7 | 614 | 600 | 579 | 48 | 0 | 183 | 0 | 0 | 84 | 33 | 61 | 49 | 0 | 401 | 657 |
| 8 | 768 | 739 | 318 | 270 | 0 | 216 | 0 | 0 | 117 | 37 | 28 | 22 | 3 | 377 | 576 |
| 9 | 779 | 751 | 582 | 626 | 0 | 169 | 0 | 0 | 130 | 73 | 0 | 43 | 1 | 345 | 549 |
| 10 | 652 | 723 | 360 | 612 | 0 | 291 | 0 | 44 | 36 | 78 | 43 | 50 | 0 | 358 | 578 |
| 11 | 684 | 732 | 350 | 378 | 0 | 186 | 0 | 31 | 58 | 124 | 21 | 0 | 60 | 403 | 529 |
| 12 | 959 | 662 | 514 | 263 | 0 | 100 | 0 | 38 | 92 | 165 | 26 | 0 | 108 | 492 | 553 |
| 13 | 984 | 789 | 517 | 180 | 0 | 184 | 0 | 56 | 142 | 199 | 9 | 4 | 60 | 625 | 648 |
| 14 | 900 | 703 | 459 | 381 | 0 | 178 | 0 | 9 | 194 | 132 | 12 | 15 | 17 | 617 | 636 |
| 15 | 774 | 548 | 581 | 326 | 0 | 75 | 0 | 1 | 240 | 185 | 19 | 0 | 192 | 548 | 691 |
| 16 | 633 | 640 | 685 | 226 | 0 | 183 | 0 | 13 | 226 | 275 | 43 | 0 | 196 | 641 | 556 |
| 17 | 1,142 | 681 | 483 | 328 | 0 | 137 | 0 | 63 | 188 | 207 | 57 | 0 | 302 | 667 | 499 |
| 18 | 1,156 | 409 | 539 | 465 | 0 | 67 | 18 | 85 | 179 | 86 | 37 | 0 | 244 | 653 | 600 |
| 19 | 1,111 | 196 | 613 | 317 | 0 | 1 | 99 | 64 | 138 | 0 | 46 | 0 | 240 | 594 | 524 |
| 20 | 809 | 280 | 484 | 258 | 0 | 6 | 3 | 122 | 48 | 12 | 39 | 0 | 195 | 490 | 446 |
| 21 | 647 | 229 | 313 | 375 | 0 | 124 | 0 | 174 | 173 | 43 | 0 | 0 | 308 | 456 | 609 |
| 22 | 582 | 171 | 228 | 317 | 0 | 143 | 0 | 198 | 132 | 9 | 0 | 0 | 400 | 401 | 697 |
| 23 | 397 | 482 | 510 | 372 | 0 | 115 | 0 | 111 | 8 | 0 | 0 | 0 | 493 | 395 | 537 |
| 24 | 676 | 435 | 541 | 272 | 0 | 55 | 18 | 153 | 0 | 7 | 0 | 0 | 379 | 633 | 545 |
| 25 | 490 | 699 | 428 | 192 | 0 | 0 | 10 | 218 | 40 | 21 | 0 | 0 | 275 | 650 | 512 |
| 26 | 768 | 466 | 291 | 143 | 0 | 63 | 0 | 169 | 124 | 31 | 0 | 0 | 373 | 433 | 460 |
| 27 | 609 | 97 | 275 | 259 | 0 | 151 | 0 | 64 | 232 | 51 | 0 | 0 | 293 | 371 | 669 |
| 28 | 576 | 321 | 168 | 183 | 0 | 132 | 0 | 73 | 206 | 74 | 0 | 0 | 481 | 378 | 702 |
| 29 | 791 |  | 80 | 187 | 0 | 110 | 0 | 50 | 61 | 28 | 1 | 0 | 429 | 317 | 716 |
| 30 | 776 |  | 101 | 137 | 0 | 44 | 0 | 69 | 13 | 33 | 0 | 0 | 314 | 369 | 868 |
| 31 | 612 |  | 523 |  | 0 | 18 | 19 |  | 51 | 72 |  | 0 | 283 |  | 737 |
| SUM | 21,314 | 14,293 | 12,310 | 8,370 | 0 | 3,540 | 175 | 2,013 | 3,453 | 2,133 | 740 | 289 | 6,136 | 13,993 | 18,243 |

| Illustration of Inefficient Operations | Unusually High Energy Consumption on Certain Days |
|---|---|
| Demand Spikes & Humps<br><br>Frequent and/or Erratic Demand Spikes & Humps<br><br>Daily Peak Demand Set at Odd Hours<br><br>Relatively High Morning or Nighttime Energy Consumption<br><br>Relatively High Weekend Energy Consumption<br><br>Incorrect Cycling of Equipment<br><br>Steady Daily Peak Demand or Energy Consumption<br><br>Unusually High Energy Consumption on Certain Days<br><br>Chiller Operations Started Early in April<br><br>Electric Boiler Operations Started Early in October | *Characteristics*<br>Daily energy consumption is unusually high regardless of weather.<br>*Criteria*<br>Peaks are indicated when a day shows uncharacteristically high energy consumption in comparison to the rest of the billing period -- especially when kWh consumption is approximately 20% above average for no readily identifiable reason.<br>*Explanation*<br>Peaks are an indication of increased energy consumption which may be the result of operational or mechanical problems -- or the result of special events.<br>*Estimated Cost*<br>The difference between the total kWh consumed during the peak day and the amount of kWh consumed on an average day during the billing period multiplied by the average cost of energy during the month (cents/kWh).<br>*Recommendations*<br>Consult with operating engineers to identify the reason for the peaks and whether they were due to mechanical failure or operational errors. Devise procedure to eliminate the problem in the future. | [graph of kilowatt-hours by day of month showing PEAK] |

Fig. 25

SAMPLE LARGE ELECTRIC ACCOUNT
REMARKS & COMMENTS

Sample Acct. No.

| Item | Period | Remarks | Comments |
|---|---|---|---|
| 30 | November-98 | Demand Hump Identified. | Date: 10-20-98 |
|  |  |  | Time: 2:00pm - 3:00pm |
|  |  |  | Magnitude: 163 kW |
|  |  |  | Increased Peak: 163 kW |
|  |  |  | Effect on Cost: $1,522 |
| 29 | November-98 | kW up 12% from Nov 97. | FY 99: 4,881 kW; FY 98: 4,359 kW. |
| 28 | November-98 | Rate change in Int Peak kWh. | $0.03996 to $0.04194 |
|  |  | Rate change in On Peak kWh. | $0.05320 to $0.04194 |
| 27 | October-98 | Demand Hump Identified. | Date: 9-17-98 |
|  |  |  | Time: 2:00pm - 3:00pm |
|  |  |  | Magnitude: 192 kW |
|  |  |  | Increased Peak: 135 kW |
|  |  |  | Effect on Cost: $2,830 |
| 26 | September-98 | Demand spike identified. | Date: 8/28/98 |
|  |  |  | Time: 12:00pm - 1:00pm |
|  |  |  | Magnitude: 598 kW |
|  |  |  | Increased Peak: 152 kW |
|  |  |  | Effect on Cost: $3,188 |
| 25 | August-98 | Demand hump identified. | Date: 8/10/98 |
|  |  |  | Time: 3:00pm - 6:30pm |
|  |  |  | Magnitude: 811 kW |
|  |  |  | Increased Peak: 238 kW |
|  |  |  | Effect on Cost: $4,992 |
| 24 | August-98 | kW up 16% from Aug 97. | FY 98: 5,959 kW; FY 97: 5,155 kW. |
| 23 | July-98 | Demand hump identified. | Date: 6/26/98 |
|  |  |  | Time: 1:00pm - 6:00pm |
|  |  |  | Magnitude: 558 kW |
|  |  |  | Increased Peak: 368 kW |
|  |  |  | Effect on Cost: $7,719 |
| 22 | June-98 | Demand spike identified. | Date: 6/18/98 |
|  |  |  | Time: 10:00am - 11:00am |
|  |  |  | Magnitude: 466 kW |
|  |  |  | Increased Peak: 216 kW |
|  |  |  | Effect on Cost: $3,065 |
| 21 | June-98 | Rate change in On Peak kWh. | $0.04197 to $0.05320 |
|  |  | Rate change in Int Peak kWh. | $0.04197 to $0.04058 |
|  |  | Rate change in Off Peak kWh. | $0.03024 to $0.02739 |
| 20 | June-98 | Rate change in Environmental Cost Recovery Charge. | $0.00189863 to $0.00190976 |
| 19 | April-98 | Midday Chiller Start-up. | Date: 4/16/98 |
|  |  |  | Time: 2:00pm - 6:00pm |
|  |  |  | Magnitude: 856 kW |
|  |  |  | Increased Peak: 415 kW |
|  |  |  | Effect on Cost: $3,942 |
| 18 | April-98 | Rate change in Int Peak kWh. | $0.04200 to $0.04197 |
|  |  | Rate change in On Peak kWh. | $0.04200 to $0.04197 |
| 17 | March-98 | Midday Chiller Start-up. | Date: 3/9/98 |
|  |  |  | Time: 1:00pm - 6:00pm |
|  |  |  | Magnitude: 523 kW |
|  |  |  | Increased Peak: 36 kW |
|  |  |  | Effect on Cost: $349 |
| 16 | March-98 | Rate change in Environmental Cost Recovery Charge. | $0.001840098 to $0.00189863 |
| 15 | February-98 | Demand hump identified. | Date: 1/27/98 |
|  |  |  | Time: 2:00pm - 6:00pm |
|  |  |  | Magnitude: 317 kW |
|  |  |  | Increased Peak: 87 kW |

Fig. 28a

SAMPLE LARGE ELECTRIC ACCOUNT
REMARKS & COMMENTS

Sample Acct. No.

| Item | Period | Remarks | Comments | |
|---|---|---|---|---|
| | | | Effect on Cost: | $820 |
| 14 | December-97 | Rate change in Int. Peak kWh. | $0.04210 to $0.04200 | |
| | | Rate change in On Peak kWh. | $0.04210 to $0.04200 | |
| 13 | November-97 | Rate change in Int. Peak kWh. | $0.04031 to $0.04210 | |
| | | Rate change in On Peak kWh. | $0.04229 to $0.04210 | |
| 12 | November-97 | Midday Chiller Start-up. | Date: | 10/30/97 |
| | | | Time: | 2:15pm - 6:00pm |
| | | | Magnitude: | 555 kW |
| | | | Increased Peak: | Minimal |
| | | | Effect on Cost: | Minimal |
| 11 | October-97 | Rate change in Int. Peak kWh. | $0.04058 to $0.04031 | |
| 10 | October-97 | Midday Chiller Start-up. | Date: | 10/10/97 |
| | | | Time: | 1:30pm - 6:00pm |
| | | | Magnitude: | 520 kW |
| | | | Increased Peak: | 296 kW |
| | | | Effect on Cost: | $6,209 |
| 9 | September-97 | Rate change in Environmental Cost Recovery Charge. | $0.001837033 to $0.001839467 | |
| 8 | June-97 | Rate change in On Peak kWh. | $0.04210 to $0.05320 | |
| | | Rate change in Int Peak kWh. | $0.04210 to $0.04058 | |
| | | Rate change in Off Peak kWh. | $0.03024 to $0.02739 | |
| 7 | June-97 | Rate change in Environmental Cost Recovery Charge. | $0.001833674 to $0.001837033 | |
| 6 | May-97 | Rate change in On Peak kWh. | $0.04229 to $0.04210 | |
| | | Rate change in Int Peak kWh. | $0.04229 to $0.04210 | |
| 5 | April-97 | Rate change in Environmental Cost Recovery Charge. | $0.001827076 to $0.001833674 | |
| 4 | March-97 | kW up 14% from Mar 96. | FY 97: 4,971 kW, FY 96: 4,346 kW. | |
| 3 | March-97 | Demand hump identified. We recommend that you do not start your chillers prior to the 20th of March because it may fall in the March billing period and significantly increase your peak demand. | Date: | 3/18/97 |
| | | | Time: | 12:00pm - 3:30pm |
| | | | Magnitude: | 843 kW |
| | | | Increased Peak: | 142 kW |
| | | | Effect on Cost: | $1,340 |
| 2 | January-97 | kWh/Day up 20% from Jan 96. | FY 97: 54,987 kWh/Day. | |
| | | | FY 96: 46,006 kWh/Day. | |
| 1 | December-96 | Rate change in Environmental Cost Recovery Charge. | $0.001808674 to $0.001827076 | |

Creating a projection of future <u>consumption</u> per billing period based on the average consumption during the same period of the past two years.

↓

Calculating the projected costs for future billing periods using the current billing rates.

OPTIMIZING OPERATIONAL EFFICIENCY AND REDUCING COSTS OF MAJOR ENERGY SYSTEM AT LARGE FACILITIES

This application claims benefit of Provisional application Ser. No. 60/085,903 filed May 18, 1998.

This application contains an appendix A that includes the source code a program entitled: "Utilities Guru Decision Support System Source Code" contained on the compact disk, the entire content of which is hereby incorporated by reference. The compact disk contains the following files:

| | | |
|---|---|---|
| Comparative Numeric Analysis | 501 KB | October 10, 2001 |
| Cost Projections | 265 KB | October 10, 2001 |
| Executive Summaries | 203 KB | October 10, 2001 |
| Five Year Graph | 523 KB | October 10, 2001 |
| Gas Operations | 301 KB | October 10, 2001 |
| Leading Utilities Indicators | 378 KB | October 10, 2001 |
| OE - Large Electric | 1,654 KB | October 10, 2001 |
| OE - Medium Electric | 613 KB | October 10, 2001 |
| OE - Small Electric | 30 OK 13 | October 10, 2001 |
| Oil Operations | 293 KB | October 10, 2001 |
| Pull-Down Guru | 2,822 KB | October 10, 2001 |
| References | 166 KB | October 10, 2001 |
| Steam Operations | 297 KB | October 10, 2001 |
| Summary of Findings | 214 KB | October 10, 2001 |
| Water Operations | 294 KB | October 10, 2001 |
| Weather Report | 476 KB | October 10, 2001 |

TECHNICAL FIELD

This invention relates to a system for analyzing and improving the operational efficiency of major energy consuming systems at large facilities and particularly the consumption of electricity at commercial, governmental, or industrial facilities.

BACKGROUND OF THE INVENTION

In order to understand the practical benefits of this invention, it is important to point out how large organizations often incur tens of thousands of dollars in additional energy costs, every year, from trivial—undetected—operating errors, equipment problems, hard-to-detect billing errors.

When it comes to managing the energy and water operations at most large facilities, operating personnel are usually granted unconditional and unquestioned authority on how they run their facilities—as long as the facilities' tenants are satisfied. This kind of operation not only results in highly inefficient operations, but in untold millions in additional costs, due to undetected and recurring operational errors and equipment problems. In fact, a 15-minute mistake by a building engineer at a large facility can easily cost $30,000 or more in additional energy charges that go unnoticed.

While it is rare to find an organization which would normally pay bills without understanding their content, that is exactly what organizations often do when paying their energy and water bills. They practically hand the utilities twelve blank checks to fill in every year—and in the process millions of dollars are spent in overpayments and overcharges!

Most facilities management operations are limited in their ability to address the issues raised above because they lack an effective tool that can identify the nature of the problems and their effect on cost. Facility managers and operating engineers are rarely aware of how their operations can drastically impact their utility bills resulting in recurring operating errors and lengthy equipment malfunctions. For example, by not having the necessary resources to differentiate between a $10 energy spike and a $10,000 energy spike, few managers or engineers are inclined to commit the necessary time and resources to investigate what they might consider to be a negligible glitch.

A facility may have the most sophisticated operating equipment available and the most up-to-date and state-of-the-art control system, but such equipment and systems may not be enough. If the equipment is not operated properly, or if the sensors on the control systems fail, the facility is going to run inefficiently and money will be wasted. The bigger the facility, the bigger the waste.

A variety of services and systems have been proposed to assist facilities managers and owners achieve better control over their utility costs. For example, over twenty years ago a software implemented system, now provided under the name FASER 2000 by Omnicomp, Inc. a subsidiary of Enron, was introduced to assist facilities managers to track utility performance and to compare alternative prices. While useful for the purposes intended, this system was quite limited in its ability to help the user identify problems, particularly, difficult to identify problems and to analyze the costs associated with those problems and to identify appropriate solutions. Other software packages are known such as METRIX UTILITY ACCOUNTING SYSTEM provided by SRC Systems Inc, Berkeley, Calif.; UTILITY MANAGER supplied by Illinova Corporation, Decatur, Ill.; and ENERCY PROFILER supplied by Energy Interactive. In varying degrees these packages fail to provide robust, easy-to-use assistance to facilities managers in achieving the highest level of efficiency in the use of energy.

In U.S. Pat. No. 5,216,623 to Barrett et al., a system and method is disclosed for monitoring and analyzing energy consuming equipment or loads. Data is collected, analyzed and used to create charts to provide a detailed analysis including reports containing summaries of the sensed data in the form of listings of compressed data as well as graphs such as histograms and graphs correlating different energy characteristics of the energy consuming system. While generally suggestive of important steps necessary to achieving improved efficiency in facilities management, Barrett et al. '623 does not provide a system that will allow for relatively easy analysis of complex energy consumption data with techniques for identifying probable reasons for inefficient operations and with guidance on possible solutions to those inefficient operations.

U.S. Pat. No. 5,566,084 to Cmar is a far more sophisticated approach to managing energy consumption in a facility using complex computer aided analysis. In particular, Cmar '084 discloses a process including the step of identifying patterns of electric energy consumption and demand in a facility and determining possible changes in the facility for energy conservation using monthly electric billing data over the years. The system uses daily weather reports to permit data to be collated and analyzed to create a model of the load shape according to what has happened in the facility. Through use of the system, reports are created that allow a facility operator to visualize end-uses of electricity and to select various energy conservation measures which can be predicted as usefully applicable to the building. By producing a report using the generated model of the load shape, the system allows management to make a decision based on predicted savings. The value of energy savings is calculated by normalizing the before retrofit billing data to current billing data and weather conditions and subtracting after retrofit billing data to identify the differential. While useful for its intended purposes, the system and method disclosed by Cmar '084 involves a complex series of steps for "disaggregating" utility data followed by creation of a "best fit" curve using regression analysis to create a "load" curve model for the building. This approach is cumbersome and difficult to implement and is subject to errors in the creation of the model that might only be discovered after expensive retrofit of equipment or change in the facility's use is undertaken to check the accuracy of the model as is contemplated by the Cmar '084 teaching.

Therefore, a need exists for a system and method which is capable of producing highly accurate information for use of facilities managers in achieving more efficient facilities operation and cost containment. In particular, there exists a need for a method and system that produces highly accurate, detailed information that does not rely on complex mathematical modeling and yet provides on going guidance to facilities managers that will assist such managers in achieving and maintaining highly efficient, low cost energy consumption by the facilities for which they are responsible.

SUMMARY OF THE INVENTION

The primary object of the subject invention is to provide a system and method for overcoming the deficiencies of the prior art and in particular to provide a system and method for producing highly accurate information for use by facilities managers in achieving more efficient facilities operation and energy cost containment.

Another object of the subject invention is to provide a computer implemented method for visually analyzing current and historic patterns of energy consumption in a facility to which energy is supplied by one or more utilities which bill for the energy supplied over consecutive billing periods at rates which may vary during some billing periods to determine the presence of possible operating errors, equipment problems, or hard-to-detect billing errors.

Still another object of the subject invention is to provide a computer implemented method including processing the stored data, in a computer, to create single period graphs which illustrate and tabulate energy consumption for each billing period (e.g. monthly) and to create multi-period graphs (e.g. yearly) which illustrate and tabulate energy consumption during multiple extended periods formed of consecutive billing periods to allow visual comparison of energy consumption during one billing period with energy consumption during another billing period and to allow visual comparison of energy consumption during one extended period with the energy consumption during a second extended period.

Yet another object of the subject invention is to create documented patterns representing unusual circumstances which could represent inefficient operation of the facility, for which solutions are known based on analysis of energy consumption by several large facilities over long periods, to allow identification of the nature of similarly inefficient facility operation as shown in the graphs produced by the disclosed method and to allow identification of possible solutions. In particular, this object is achieved by the steps of replacing the stored data representing an unusual pattern of energy use or consumption by data representing a normalized pattern of energy use or consumption; reprocessing the stored data to calculate the effect on the cost under the normalized pattern of energy use or consumption; and creating a chart which records the differential in cost of the unusual pattern of energy use or consumption over the normalized pattern of energy use or consumption.

Still another object of the subject invention is to achieve one or more of the above objects and to provide a method for creating a projection of future costs per billing period based on the average consumption for selected prior billing periods, and calculating the projected costs for future billing periods using the current billing rates. This object is particularly useful when the billing period is monthly and consumption data is stored for at least the last two prior fiscal years, such that the step of creating a projection of the cost of energy consumption during a future monthly billing period may include the step of determining the projected energy consumption for a future monthly billing period by calculating the average consumption of energy during the same month of each of at least the last two fiscal years and using such average consumption and the current billing rates to determine the cost projection for the future monthly billing period. This method also permits the step of determining the cost projection for each monthly billing period by repeating the projected costs calculation for each future monthly billing period remaining in the current fiscal year and the step of determining a projected balance for each month.

Yet another object of the subject invention is to provide a computer implemented method to achieve one or more of the above objects including the step of forming charts including selected graphs juxtaposed in side-by-side relationship wherein the side-by-side graphs display data pertinent to the same month of the year. Such side-by-side graphs could include data relating to daily electric peak demand, daily electric energy consumption, daily time of the peak day demand, billing peak day and/or daily heating and cooling degree hour.

Yet another object of the subject invention is to provide a method for creating hypothetical data representing hypothetical conditions which could potentially effect the cost and amount of energy consumption as a replacement for some but not all of the stored data and for processing the hypothetical data and un-replaced stored data to calculate the effect of the hypothetical conditions on the cost and amount of energy consumption and to create a chart which illustrates and tabulates the results of such calculations.

A further object of the subject invention is to provide a method for creating documented patterns representing unusual documented circumstances based on analysis of energy consumption over long periods by several large facilities to allow identification of the nature of similar unusual circumstances shown in the graphs produced by said graph generator whereby possible solutions to inefficient operations can be identified. For example the causes of (1) excess demand spikes and humps, (2) frequent and/or erratic demand spikes and humps, (3) daily peak demand set at odd hours, (4) relatively high morning or nighttime energy consumption, (5) relatively high weekend energy consumption, (6) incorrect cycling of equipment, (7) steady daily peak demand or energy consumption, (8) unusually high energy consumption on certain days, (9) chiller operations started early in April, (10) electric boiler operations started early in October may be detected via this important feature of the disclosed invention.

A further object of the subject invention is to achieve one or more of the above objectives and to provide the step of storing in computer memory weather data relating to the weather conditions prevailing immediately outside the facility during billing periods for which data is stored, and include the weather data in at least some of the created graphs.

Still another object of the subject invention is to achieve one or more of the above objects and in addition to provide a method including the step of storing in retrievable form within computer memory the result of the comparisons of single and multiple billing period graphs with results of calculations using hypothetical data after the close of a billing period and repeating this step after the close of each billing period to create accessible current and historical data, information and analysis about the energy consumption of the facility.

Still another object of the subject invention is to provide a computer implemented system to assist in achieving one or more of the above objects and particularly to assist in the analysis of current and historic patterns of energy consumption in a facility to which energy is supplied by one or more utilities to determine the presence of possible operating errors, equipment problems, or hard to detect billing errors and to assist in identifying the nature of inefficient operations whereby possible solutions to inefficient operations can be identified.

Another object of the subject invention is to provide a computer generated and modifiable chart (this type of chart could take the form of a specialized spreadsheet) to enable the user to formulate various energy use and rate change scenarios and examine their effects on electric costs. The chart may be divided into four sections including an input section which represents the billing data from which costs are derived. This section initially shows the most recent actual billing data. When a computer is programed to implement the present invention, it will enable a user to alter the data included in an input section based on desired or projected changes in electric consumption or demand. The output section calculates the new electric costs based on the changes entered in the input section. The resulting differences in cost, as reflected in a change section to indicate corresponding savings or costs. A rate table below allows the user to modify individual rate components and examine the corresponding changes in cost with regard to the specified energy data. This chart illustrates a very important feature of the subject invention. In particular, the chart allows the analyst to ask hypothetical "what if" questions to determine the effect on consumption and costs under a variety of different scenarios.

The above and other objects of this invention may be achieved by providing a general purpose digital computer including a digital processor which operates to execute the sequential commands of various programs stored in the computer's program memory. A hard drive memory is normally provided to allow data to be stored in files and retrieved or modified as required to operate the program for its intended purpose. Data may be transferred into the computer from a keyboard, CD ROM, floppy drive or other type of input device. Data in the form of graphs, charts, numerical listings, text etc. that are stored within the computer memory and/or results from manipulation of the data can be displayed on a computer monitor or fed to a printer for creation of hard copy images.

The above and other important objects, advantages and features of this invention may be appreciated from a consideration of the following Brief Description of the Drawings and Detailed Description of the Preferred Embodiment.

BRIEF DESCRIPTION OF THE DRAWINGS

FIG. 1 is a data chart recording building parameters for a facility whose energy consumption is to be analyzed by the system and method of the subject invention.

FIGS. 2A–2B are illustrations of data charts disclosing electrical consumption and-cost breakdown for a facility.

FIGS. 3A–3C are illustrations of data charts disclosing daily electric peak demand records.

FIGS. 4A–4C are illustrations of data charts disclosing daily electric consumption records.

FIGS. 5A–5C are illustrations of data charts disclosing daily time of the peak day demand records.

FIGS. 6A–6C are illustrations of data charts disclosing billing peak day records.

FIGS. 7A–7C are illustrations of data charts disclosing daily heating and cooling degree hour records.

FIG. 14 is an illustration of a chart disclosing the results of calculations based on hypothetical data.

FIG. 15 is an illustration of a chart disclosing performance summaries.

FIG. 25 is an illustration of a chart disclosing inefficient, unusually high energy consumption on certain days.

FIGS. 28A–28B is a chart of remarks and comments recorded in the system as a result of operation of the disclosed invention.

FIGS. 30A–30C is a schematic flow diagram of the method of visually analyzing current and historic patterns of energy consumption in a facility.

DETAILED DESCRIPTION OF THE PREFERRED EMBODIMENT

As disclosed in detail below, the subject invention relates to a process and apparatus (referred to hereafter as a Utilities Decision Support System or "System") for analyzing current and historic patterns of energy consumption in a facility to which energy is supplied by one or more utilities. Such utilities typically bill for the energy supplied over consecutive billing periods (usually monthly) at rates which may vary during some billing periods. The System is designed to determine the presence of possible operating errors, equipment problems, or hard to detect billing errors. In the embodiment described below, the System is used to analyze the consumption of electricity supplied by an electric utility to a facility such as an office building or factory. However, the System has equal applicability in documenting and analyzing the consumption of other types of energy (the word "energy" is used in its most generic sense to include consumables such as gas, oil, steam, coal, water etc.) consumed by a facility and supplied thereto by a utility.

Figure 30A:
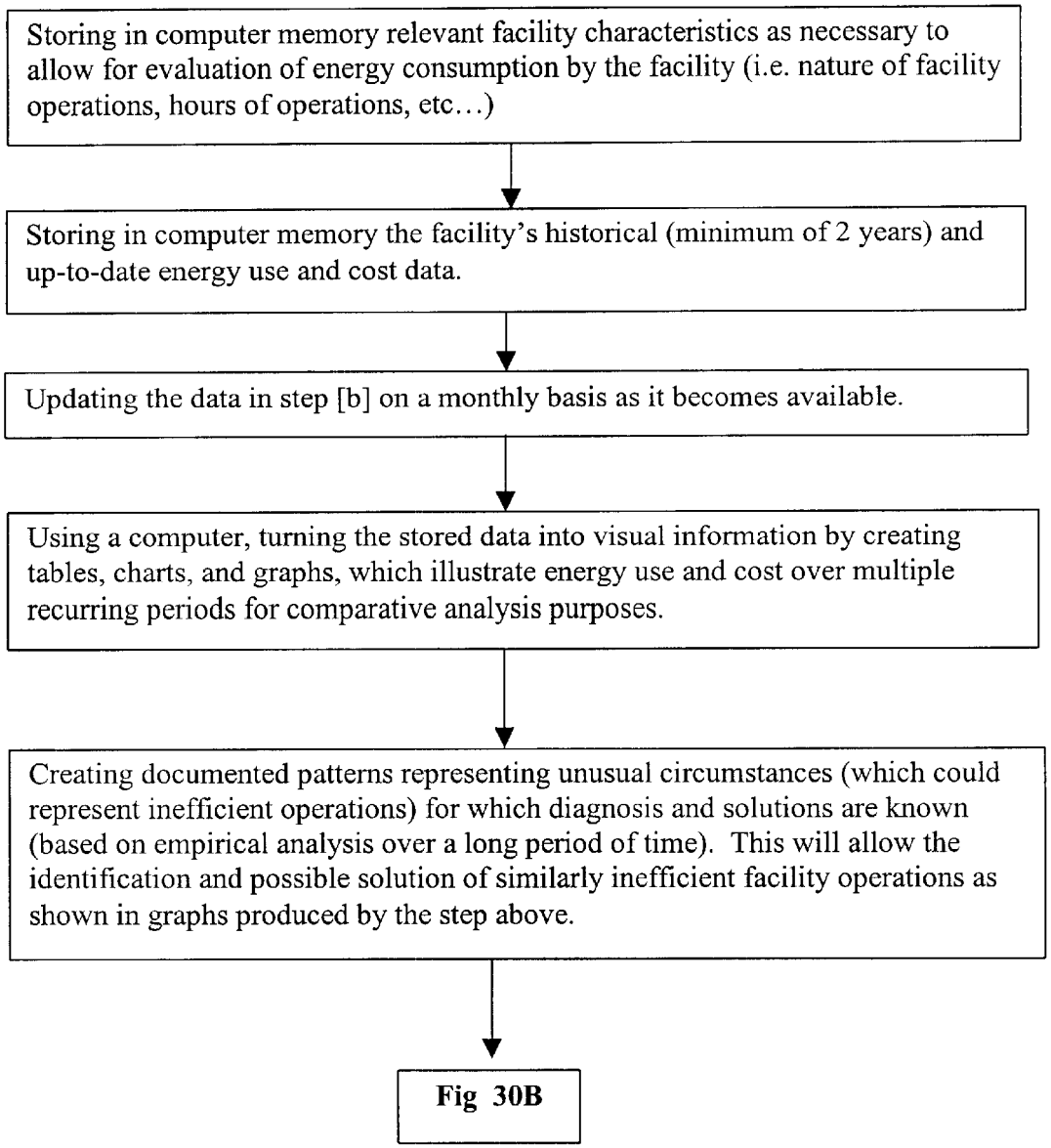
Figure 30B:
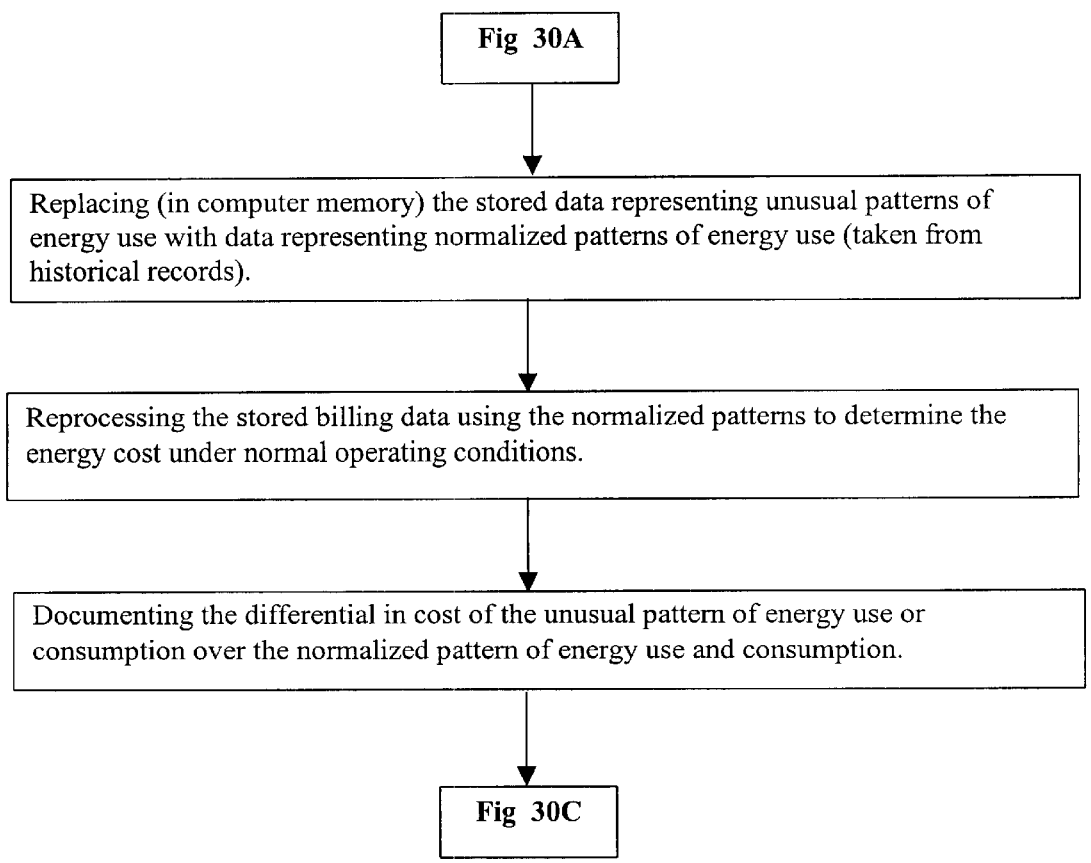

The instant method of the invention is drawn to a computer implemented method for visually analyzing current and historic patterns of energy consumption in a facility to which energy is supplied by one or more utilities each of which bill for the energy supplied over consecutive billing periods at rates which may vary during some billing periods in order to determine the presence of possible operating errors, equipment problems, or hard-to-detect billing errors. The computer implemented method, illustrated in the flow charts FIGS. 30A–30C comprises the steps of:

a. storing in computer memory data representing critical characteristics of the facility as necessary to allow for evaluation of energy consumption by the facility;

b. storing in computer memory data representing energy consumption by the facility throughout a billing period and the associated costs for such energy consumption;

c. repeating step (b) for subsequent billing periods to create historic and current stored data regarding the consumption of energy by the facility and the associated costs for such energy consumption;

d. processing the stored data, in a computer, to create single period graphs which illustrate and tabulate energy consumption for each billing period and to create multi-period graphs which illustrate and tabulate energy consumption during multiple extended periods formed of consecutive billing periods to allow visual comparison of energy consumption during one billing period with energy consumption during another billing period and to allow visual comparison of energy consumption during one extended period with the energy consumption during a second extended period; and e. creating documented patterns representing unusual circumstances which could represent inefficient operation of the facility, for which solutions are known based on analysis of energy consumption by several large facilities over long periods, to allow identification of the nature of similarly inefficient facility operation as shown in the graphs produced by step (d) and to allow identification of possible solutions.

The computer implemented method can further include the steps of:

i. replacing the stored data representing an unusual pattern of energy use or consumption by data representing a normalized pattern of energy use or consumption;

ii. reprocessing the stored data to calculate the effect on the cost under the normalized pattern of energy use or consumption; and iii. creating a chart which records the differential in cost of the unusual pattern of energy use or consumption over the normalized pattern of energy use or consumption.

iv. creating a projection of further costs per billing period based on the average consumption for selected prior billing periods, and v. calculating the projected costs for future billing periods using the current billing rates.

The method for analyzing energy consumption can further include analyzing energy consumption by a facility supplied by a utility whose billing rates include peak billing rates for energy consumption above a predetermined amount wherein step (a) includes the step of storing in computer memory data representing billing rates and peak billing rates and step (b) includes the step of storing in computer memory data representing peak levels of energy consumption during individual billing periods. Thereafter, step (e) can further include the step of:

creating documented patterns representing (1) excess demand spikes and humps and/or (2) frequent and/or erratic demand spikes and humps, or creating documented patterns representing daily peak demand set at odd hours, or creating documented patterns representing relatively high morning or nighttime energy consumption or relatively high weekend energy consumption, or creating documented patterns representing incorrect cycling of equipment, steady daily peak demand or energy consumption, unusually high energy consumption on certain days, chiller operations started early in April, or electric boiler operations started early in October may be detected via this important feature of the disclosed invention.

Additionally, the method for analyzing energy consumption includes the step of storing in computer memory weather data relating to the weather conditions prevailing immediately outside the facility during billing periods for which data is stored, and such that step (d) includes the step of including then weather data in at least some of the created graphs.

The System possesses the following capabilities that are unique to the System and are an integral part of the invention:

Data Input Capabilities

These capabilities relate to the type of informational data that is used in the System and that can be stored in the memory of a computer arranged and programed to assist in implementing the subject invention. The data may be stored in any type of computer memory (RAM, ROM, hard drive, floppy disc, CD or other) and may be displayed on computer monitors or printed in hard copy form or by other techniques. The data may be displayed on monitors or on data entry sheets that are an integral part of the Utilities Decision Support System and may be received and/or created by the software component of the System. The data input charts are illustrated in FIGS. 1–7 and are computer generated for display on a computer monitor or may be printed out on a computer operated printer. The graphs and charts of the remaining FIGS. 8–28 may also be displayed on a monitor or printed in hard copy form. Examples of the entry data and the arrangement that such data may take in the System are illustrated in FIGS. 1–7 as follows:

FIG. 1 illustrates the type of basic information about the facility that is necessary to implement the disclosed invention. Such information will typically include the normal operating hours 2, the gross square feet 4, and the function of the facility 6. FIG. 1 is a typical example of the type of data included in such basic information about the facility but other information could be included as appropriate to the type of energy being consumed by the facility and the rate structure of the utility that is supplying the energy. The significant element of the information is that it includes data that represents the critical characteristics of the facility as necessary to allow for the evaluation of energy consumption by the facility.

Figure 2A:
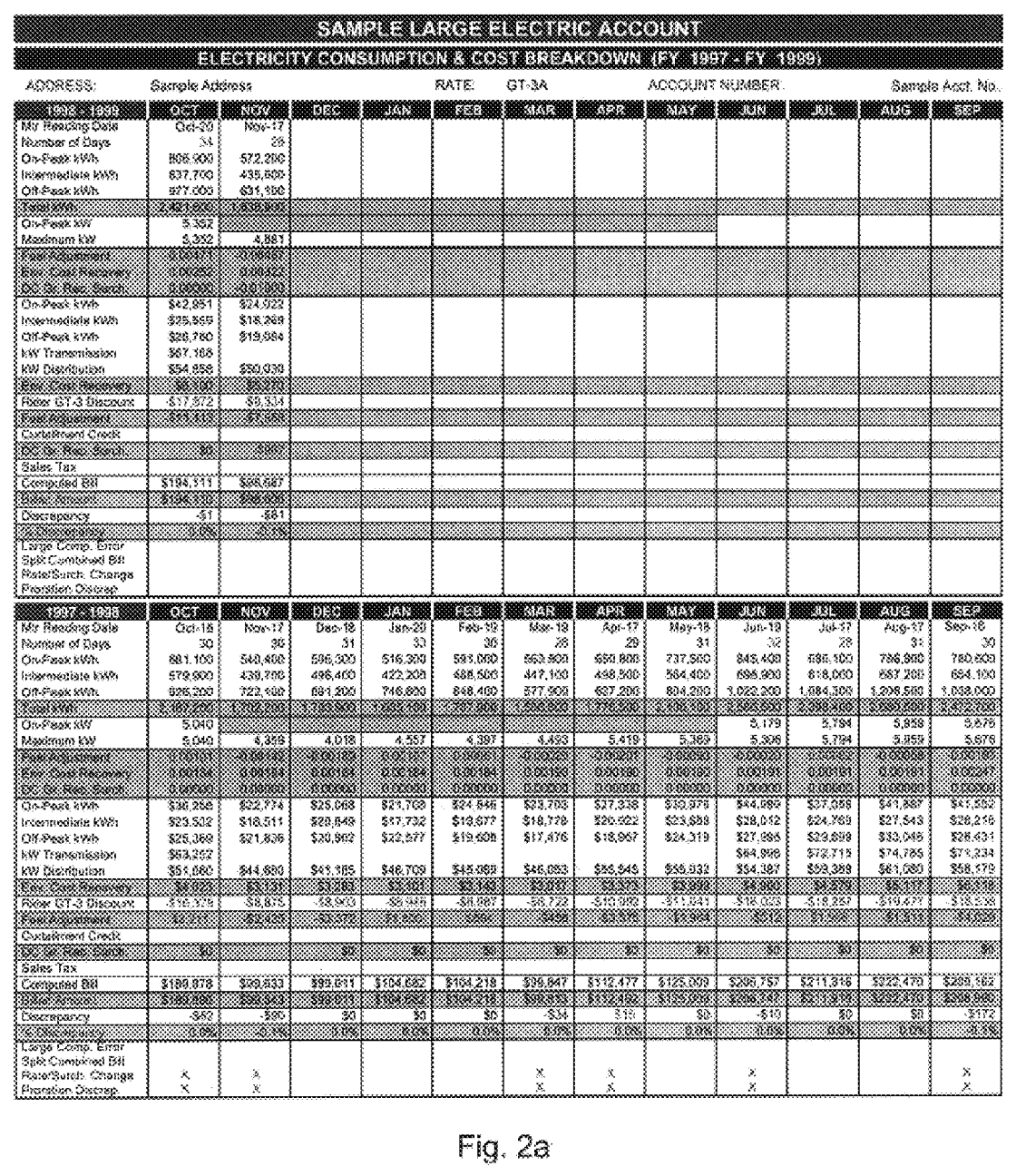

The chart illustrated in FIGS. 2A–2B covers a 36-month period and is used to analyze the mathematical accuracy of electric bills and illustrates the relationship between electric consumption factors and their corresponding costs. The components of each bill are entered in the top portion 8 of every table and the resulting total (at the bottom 10) is compared with the actual billed amount by the utility to insure the mathematical accuracy of the bill in question.

Figure 3A:
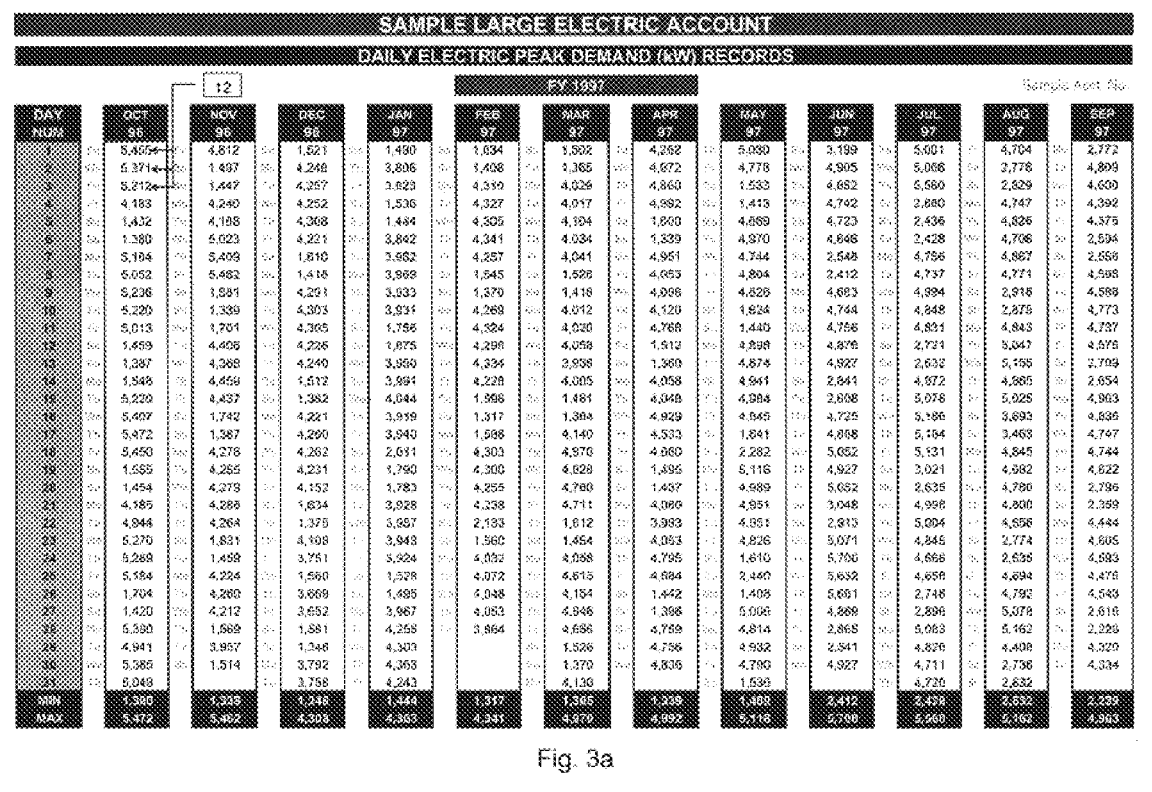
Figure 3B:
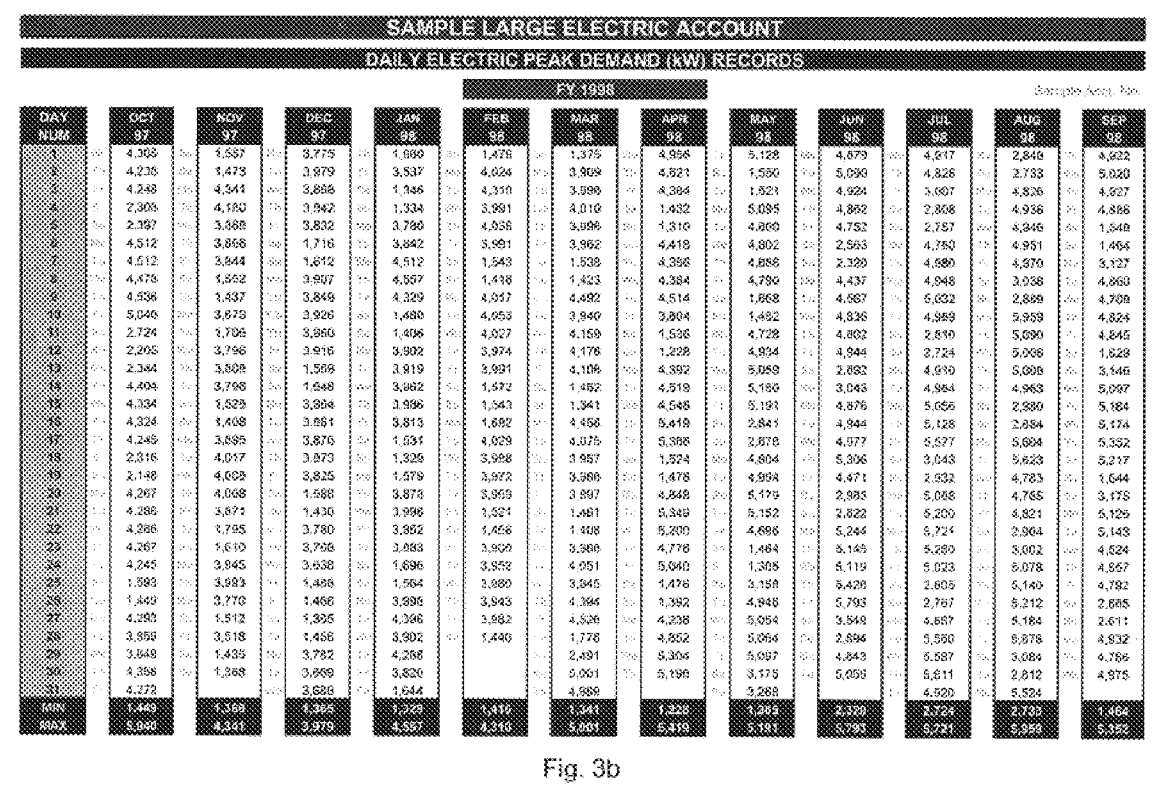

FIGS. 3A–3C illustrates a chart that provides data that is used to create "Daily Peak Electric Demand" graphs as will be desired in more detail below. The data recorded in this form is typical of the data used by an electric utility to calculate a customer's monthly bill. The data 12 includes the peak demand for electrical energy for each day of a defined 36 month period.

Figure 4A:
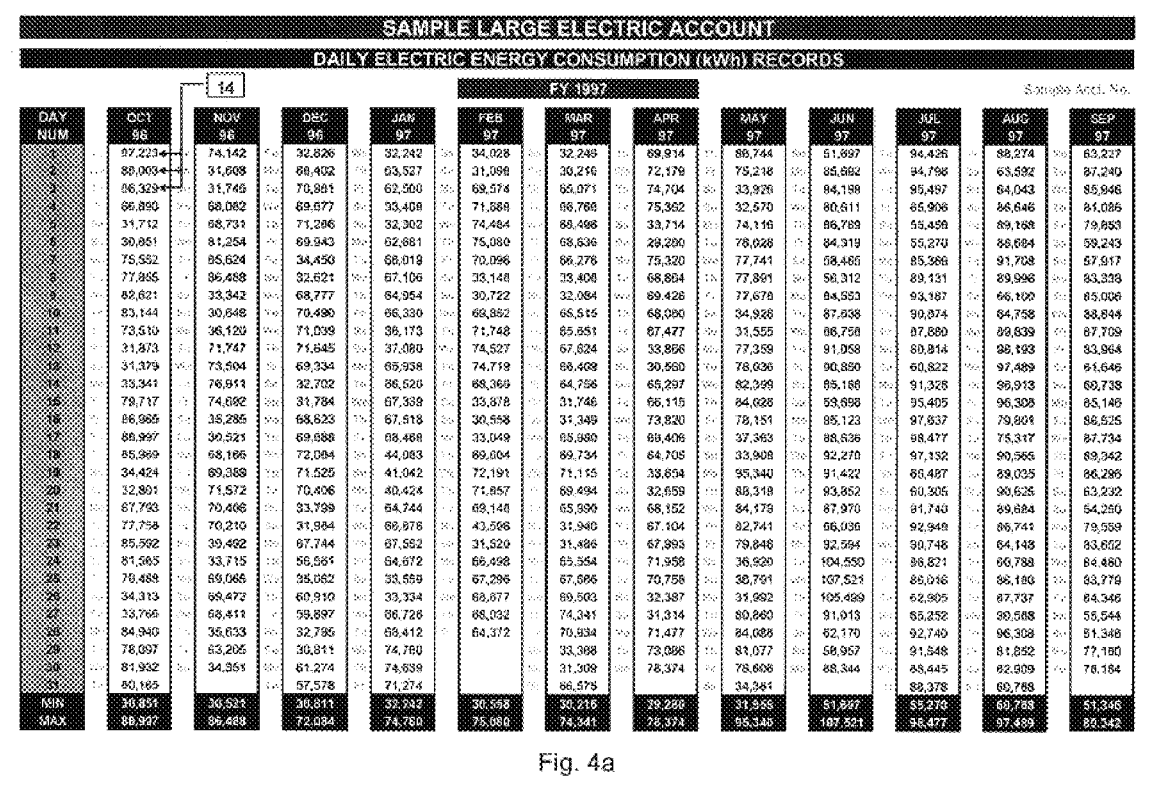
Figure 4B:
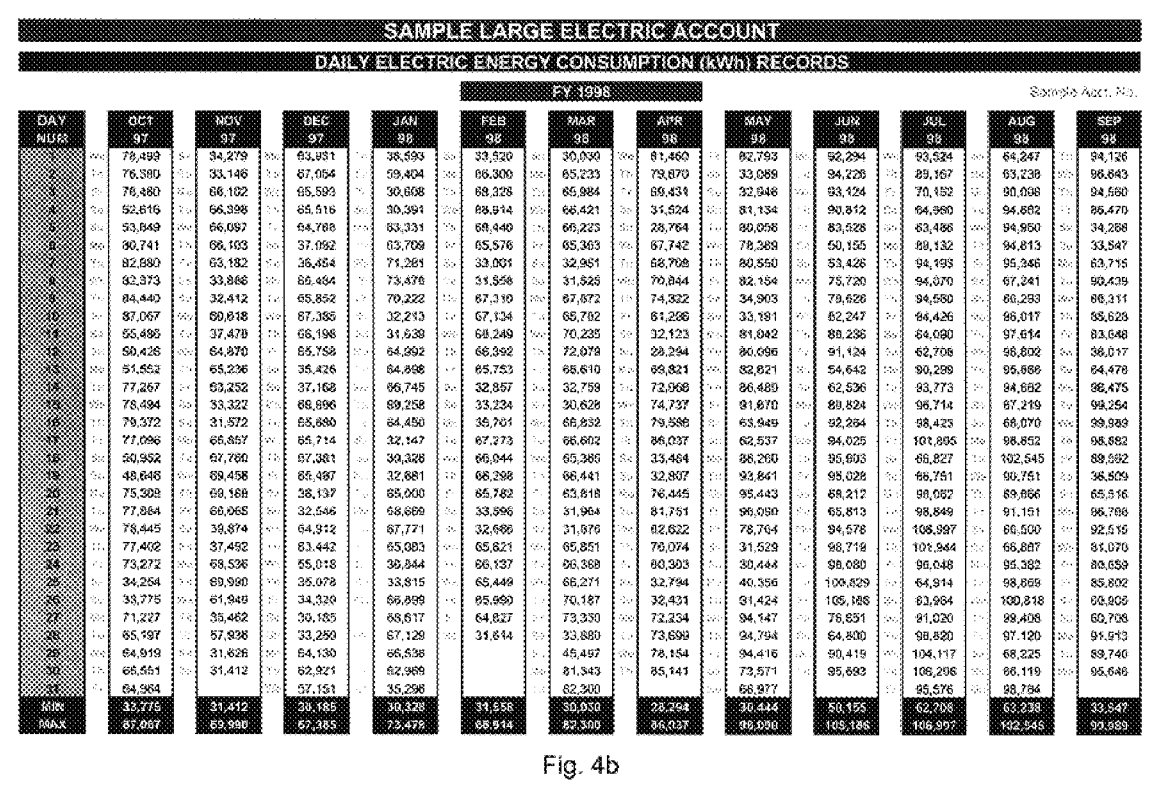

FIGS. 4A–4C illustrates a chart that provides the data that is used to create the "Daily Electric Energy Consumption Graphs." Each entry 14 represents the total energy consumed on each day of a 36 month period.

FIGS. 5A–5C illustrates a chart that provided the data that is used to create the "Daily Time Of The Peak Day Demand Graphs" to be described below. Each entry 16 represents the time on each day of a 36 month period on which peak electrical demand occurred.

FIGS. 6A–6C illustrates a chart that provides the data that is used to create the "Billing Peak day Graphs" which will be described in greater detail below. Each entry 18 represents the electrical usage in kilowatts (Kw) gathered on 15 minute by 15 minute, or 30 minute by 30 minute, intervals throughout each day sampled for Fiscal Year 1997–1999.

Figure 7A:
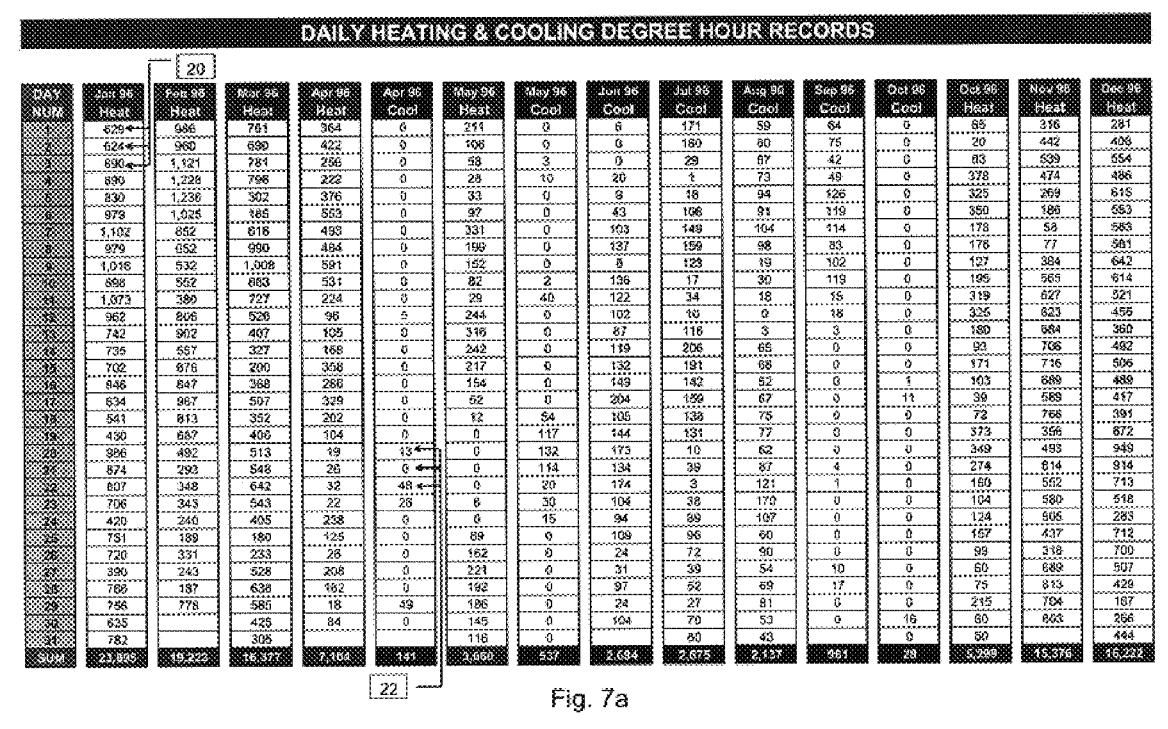
Figure 7C:
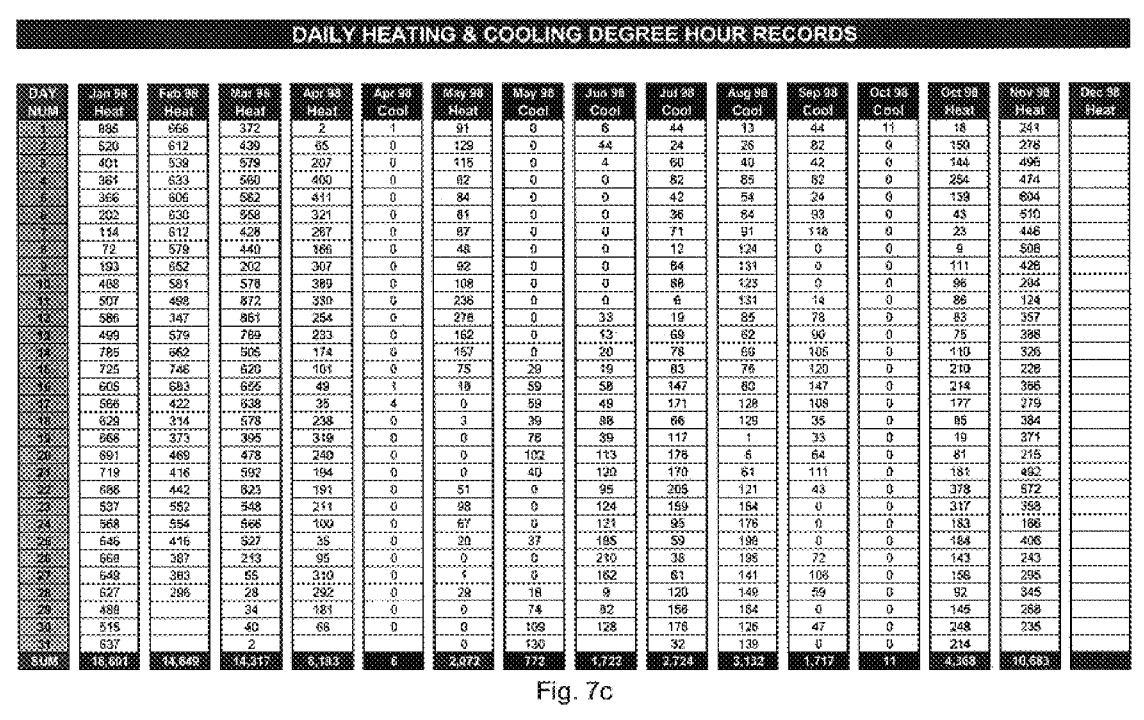

FIGS. 7A–7C illustrates a chart that provides the daily heating and cooling degree hour records for a thirty six-month period for a given facility. Each entry 20 represents the daily degree hours for a heating period; while each entry 22 represents the daily degree hours for a cooling period.

Data Processing Capabilities

These capabilities involve processing the data entered in the above charts into detailed tables and graphs encompassing a 36-month period and generating detailed numeric analyses of the billing information entered in the "Electricity Consumption and Cost Breakdown Form." These capabilities are an integral part of the Utilities Decision Support System and are implemented by the software component of the System as will be described in greater degree below.

Figure 8:
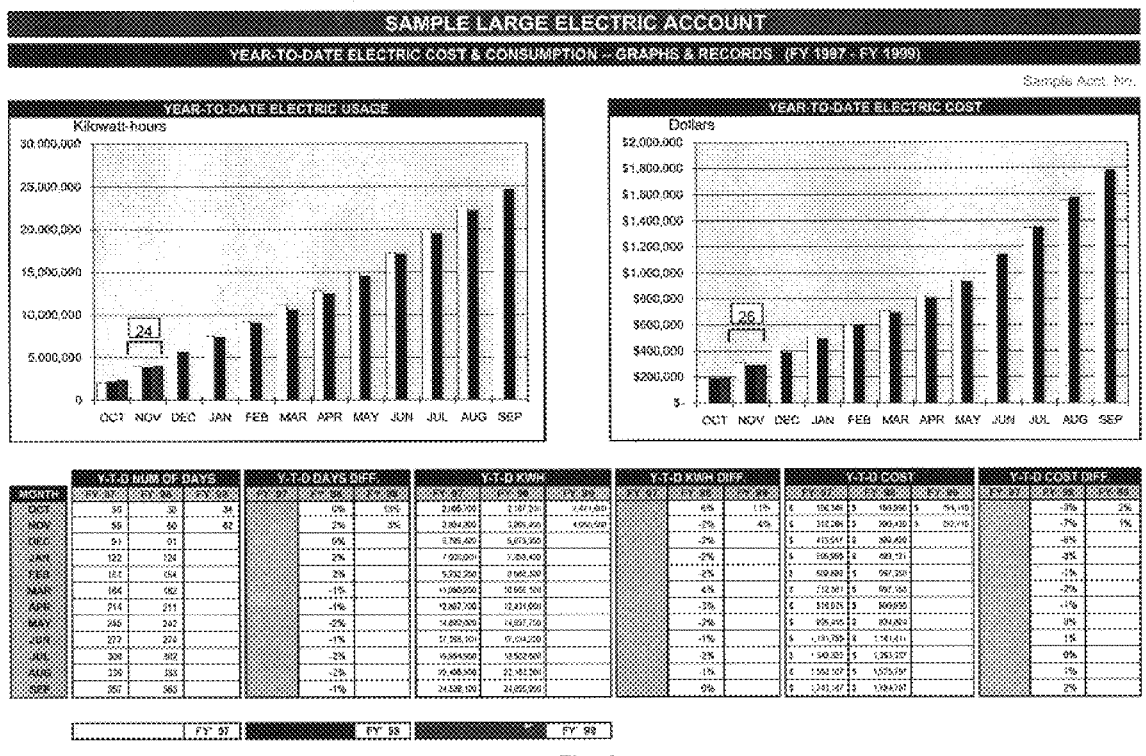
FIG. 8 is an illustration of graphs and data charts disclosing year-to-date electric cost and consumption in chart and graph form.

FIG. 8. illustrates graphs that are of critical importance in allowing comparison year to year of the monthly electrical consumption and cost over 3 consecutive fiscal years. In particular, graphs at the top of FIG. 8 illustrate and tabulate the year-to-date electric consumption and cost patterns, respectively, and how they compare to the consumption and cost trends of the last two fiscal years. Still more particularly, bar graphs 24 illustrate the comparative totals of the electrical consumption for the first two months of fiscal years '97, '98 and '99 where the first month of each fiscal year is October of the preceding calendar year. Bar graphs 26 similarly show the comparative costs for the first two months of each of the same three fiscal years. The charts at the bottom of FIG. 8 illustrate the number of days for each of the monthly periods and the percent differences to assist in interpreting the data illustrated in the graphs.

Figure 9:
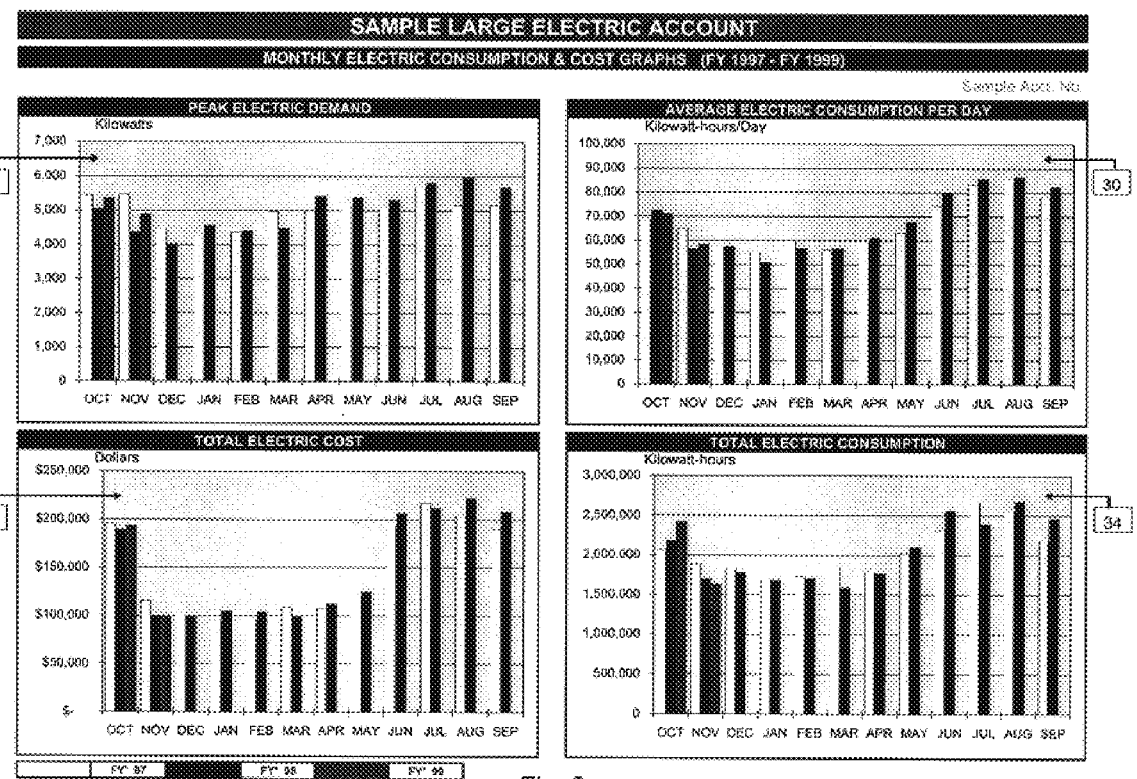
FIG. 9 is an illustration of graphs disclosing monthly electric consumption and cost.

The graphs of FIG. 9 illustrate the monthly electric demand 28, average electric consumption per day 30, and total electric costs patterns 32, total electric consumption 34 as well as how they compare to the monthly consumption and cost trends of the last two fiscal years.

Figure 10:
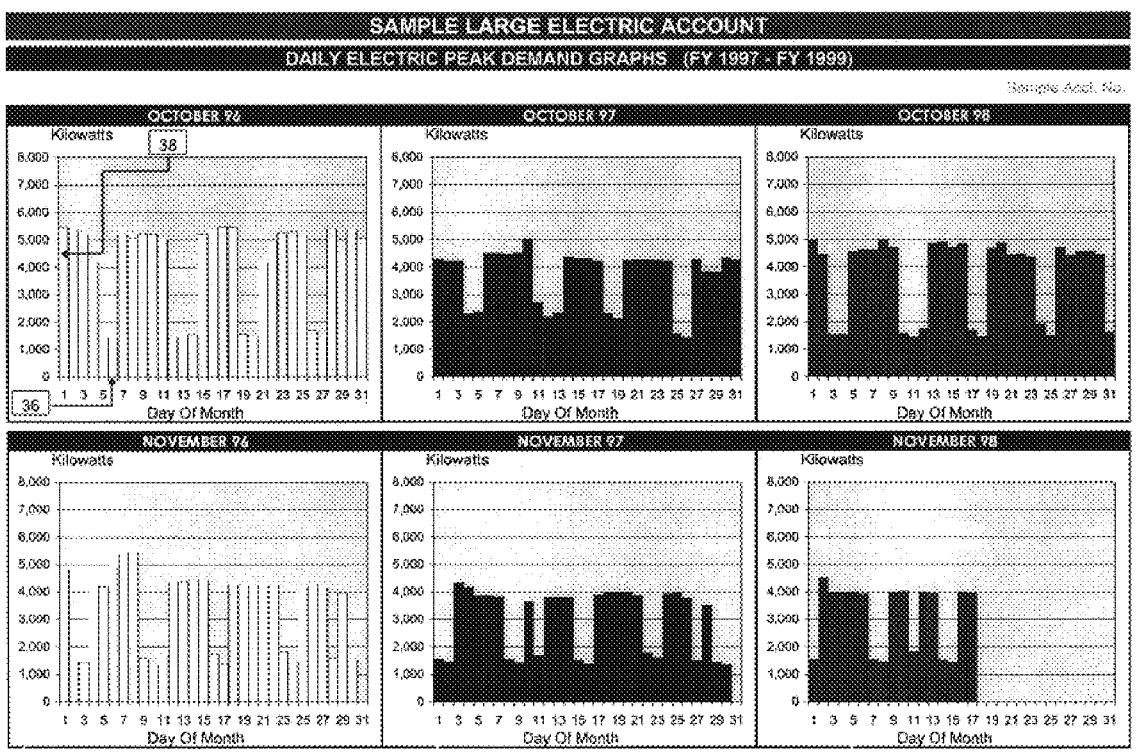
FIG. 10 is an illustration of graphs disclosing daily electric peak demand.

The graphs in FIG. 10 illustrate the daily electric peak demand pattern for each month of the current and two prior fiscal years. For purposes of brevity, only the months of October and November for each of the fiscal years '97, '98 and '99 are illustrated. Each graph discloses the day of the month on the abscissa 36 and the peak value for that day in kilowatts along the ordinate 38. A full set of comparative graphs would include graphs of all months of the calendar year. It should be noted that FIG. 10 (like FIGS. 11–13, and 17A–17C) display the graphs for the same month of each fiscal year in side-by-side juxtaposition. This method of display will facilitate visual comparison and highlight anomalies that may warrant further analysis such as "what if" analysis as described with respect to FIG. 14. These graphs are particularly useful in detecting anomalous peak demands should one occur as will be discussed below.

Figure 11:
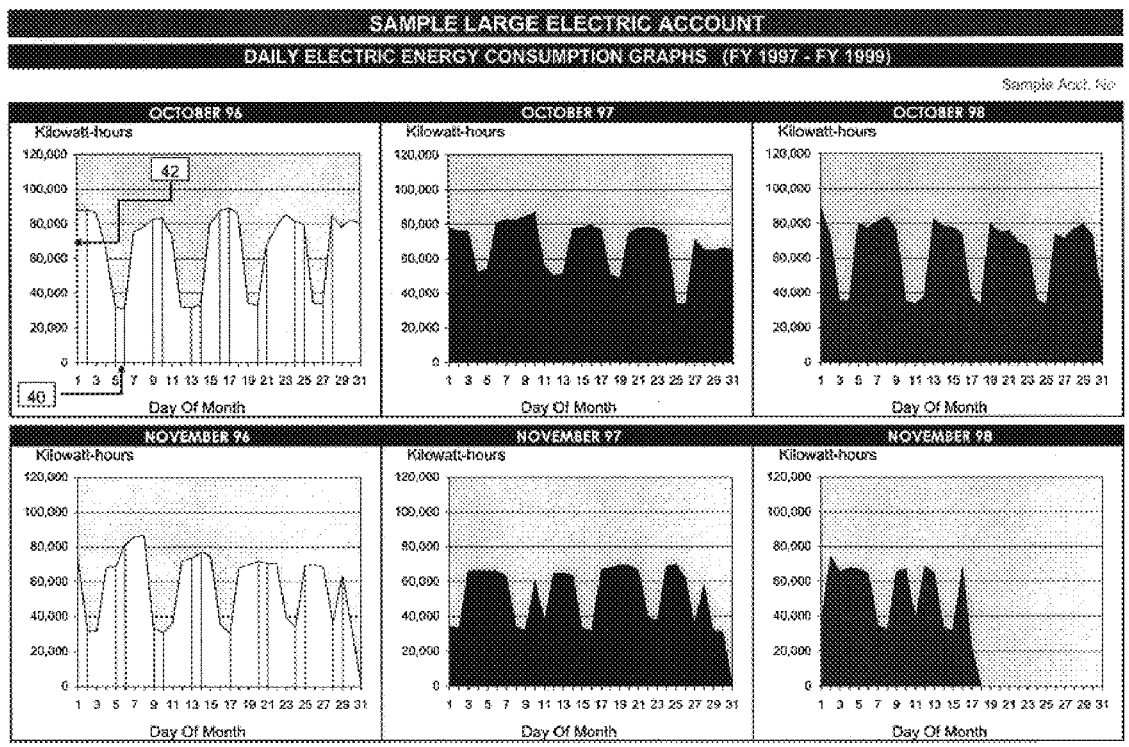
FIG. 11 is an illustration of graphs disclosing daily electric energy consumption.

The graphs of FIG. 11 illustrate the daily electric energy consumption pattern for each month of the current and two prior fiscal years. These graphs are quite similar in format with the graphs of FIG. 10. For illustration purposes, FIG. 11 includes graphs for only the months of October and November. A complete set would include three graphs for each month of the three fiscal years for a total of 36 graphs. Along the abscissa 40 of each graph is the day of the month and along the ordinate 42 is the energy consumed that day in kilowatt-hours.

Figure 12:
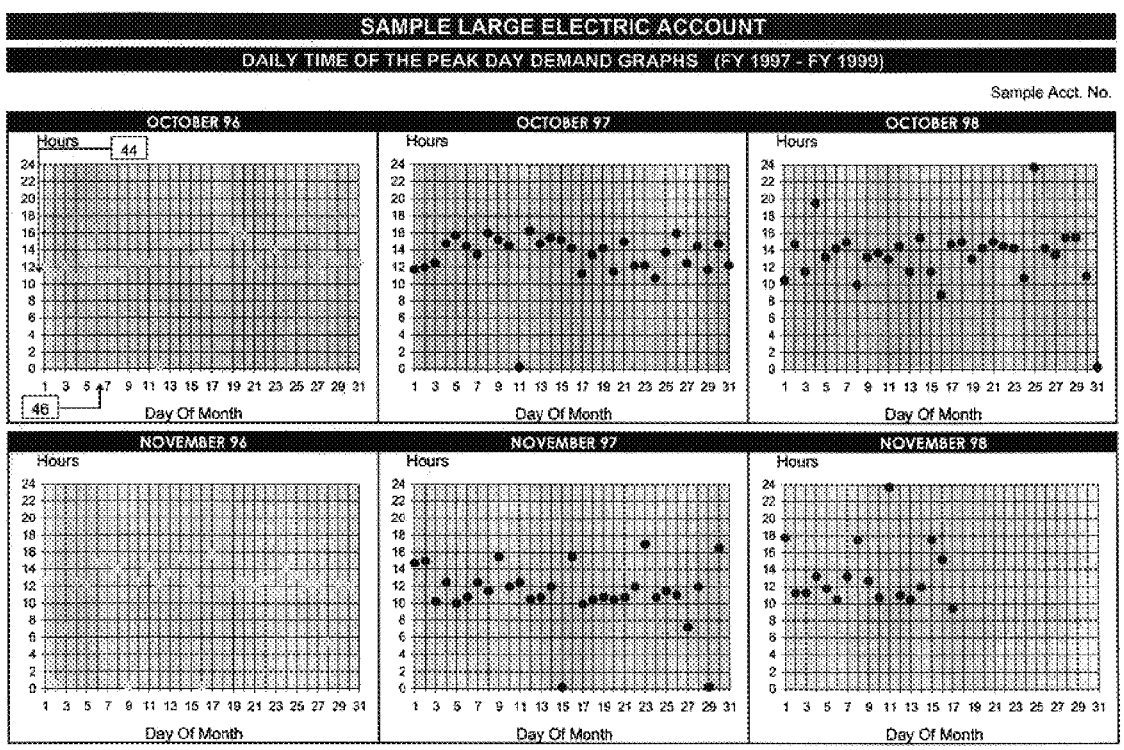
FIG. 12 is an illustration of graphs disclosing daily time of the peak day demand.

The graphs of FIG. 12 illustrate the time of the peak demand pattern for each day of the month for the current and two prior fiscal years. Again only the 6 graphs required for the months of October and November are included for illustrative purposes. A full set would include 36 graphs. By organizing these graphs in side by side monthly formats, anomalous occurrences of peak demand on any day of the month (shown on the abscissa 46) with respect to the time of day (shown on the ordinate 44) will become readily apparent.

Figure 13:
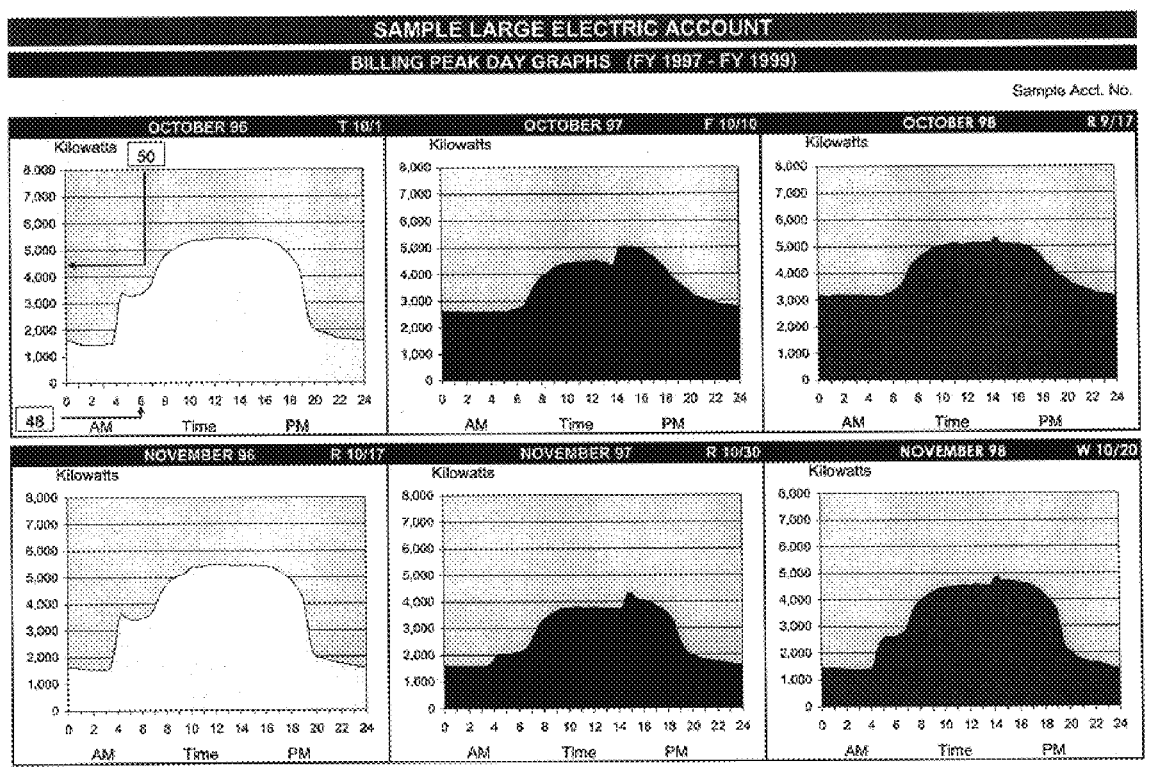
FIG. 13 is an illustration of graphs disclosing billing peak day.

The graphs in FIG. 13 illustrate the energy consumption pattern of the day with the highest peak demand for each month of the current and two most recent fiscal years. A full set of such graphs would include a total of 36 graphs. Only October and November months are included for the sake of brevity. The abscissa 48 shows the time of day of the day in a particular month when the peak demand for that month occurred. The ordinate 50 shows the magnitude of the demand such that the graph illustrates how the demand varied over the 24 hour period of the day.

Figure 14:
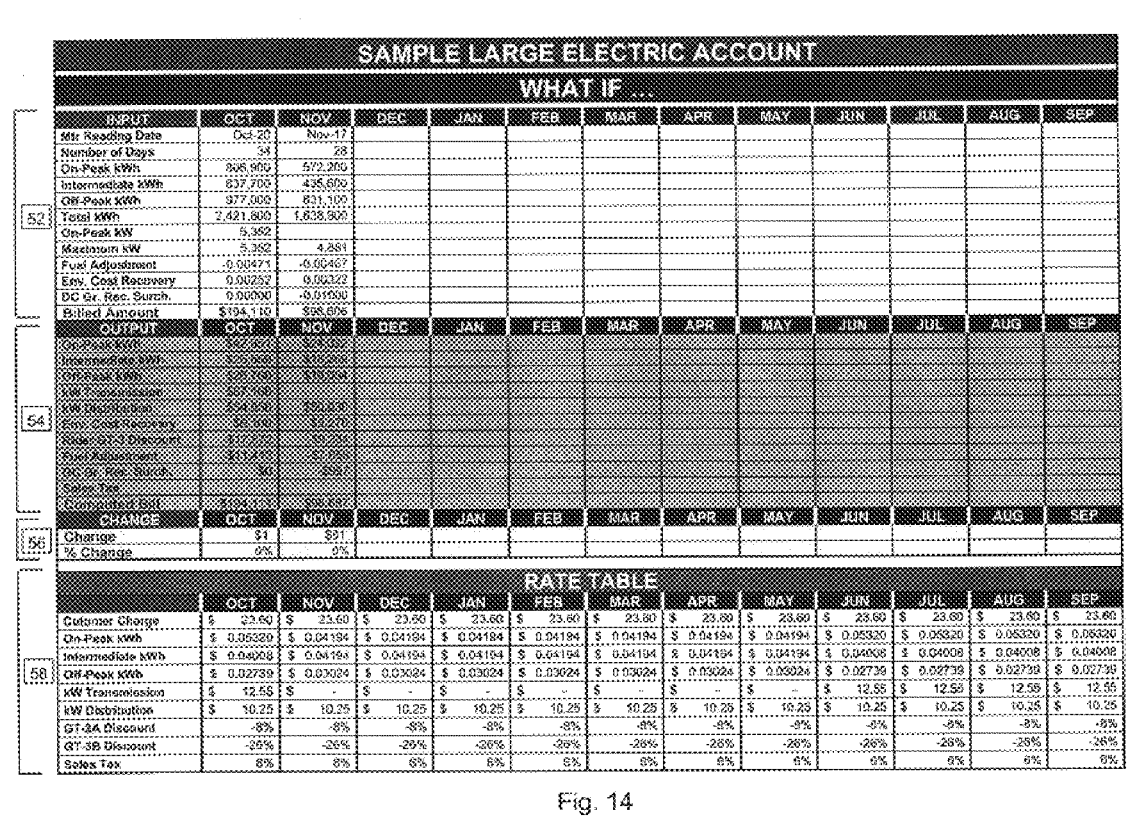

The chart illustrated in FIG. 14 demonstrates an important function of the computer implemented System. In particular, this computer generated chart (which may take the form of a specialized spreadsheet with appropriate embedded mathematical capabilities) enables the user to formulate various energy use and rate change scenarios and examine their effects on electric costs. The chart is divided into four sections; the input section 52 represents the billing data from which costs are derived. This section initially shows the most recent actual billing data. When a computer is programed to implement the present invention, it will enable a user to alter the data included in input section 52 based on desired or projected changes in electric consumption or demand. The output section 54 calculates the new electric costs based on the changes entered in the input section 52. The resulting differences in cost, as reflected in the change section 56, indicate corresponding savings or costs. The rate table 58 at the bottom of the chart below allows the user to modify individual rate components and examine the corresponding changes in cost with regard to the specified energy data. The chart of FIG. 14 illustrates a very important feature of the subject invention. In particular, the chart of FIG. 14 allows the analyst to take ask hypothetical "what if" questions to determine the effect on consumption and costs under a variety of different scenarios. FIG. 14 is extremely useful in furthering the overall purpose of the subject invention by augmenting the function of the graphs of FIGS. 8 through 13 which provide an analyst (facility manager/agent) with graphic information that facilitates visual comparison on an hourly, daily, monthly and yearly basis to help to identify anomalous circumstances. However, FIG. 14 adds to the function of the graphs of FIGS. 8 through 13. In particular FIG. 14 illustrates a function of the computer implemented System embodying this invention which allows the analyst to pinpoint the exact cost of the anomaly as well as to experiment with various energy consumption scenarios and to gauge their potential savings.

Figure 15:
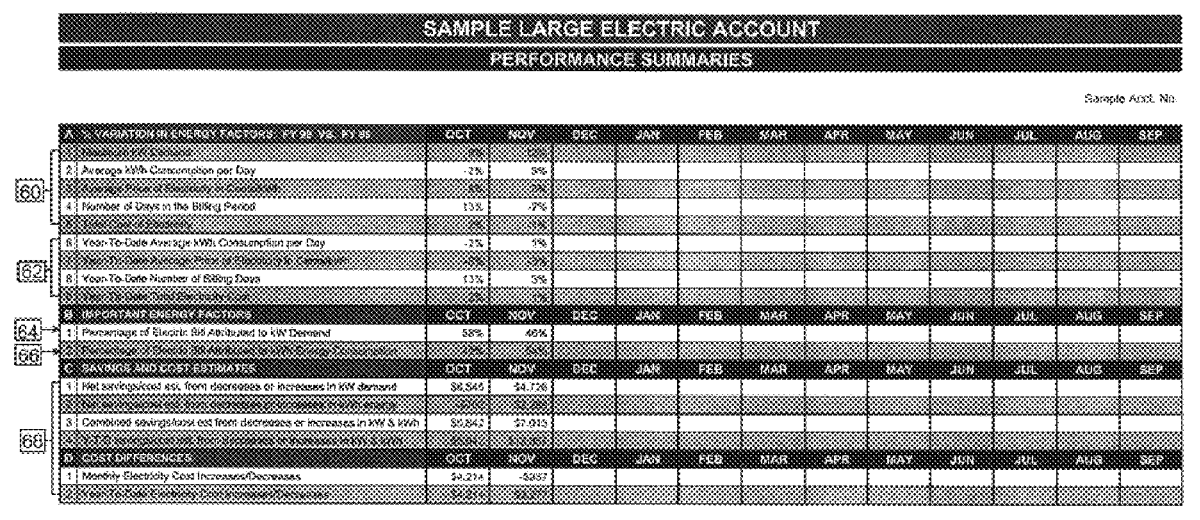

FIG. 15 illustrates a chart for facilitating yet another important computer implemented function of the subject System in that it demonstrates how monthly changes 60 and year-to-date changes 62 in electricity consumption, price, and number of billing days affect the overall changes in electricity costs and provides the monthly percentage contribution of the electric consumption 66 and the peak demand 64 to the total electric cost. It also displays in section 68 the results of calculations in the savings and costs associated with changes in electricity usage from the previous year.

Figure 16:
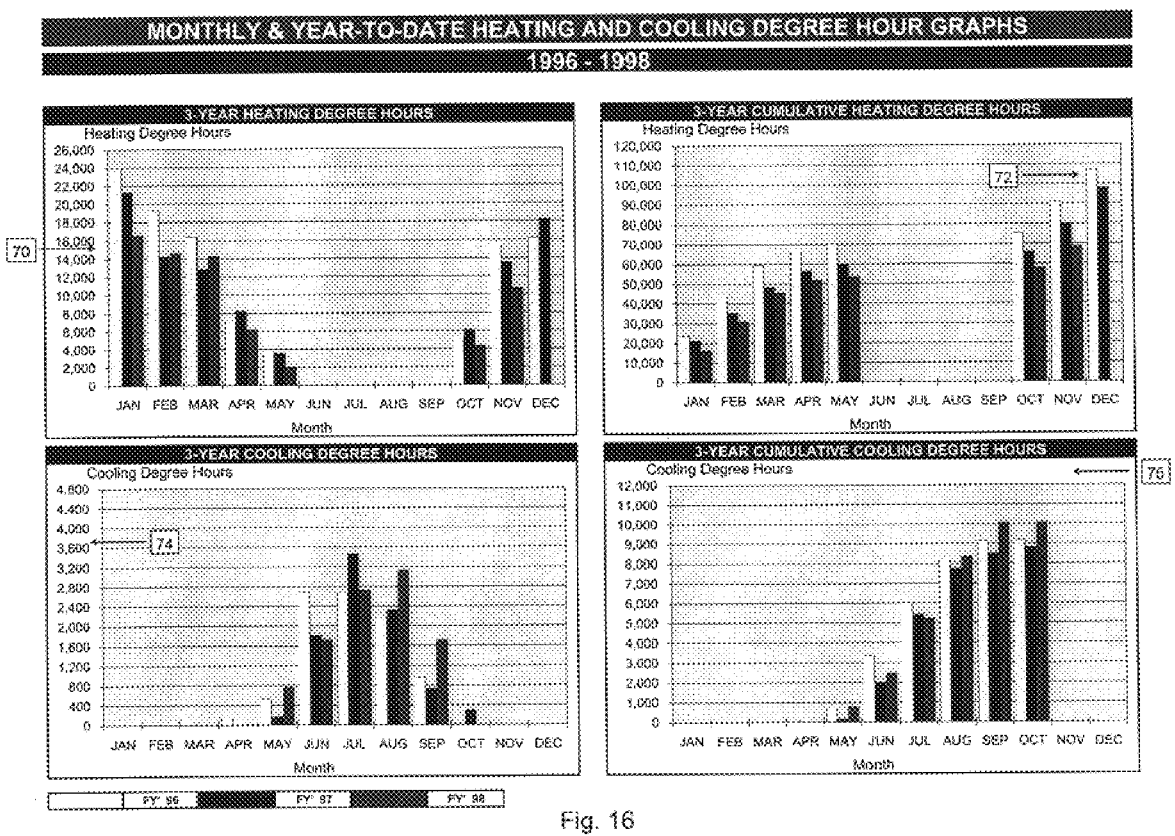
FIG. 16 is an illustration of graphs disclosing monthly and year-to-date heating and cooling degree hour.

FIG. 16 illustrates a plurality of graphs that represent the patterns of the monthly and year-to-date heating and cooling degree hours for the current and two most recent calendar years. Heating degree hours are calculated by taking the difference between dry bulb temperatures less than 65 degrees Fahrenheit for a particular hour and a base temperature of 65 degrees Fahrenheit. Cooling degree hours are based on the effective temperature (E.T.) scale developed by the American Society of Heating Refrigeration and Air Conditioning Engineers (ASHRAE). Graph 70 illustrates the 3-year heating degree hours and graph 72 represents the 3-year cumulative heating degree hours. Graph 74 represents the 3-year cooling degree hours while graph 76 demonstrates the cumulative cooling degree hours.

Figure 17A:
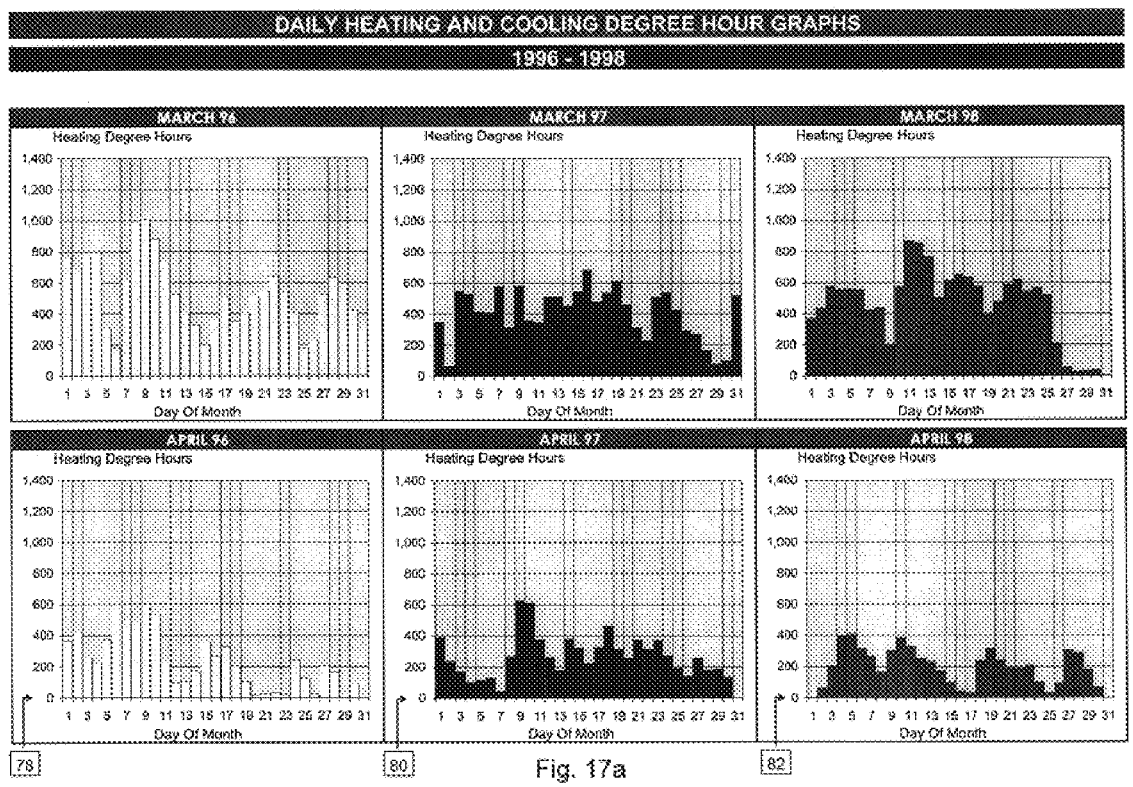
FIGS. 17A–17C are illustrations of graphs disclosing daily heating and cooling degree hour.
Figure 17B:
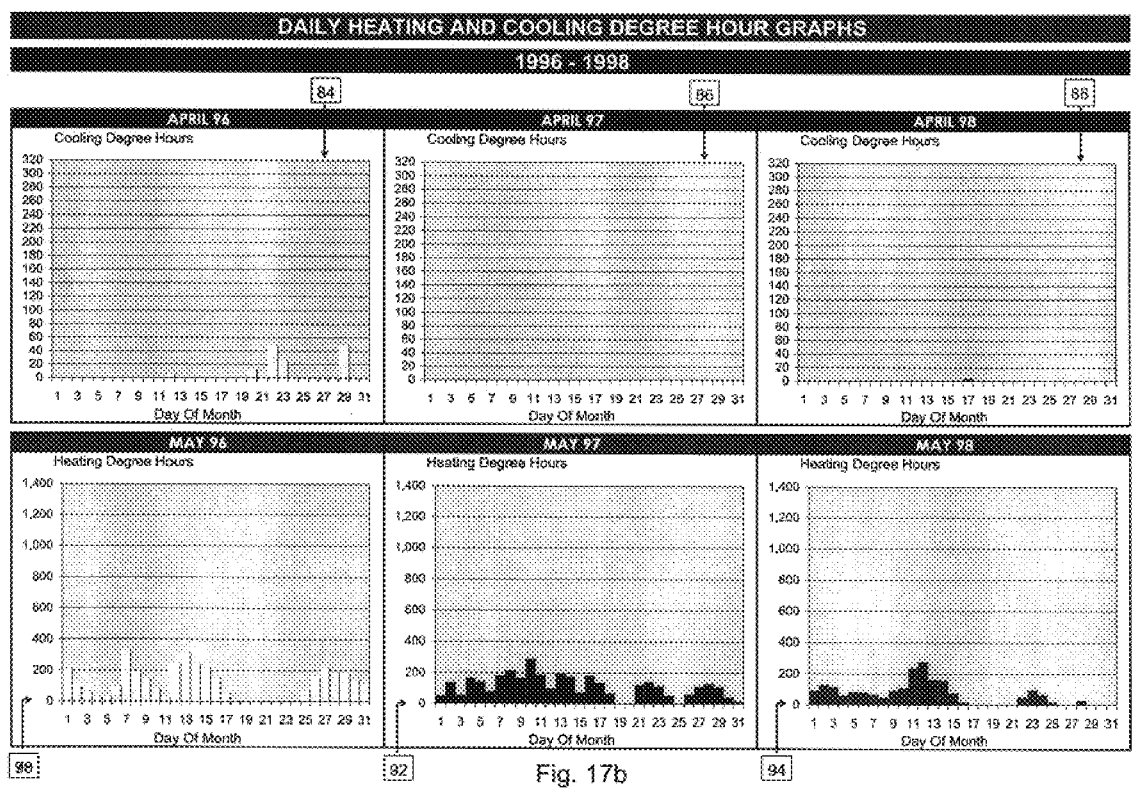
Figure 17C:
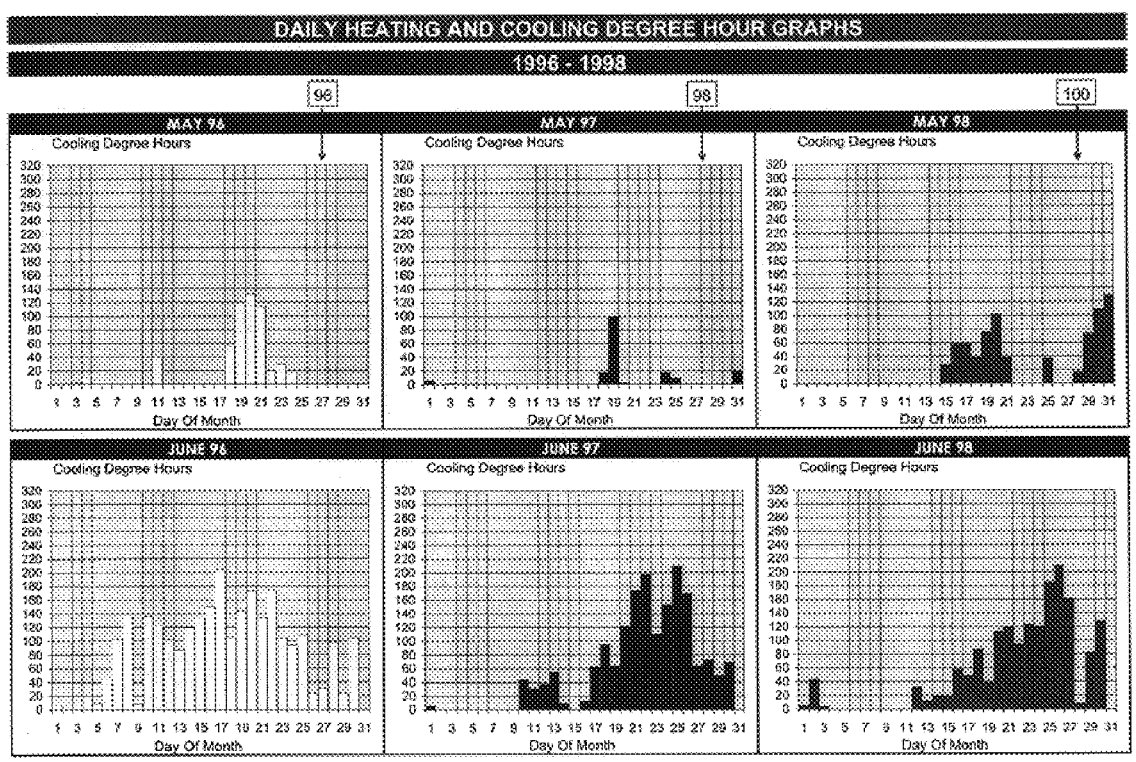

FIGS. 17A–17C illustrate a set of graphs that show the monthly patterns of daily heating and cooling degree hours for the current and two most recent calendar years. A full set of such graphs would include far more graphs organized such that the same month of each of the three years can be placed in side-by-side juxtaposition to allow comparable periods of each year to be more readily compared. For brevity, only the months of March, April, May and June are illustrated. The three graphs 78, 80, 82 at the bottom of FIG. 17A and the three graphs 84, 86, and 88 at the top of FIG. 17B demonstrate that during April, both heating and cooling was required in the facility which is the subject of the graphs. The three graphs 90, 92 and 94 at the bottom of FIG. 17B and the three graphs 96, 98, 100 at the top of FIG. 17C similarly demonstrate the need for both heating and cooling during the months of May for the three fiscal years illustrated in these graphs.

Data Analysis Capabilities

These capabilities assist in the interpretive analysis of the graphs, patterns, and numerical information generated by the Utilities Decision Support System of this invention. These capabilities can be implemented by a general purpose digital computer programed with software written to implement the important functional steps described in this Description of the Preferred Embodiments. As will be discussed in more detail below, unusual energy consumption and peak demand patterns that do not correlate with the weather or to the facility's normal function and hours of operations are matched against documented unusual patterns described below to provide an understanding of the nature of the problem that created the unusual pattern in question. The documented unusual patterns may be based on an analysis of several years (e.g. 10 years) of empirical data collected from a multitude of large facilities. To determine the effect of the problem on costs, the actual bill for the period in question is modified and "normalized" data is substituted for the unusual data with the resulting cost subtracted from the cost on the original bill. This function may be accomplished using the "What If . . . " capability of the Utilities Decision Support System of this invention as described above with respect to the form illustrated in FIG. 14. The difference between the two costs represents the effect of the problem on costs. "Normalized" data are selected from visual evaluation of current and historical patterns in which no apparent errors have been identified in FIGS. 8 through 13.

FIGS. 18 through 27 disclose charts, each of which illustrates a different type of unusual pattern indicative of a particular inefficient operation that has been identified by studies over several years of empirical data derived from a large number of facilities that use electrical energy supplied by a utility. For each type of inefficient operation, the characteristics of the problem, the criteria for classifying the problem, the explanation of the likely reason for the problem, how to estimate the cost of the problem, and recommendations on how to avoid the problem from occurring again in the future are disclosed in the chart.

Figure 18:
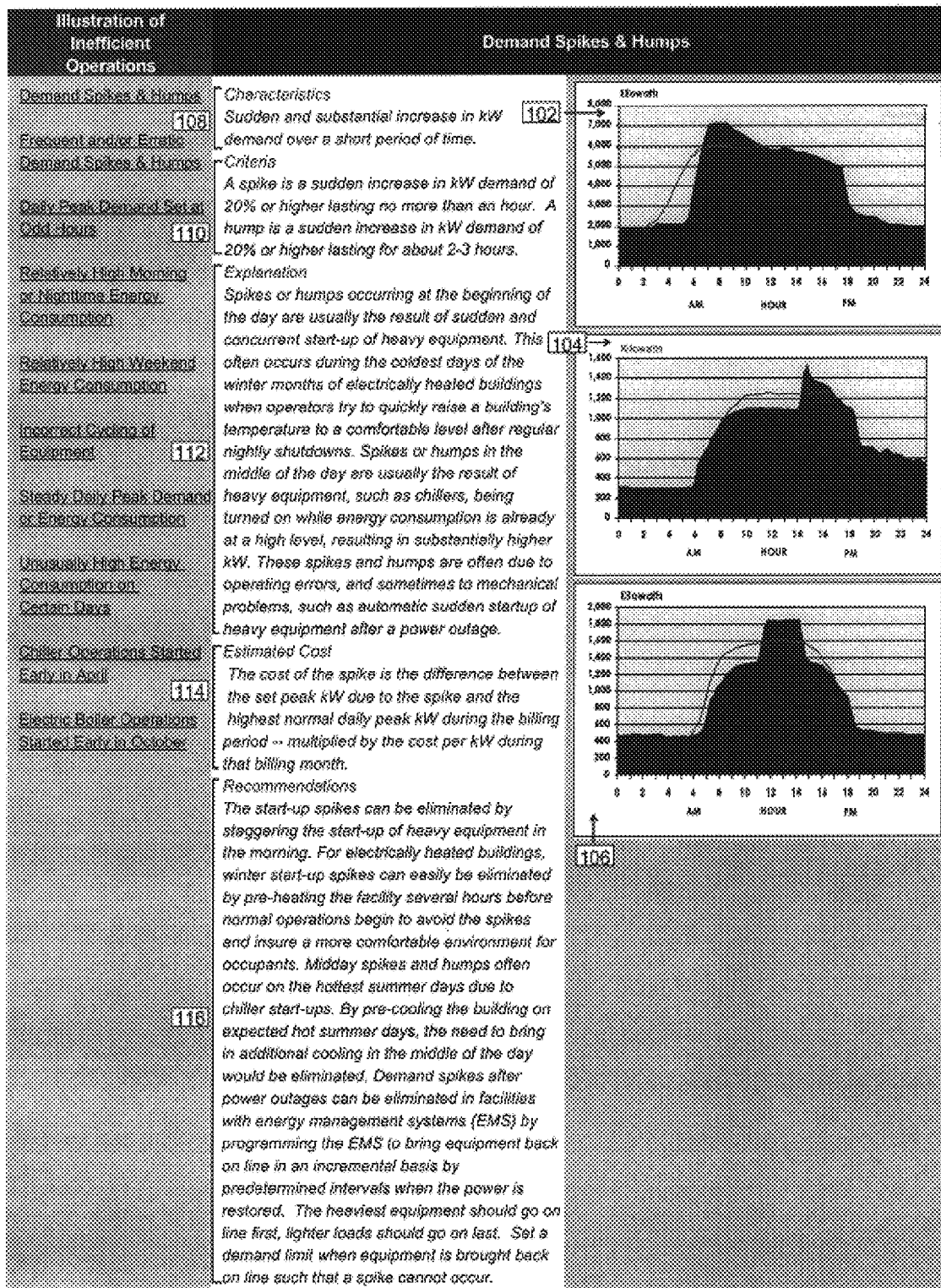
FIG. 18 is an illustration of a chart disclosing inefficient demand spikes and humps.

For example, FIG. 18 describes the type of inefficient operation that results in demand spikes and humps. Operation causing spikes and humps will cause graphs of the electrical consumption per hour (such as illustrated in FIG. 13) to take the form illustrated in graphs 102, 104, 106 on the left side of FIG. 18. The chart illustrated in FIG. 18 includes a statement 108 of the characteristics of the illustrated inefficient operation. Also included in chart of FIG. 18 is the criteria 110 of determining if the type of problem exists that might lead to the type of graphs illustrated in the chart. For example, the chart of FIG. 18 explains that a spike is a sudden increase in kW demand of 20% or higher lasting no more than an hour. A hump is defined as a sudden increase in kW demand of 20% or higher lasting for about 2–3 hours. An explanation 112 of some of the possible causes is included. For example, the chart of FIG. 18 states that spikes or humps occurring at the beginning of the day are usually the result of sudden and concurrent start-up of heavy equipment. This often occurs during the coldest days of the winter months of electrically heated buildings when operators try to quickly raise a building's temperature to a comfortable level after regular nightly shutdowns. Spikes or humps in the middle of the day usually the result of heavy equipment, such as chillers, being turned on while energy consumption is already at a high level, resulting in substantially higher kW demand. These spikes and humps are often due to operating errors, or sometimes to mechanical problems, such as automatic sudden startup of heavy equipment after a power outage.

The chart of FIG. 18 also provides a guide 114 for estimating the cost of spikes and humps of the type illustrated in the graphs 102, 104, 106 is also included. Finally, recommendations 116 for eliminating the problem are offered.

Figure 19:
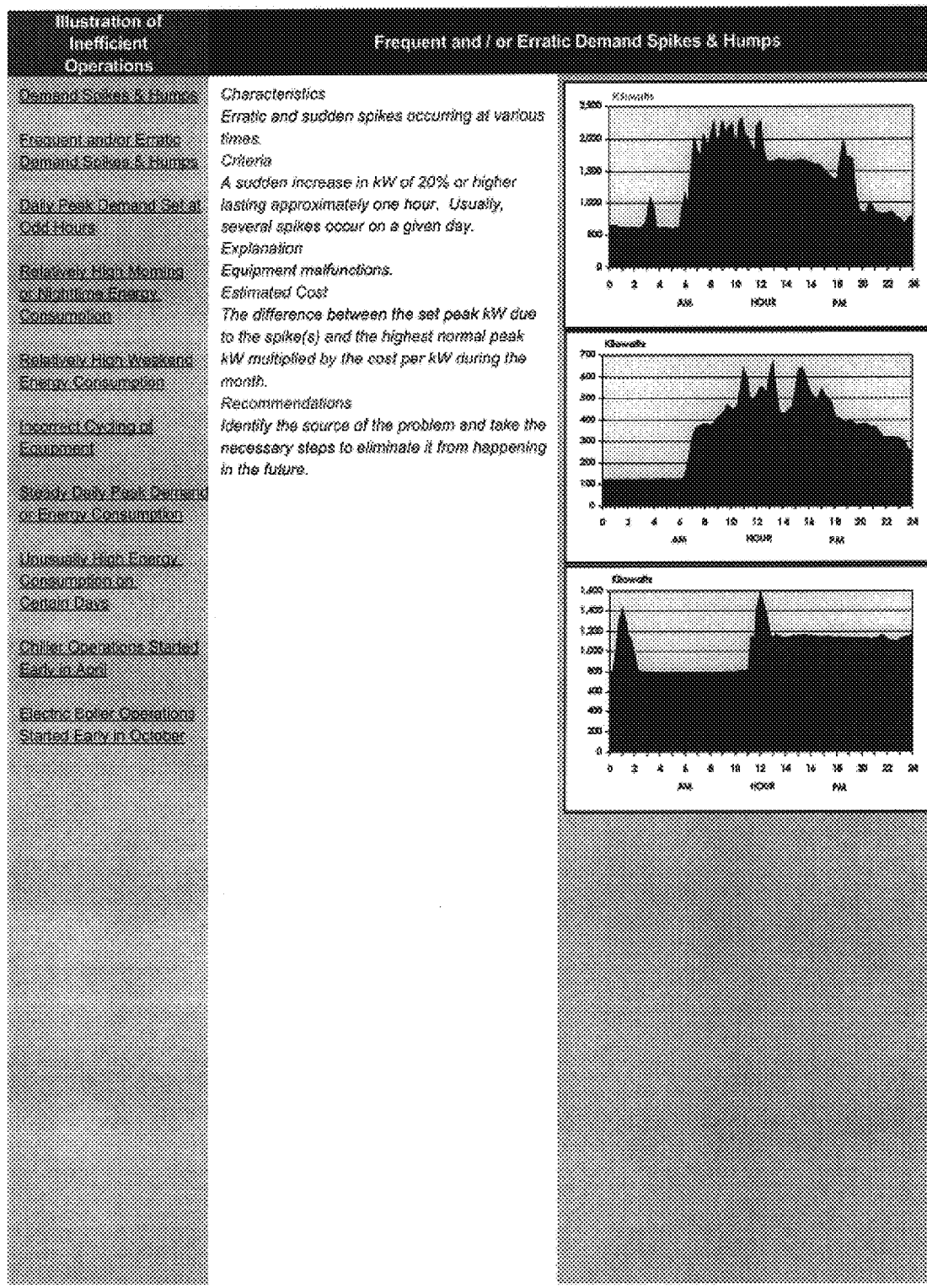
FIG. 19 is an illustration of a chart disclosing inefficient frequent and/or erratic demand spikes and humps.

The same format for identifying, understanding, analyzing, cost estimating and correcting inefficient, hard-to-detect problems in the operation and/or equipment functioning associated with the consumption of electrical energy within a facility is provided in the charts illustrated in FIGS. 19 through 27 as follows:

FIG. 19: Frequent and/or Erratic Demand Spikes & Humps.

Figure 20:
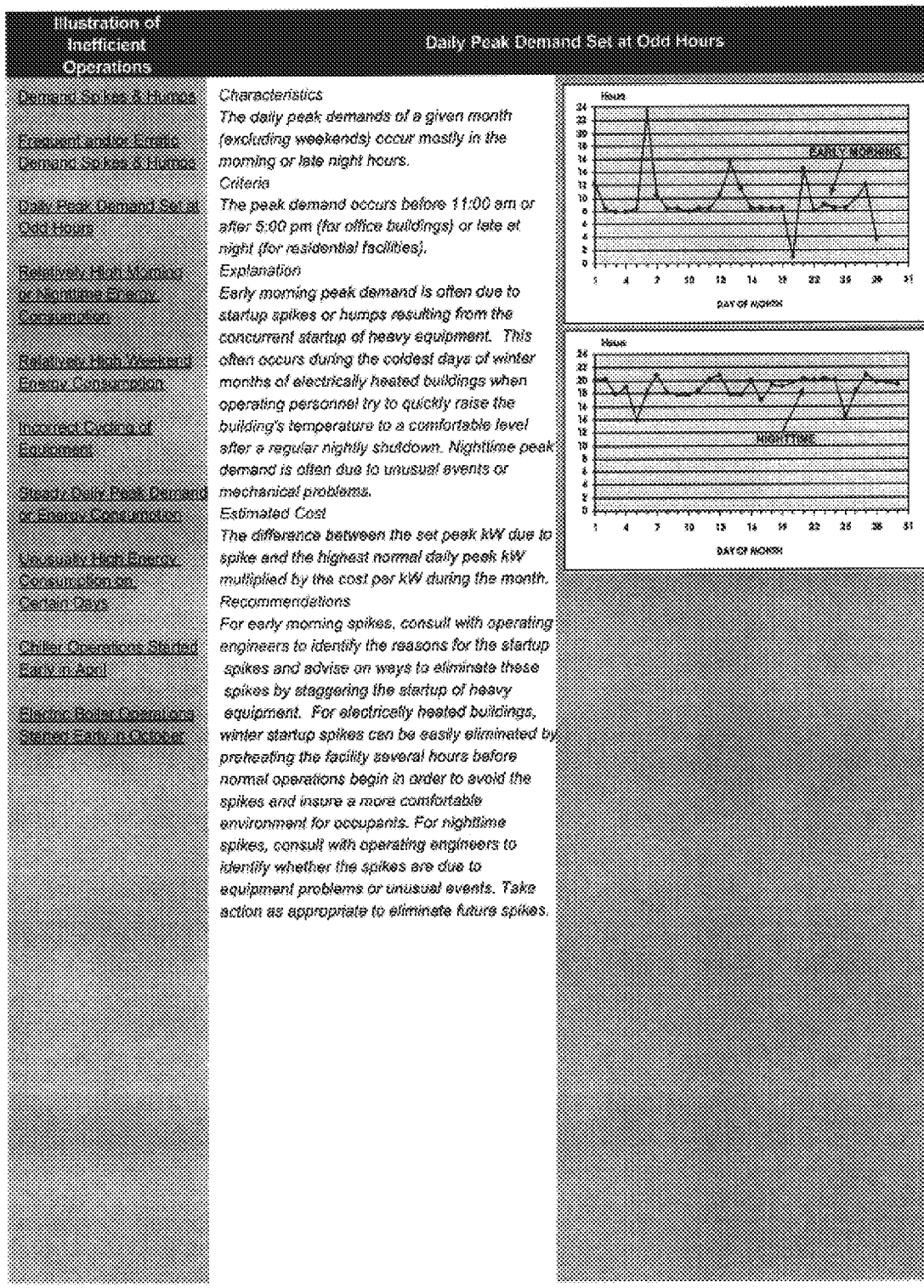
FIG. 20 is an illustration of a chart disclosing inefficient daily peak demand set at odd hours.

FIG. 20: Daily Peak Demand Set at Odd Hours.

Figure 21:
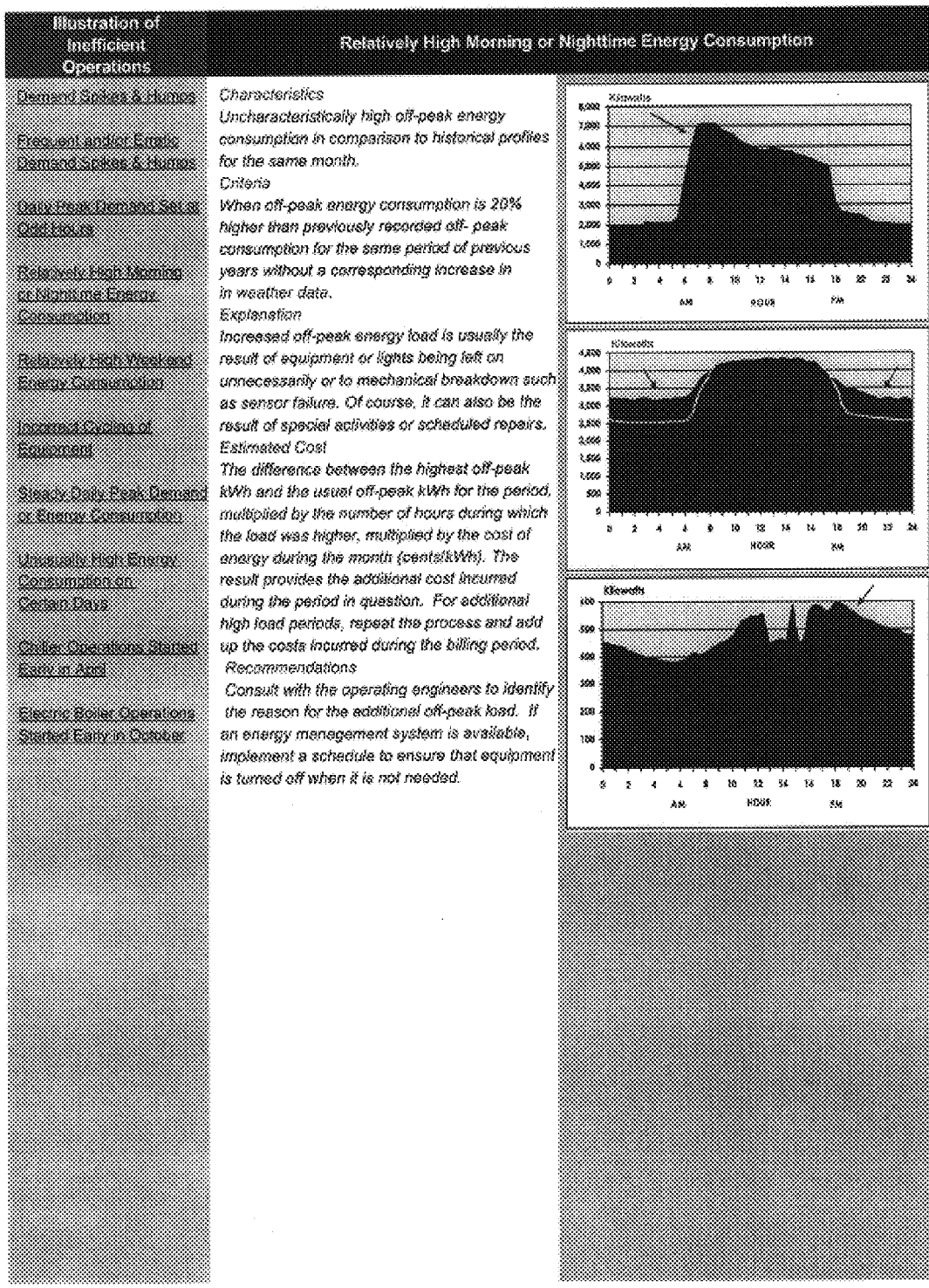
FIG. 21 is an illustration of a chart disclosing inefficient relatively high morning or nighttime energy consumption.

FIG. 21: Relatively High Morning or Nighttime Energy Consumption.

Figure 22:
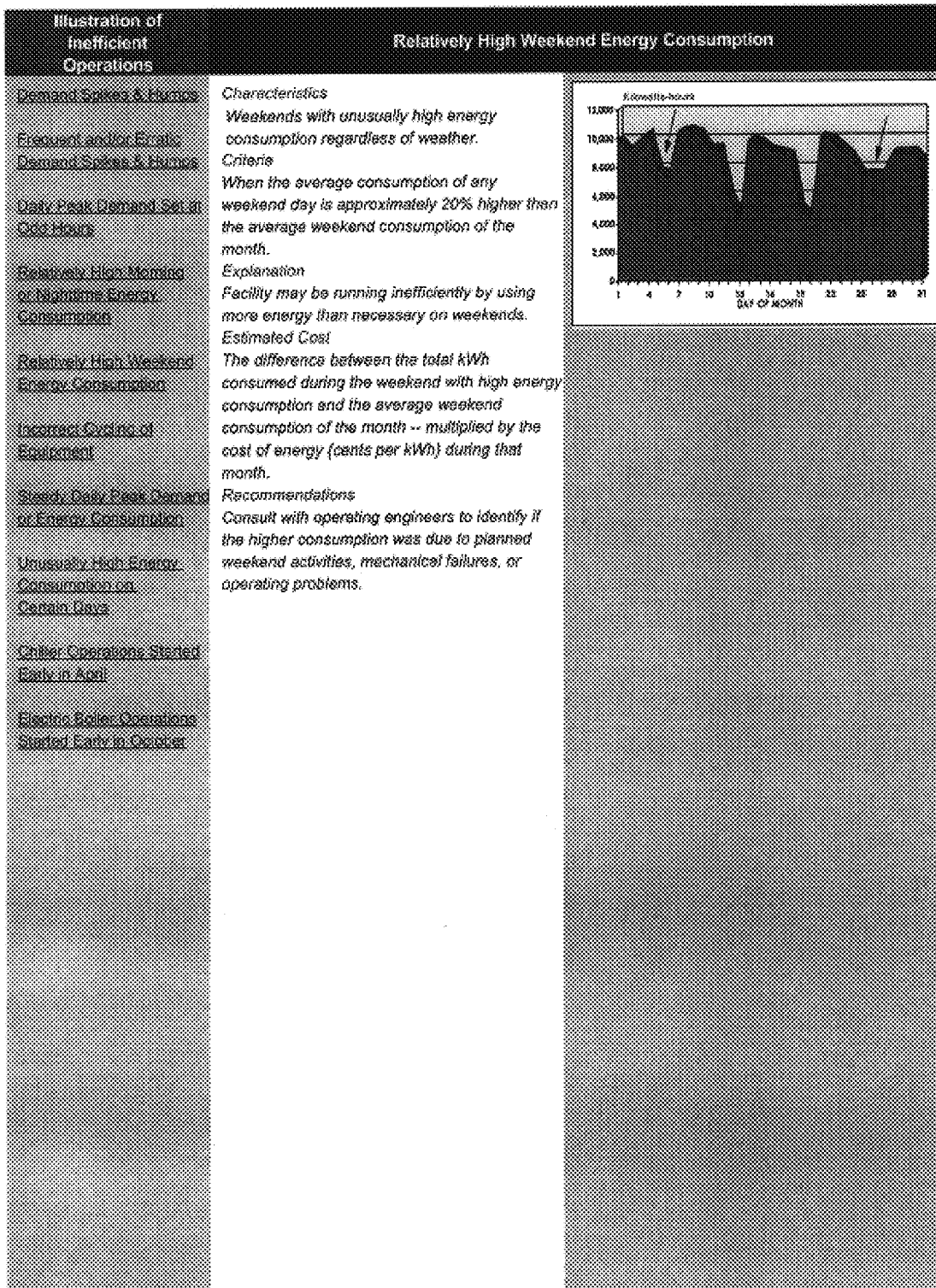
FIG. 22 is an illustration of a chart disclosing inefficient relatively high weekend energy consumption.

FIG. 22: Relatively High Weekend Energy Consumption.

Figure 23:
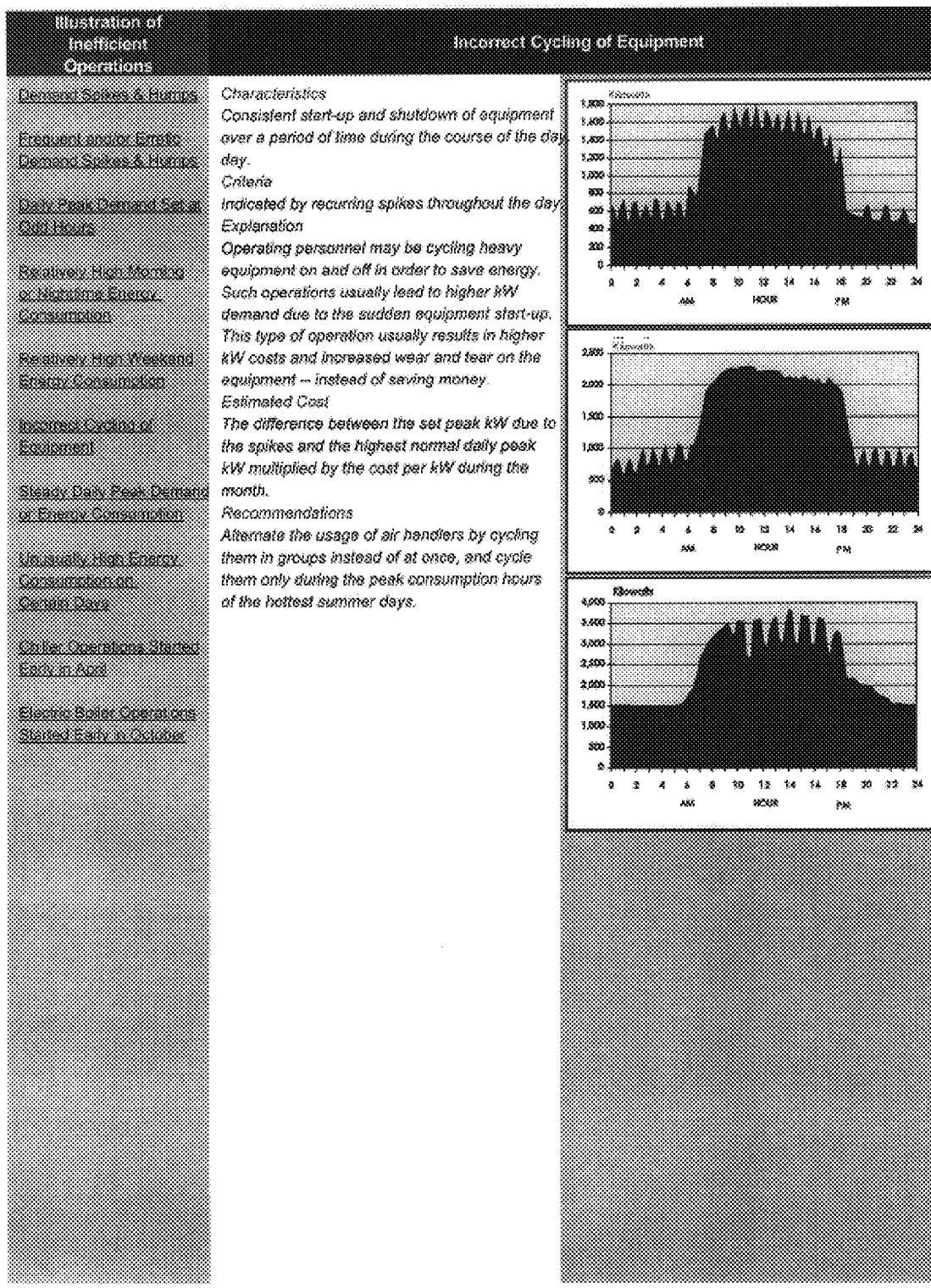
FIG. 23 is an illustration of a chart disclosing inefficient, incorrect cycling of equipment.

FIG. 23 Incorrect Cycling of Equipment.

Figure 24:
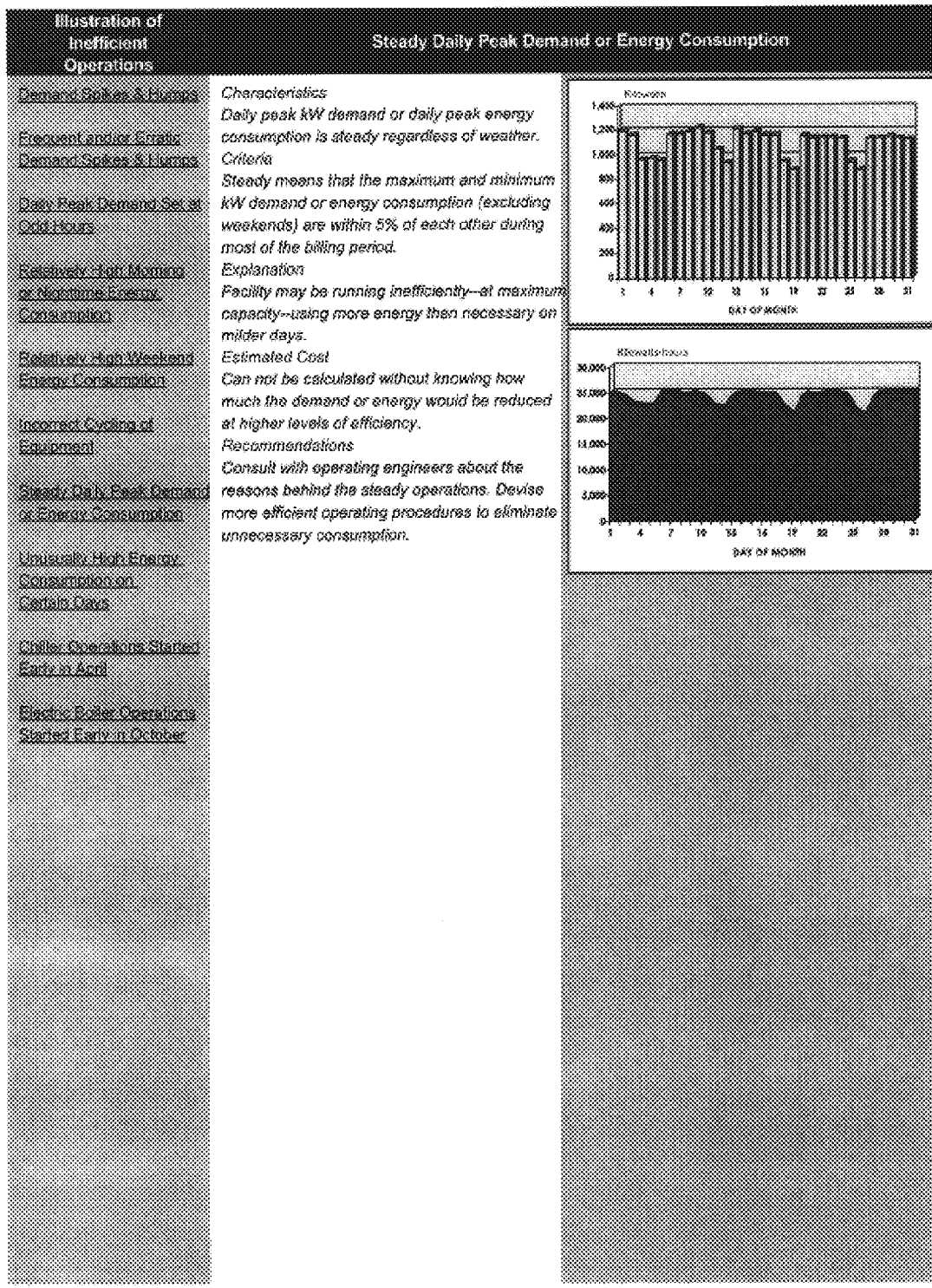
FIG. 24 is an illustration of a chart disclosing inefficient steady daily peak demand or energy consumption.

FIG. 24: Steady Daily Peak Demand or Energy Consumption.

FIG. 25: Unusually High Energy Consumption or Certain Days

Figure 26:
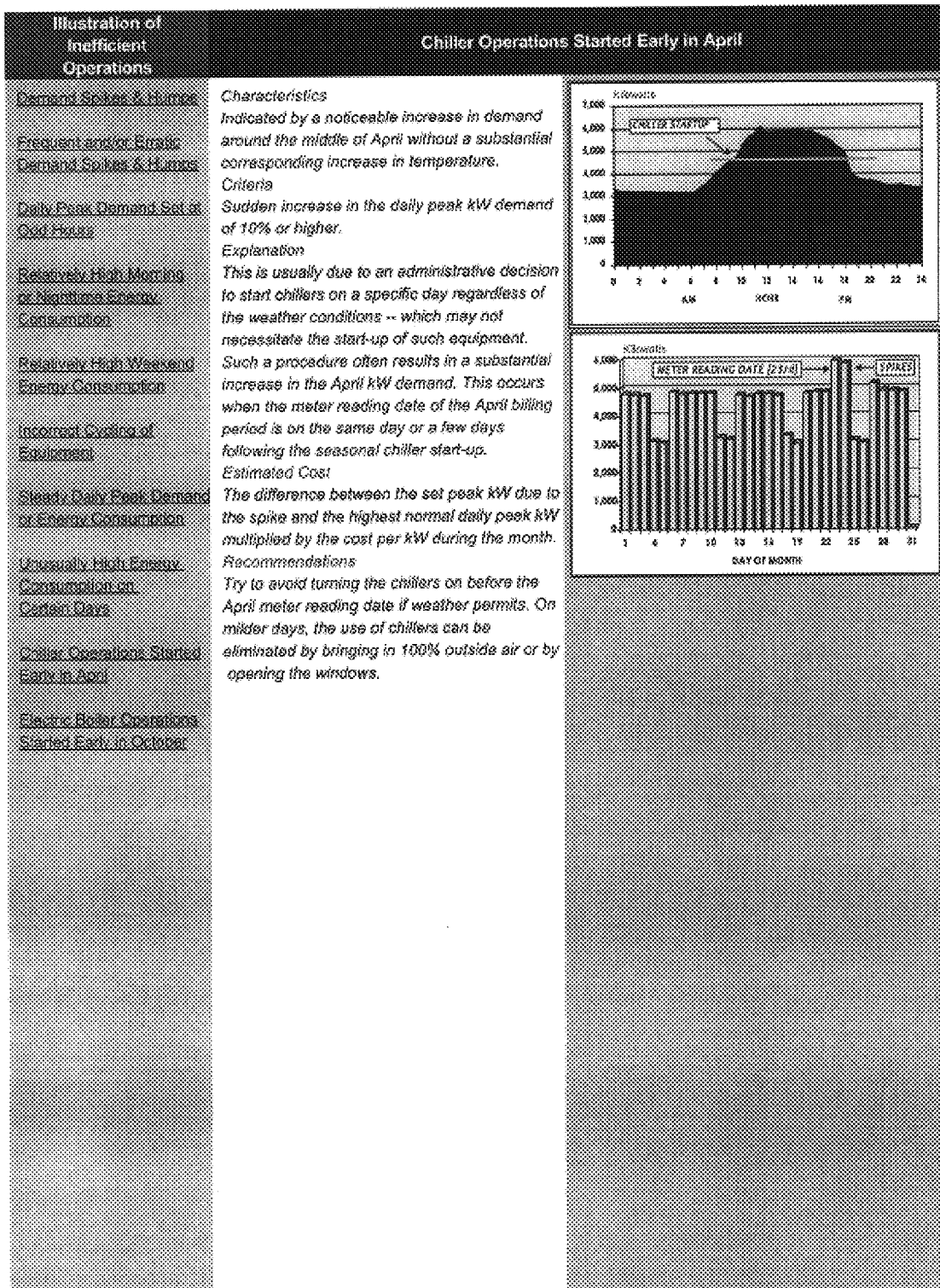
FIG. 26 is an illustration of a chart disclosing inefficient chiller operations started early in April.

FIG. 26: Chiller Operations Started Early in April.

Figure 27:
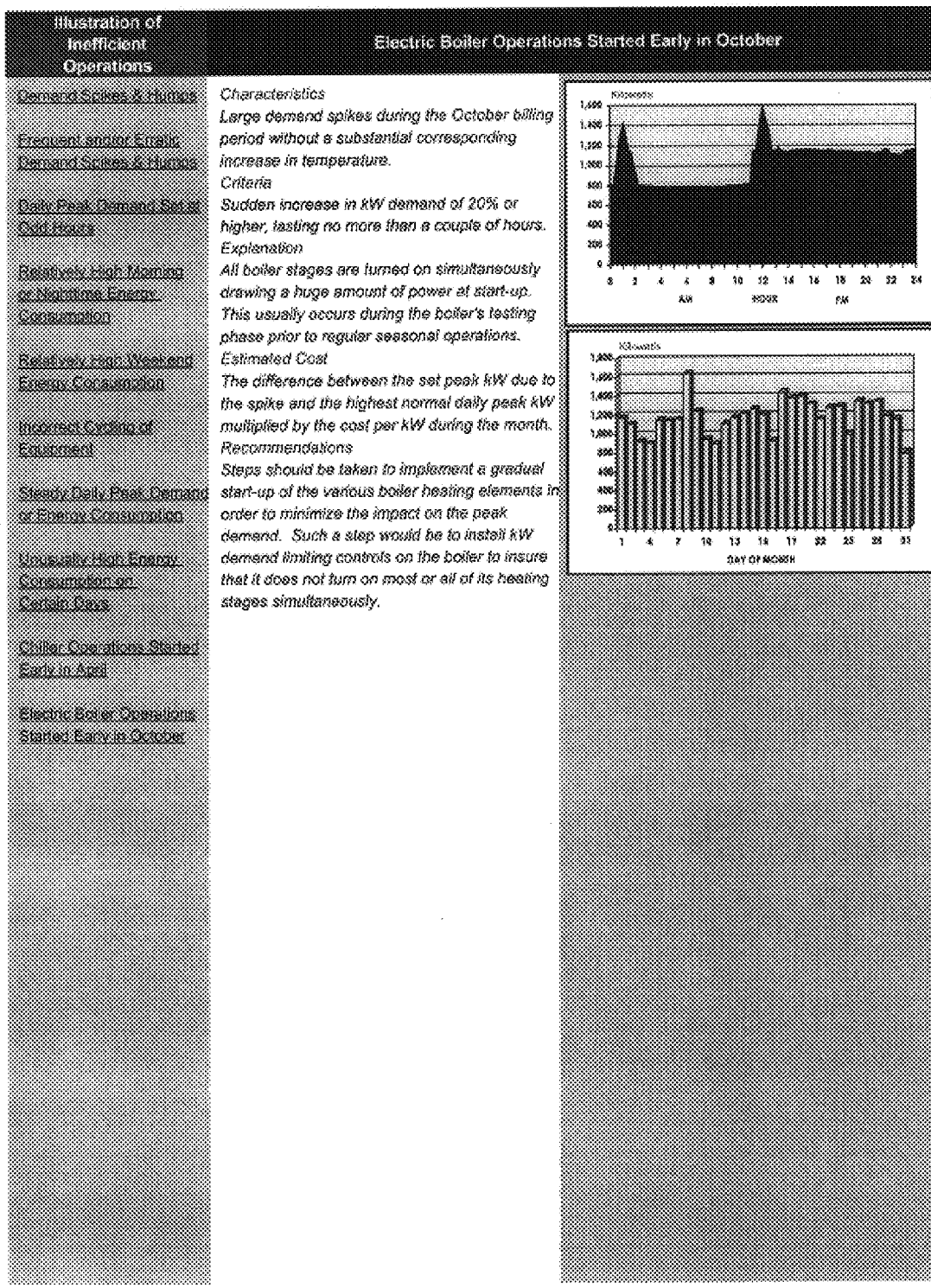
FIG. 27 is an illustration of a chart disclosing inefficient electric boiler operations started early in October.

FIG. 27: Electric Boiler Operations Started Early in October.

Information Delivery Capability

The disclosed System is also capable of recording for later call up and review the summaries of monthly findings of the System. This capability provides for instant access to current and historical information through the Utilities Decision Support System under the heading "Remarks & Comments." An example of one such summary for a given facility is illustrated in FIGS. 28A and 28B wherein month by month comments, covering a period from December 1996 through November 1998 have been summarized for later call up and review. Reports are prepared each month and are provided on replacement CD ROM disks that contain all current and archival data for review by the user/facilities manager. An important feature of this invention is its capability to provide on-going monthly reports that allow the user to review not only current data but also historic data as well. This approach also allows projections of future expenses to be continually updated on a month to month basis to take into account rate changes as discussed with reference to Feature 10 discussed above.

Figure 29:
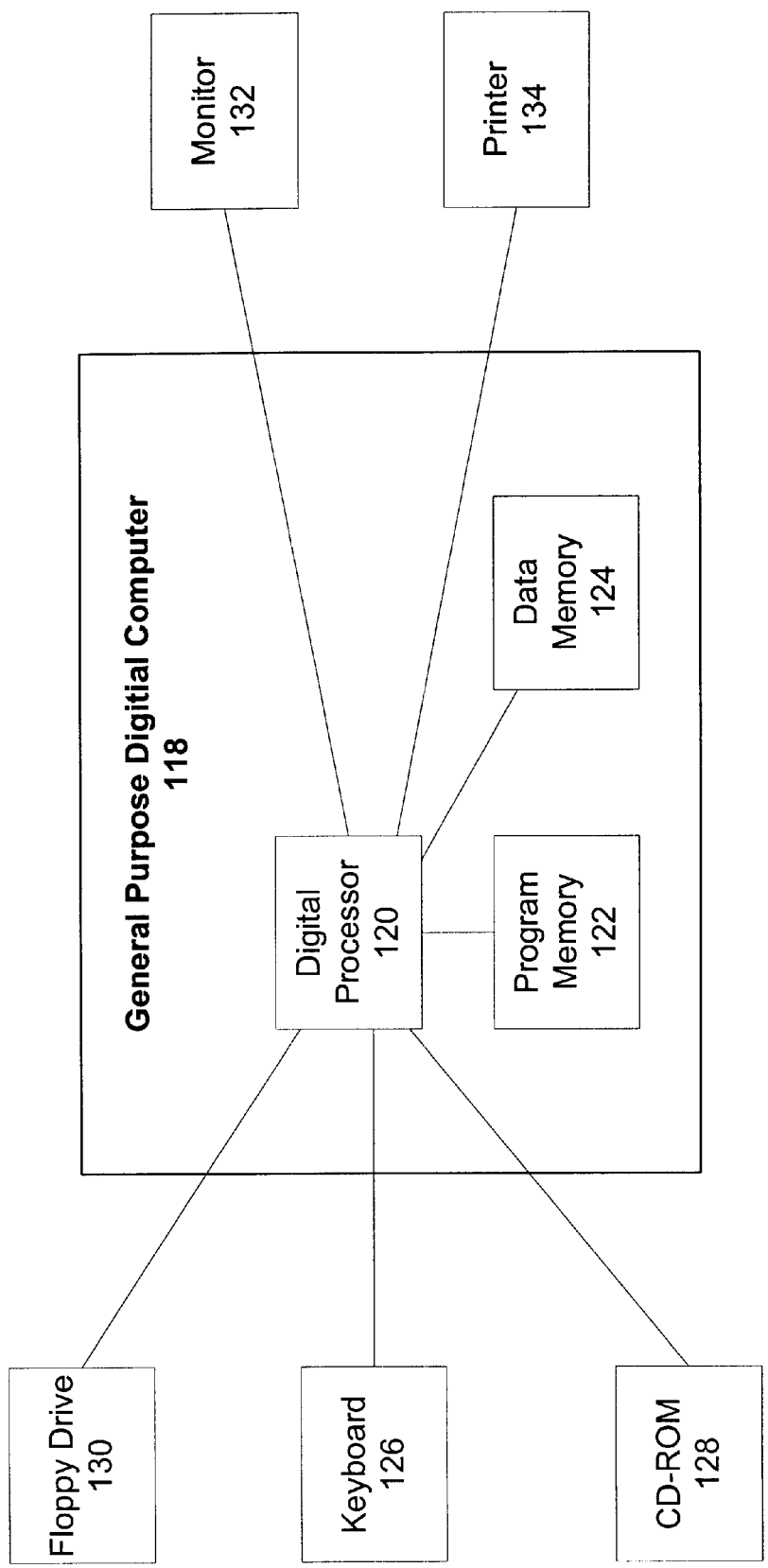
FIG. 29 is a schematic diagram of a computer system used to implement the method and system of the subject invention.

Any number of instrumentalities could be employed to implement the Utilities Decision Support System of this invention. One advantageous approach is to use a general purpose digital computer 118 as illustrated in FIG. 29. Such computers are characterized by a digital processor 120 which operates to execute the sequential commands of various programs stored in the computer's program memory 122. A hard drive memory 124 normally provided to allow data to be stored in files and retrieved or modified as required to operate the program for its intended purpose. Data may be transferred into the computer from a keyboard 126, CD ROM 128, floppy drive 130 or other type of input device. Data in the form of graphs, charts, numerical listings, text etc. that is stored within the computer memory and/or results from manipulation of the data can be displayed on a computer monitor 132 or fed to a printer 134 for creation of hard copy images. For example, such computers normally have a standard operating program, such as WINDOWS 95 or UNIX, and special applications programs, such as for example, spreadsheet programs, such as EXCEL. For implementing the subject system in a general purpose digital computer, a program has been written in VISUAL BASIC programming language for applications. Appendix A includes source code for this program which is also contained on the compact disk entitled: Utilities Guru Decision Support System Source Code (the entire content of which is hereby incorporated by reference) which contains the following files:

| | | |
|---|---|---|
| Comparative Numeric Analysis | 501 KB | October 10, 2001 |
| Cost Projections | 265 KB | October 10, 2001 |
| Executive Summaries | 203 KB | October 10, 2001 |
| Five Year Graph | 523 KB | October 10, 2001 |
| Gas Operations | 301 KB | October 10, 2001 |
| Leading Utilities Indicators | 378 KB | October 10, 2001 |
| OE - Large Electric | 1,654 KB | October 10, 2001 |
| OE - Medium Electric | 613 KB | October 10, 2001 |
| OE - Small Electric | 300 KB | October 10, 2001 |
| Oil Operations | 293 KB | October 10, 2001 |
| Pull-Down Guru | 2,822 KB | October 10, 2001 |
| References | 166 KB | October 10, 2001 |
| Steam Operations | 297 KB | October 10, 2001 |
| Summary of Findings | 214 KB | October 10, 2001 |
| Water Operations | 294 KB | October 10, 2001 |
| Weather Report | 476 KB | October 10, 2001 |

The program of Appendix A will operate in a general purpose digital computer which is running the WINDOWS 95 operating program or upgrade with a minimum of 16 KB RAM and a CD ROM drive.

Among the more important advantages and features of the subject invention are the following:

Feature 1: Day-To-Day Analysis Of Operations

The disclosed System provides graphs and tables of the daily peak electric demand, consumption, and time of peak demand as well as the 30-minute by 30-minute energy profile of the day of highest peak demand during the month—over a 36 month period. The purpose of this feature is to help identify possible operating problems, equipment problems and billing errors; indicate when they occurred—and how much they cost.

By comparing the profiles described above to the daily weather profile (Feature 3—Three Years Of Day-To-Day Weather Report) and to documented inefficient operations (Feature 2—Special Techniques For Identification Of Inefficient Operations) as well as to the actual billing graphs and records, one can identify possible operating problems, equipment problems, and billing errors, determine their type, and pinpoint the date and time they occurred. To determine the cost of these errors, an operator may have to use the "What if" feature of the System (Feature 4—Cost Determination Of Specific Problems Using "What If" Procedure).

Feature 2: Special Techniques For Identification Of Inefficient Operations

Another important feature of the System is to provide detailed illustrations of 10 types of costly operating errors and equipment problems that can occur during the course of operating large, centrally controlled, facilities. See FIGS. 18 through 27. The illustrations include a description of the characteristics of the represented errors and the exact criteria that identifies them as such. In addition, detailed explanations of the nature of the described errors and problems is provided along with instructions on how to estimate their costs, as well as recommendations on how to eliminate them from happening in the future. The purpose of this feature is to help determine the nature of operating errors and equipment problems and to provide recommendations on how to estimate their costs and how to eliminate them from happening in the future. When used with the daily and hourly energy profiles (Feature 1—Day-To-Day Visual Analysis Of Operations) and the "What If" feature of the Utilities Guru (Feature 4—Cost Determination Of "Specific Problems Using "What If" Procedure) provides the nature of irregular operations as well as helps determine their additional costs.

Feature 3: Three Years Of Day-To-Day Weather Report

The System also provides graphs and tables of the daily heating and cooling degree hours for the current and two most recent calendar years. By comparing the daily weather information and graphs to the daily and hourly energy profiles (Feature 1—Day-to-Day Visual Analysis Of Operations) one can determine the effect of weather on operations on a particular day—or its lack thereof.

Feature 4: Cost Determination Of Specific Problems Using "What If" Procedure

FIG. 14 discloses a chart that allows hypothetical scenarios to be analyzed. This feature allows the user to determine the exact cost of inefficient operational practices, equipment problems, and billing errors. One example of a use of this section would be to determine the cost of a demand spike on a monthly bill. This is accomplished by comparing the peak electric demand of the day with the electric demand spile to the day with the second highest peak demand during the billing period—that does not have a spike. "The second highest peak demand is then entered in the "Input" section as the "Maximum kW" for that month, and the number shown in the "Change" section for that month represents the cost of the spike.

Feature 5: Quantification Of Savings & Costs Due To Changes In Usage Or Rates

This feature also derives from the use of the System function illustrated in FIG. 14. Its purpose is to help evaluate the cost/benefit of energy management scenarios and alternative electric rates. By formulating and saving various energy use and rate scenarios and examining their effects on electric costs, one can determine the exact cost effects of existing and proposed energy management projects as well as alternative electric rates.

Feature 6: Cost Breakdown Of Monthly Electric Bills By Billing Component

The System operates to breakdown the monthly billing components and their corresponding costs for a 36-month period. The purpose of this feature is to analyze the mathematical accuracy of electric bills and to illustrate the relationship between the components of electric consumption and their corresponding costs.

Feature 7: Monthly Breakdown Of The Changes In Electricity Cost Components

Still another feature of the subject System is to provide monthly and year-to-date percent changes in electric demand, electricity consumption, average price of electricity, number of billing days, and total cost of electricity from the current fiscal year to the prior fiscal year—as well from the prior fiscal year to the year before. The term monthly refers to the billing frequency occurring monthly but does not require that the billing period start and end on the first and last day of each calendar month. Where percentages have decreased by 10% or more, the numbers will appear in blue; where percentages have increased by 10% or more, the numbers will appear in red.

The percent changes are determined as follows:

Maximum kW Demand: All cost factors in the current bill are calculated using the current billing rates—with the exception of the current Maximum kW Demand—which is substituted by the Maximum kW Demand of the corresponding billing period of the last fiscal year: The percent change in cost from the actual bill determines the percent variation in cost due to the change in Maximum kW Demand.

Average kWh Consumption per Day: All cost factors in the current bill are calculated using the current billing rates—with the exception of the current kWh consumption—which is substituted by the normalized kWh consumption of the corresponding billing period of the last fiscal year. The percent change in cost from the actual bill determines the percent variation in cost due to changes in kWh per day. Normalized kWh consumption is derived by taking the billed kWh consumption of the corresponding billing period of the last fiscal year and dividing it by the number of days in that billing period. The result is then multiplied by the number of days in the current billing period to arrive at the Normalized kWh consumption for the current month.

Average Price of Electricity in Cents/kWh: The monthly Cents/kWh figure is derived by dividing the month's electricity cost by the month's kWh consumption—multiplied by 100. The percent change in the average price of electricity in Cents/kWh is then derived by taking the current month's Cents/kWh and dividing it by the Cents/kWh of the corresponding period of the last fiscal year. The result is then subtracted by 1 to get the percentage change.

Number of Billing Days in the Billing Period: The percent change in the number of days in the billing period is derived by taking the current month's number of billing days and dividing it by the number of billing days of the corresponding period of the last fiscal year. The result is then subtracted by 1 to get the percentage change.

Total Cost of Electricity: The percent change in the total cost of electricity is derived by taking the current month's total cost of electricity and dividing it by the total cost of electricity of the corresponding period of the last fiscal year. The result is then subtracted by 1 to get the percentage change.

Year-To-Date Average kWh Consumption per Day: The Year-To-Date average kWh consumption figure is derived by dividing the year-to-date kWh consumption by the year-to-date number of billing days. The percent change in the year-to-date average kWh consumption per day is then derived by taking the current year-to-date average kWh consumption per day and dividing it by the year-to-date average kWh consumption per day of the corresponding period of the last fiscal year. The result is then subtracted by 1 to get the percent change.

Year-to-Date Average Price of Electricity in Cents/kWh: The year-to-date cents/kWh figure is derived by dividing the year-to-date electricity cost by the year-to-date kWh consumption—multiplied by 100. The percent change in the year-to-date average price of electricity in cents/kWh is then derived by taking the year-to-date cents/kWh and dividing it by the year-to-date cents/kWh of the corresponding period of eh last fiscal year. The result is then subtracted by 1 to et the percentage change.

Year-To-Date Number of Billing Days in the Billing Period: The percent change in the year-to-date number of billing days is derived by taking the year-to-date number of billing days and dividing it by the year-to-date number of billing days of he corresponding period of the last fiscal year. The result is then subtracted by 1to get the percentage change.

Year-To-Date Total Electricity Cost: The percent change in the year-to-date total electricity cost is derived by taking the year-to-date total cost of electricity and dividing it by the year-to-date total cost of electricity of the corresponding period of the last fiscal year. The result is then subtracted by 1 to get the percentage change.

The purpose of this feature is to illustrate the relationship between changes in the monthly and year-to-date electricity use, price, and billing days, to the monthly and year-to-date changes in electricity costs. By analyzing the percent changes on can determine the factors that most influenced the change in electricity cost at any given month.

Feature 8: Savings And Cost Estimates From The Variations In Electricity Demand & Consumption The System further provides month-to-month and year-to-date savings and costs associated solely with decreased and increased peak demand and electricity consumption from the current year to the prior year—as well as from the prior year to the year before.

Net savings/cost est. from decreases or increases in kW demand: All cost factors in the current bill are calculated using the current billing rates—with the exception of the current Maximum kW Demand—which is substituted by the Maximum kW Demand of the corresponding billing period of the prior fiscal year. The change in cost from the actual bill determines the difference in cost due to the change in the Maximum kW Demand.

Net savings/cost est. from decreases or increases in kwh energy: All cost factors in the current bill are calculated using the current billing rates—with the exception of the current kWh consumption of the corresponding billing period of the prior fiscal year. The change in cost from the actual bill determines the difference in cost due to the change in kWh Consumption. Normalized kWh consumption is derived by taking the billed kWh consumption of the corresponding billing period of the prior fiscal year and dividing it by the number of days during that billing period. The result is then multiplied by the number of days in the current billing period to arrive at the Normalized kWh consumption for the current month.

The purpose of this feature is to gauge the performance of current plant operations and to help predict the expected cost effect of future energy projects. By analyzing the actual differences in cost due to changes in either energy or demand, one can determine the actual benefits or costs from changes in energy consumption or demand at any given month.

Feature 9: Monthly Cost Distribution By Energy Consumption And Peak Demand

The System provides percent contribution of the monthly electric consumption and peak demand factors to the total monthly electric costs—for the current and prior fiscal years. Monthly billing components are categorized as either energy consumption related or electric demand related. The sum of the cost components in each category is then divided by the total bill to determine its percent contribution on cost. The purpose is to illustrate where electric costs are incurred and optimum savings can be achieved. By analyzing the percent contributions one can determine which factor most influences the change in electricity cost from month to month.

Feature 10: Electricity Cost Projections With Automatic Adjustment For Rate Changes This section projects the monthly electricity costs of large and medium facilities for the remainder of the fiscal year. The projections are based on the average electricity consumption registered during the same month of the two prior years, billed on the currently applicable utility rates, using the prior year's variable energy factors such as the monthly "fuel cost adjustment" and the monthly "environmental surcharge".

For each month, the "Projected Balance" adds the difference between the actual billed amounts from the beginning of the fiscal year until present and the actual billed amounts for the same periods of the previous fiscal year to the monthly projected differences in cost for the remainder of the fiscal year.

The purpose of this feature is to provide realistic estimates for utilities planning and budgeting on an on-going basis. By comparing projected costs with available funds one can better plan for future financial needs.

Feature 11: Built-In Month-To-Month Rate & Component Information Over a 3-Year Period This section provides the breakdown of the applied electric rate and energy cost factors associated with this account. The provided information covers a three-year period and includes the percentage change in rates between the current fiscal year and the prior fiscal year.

The purpose of this feature is to enable the user to better understand the applied pricing structure and its effects on the monthly electricity costs. By evaluating the various rate components one can determine how the rates have changed over the past three years and how they compare to alternative electric rate schedules in the era of deregulation.

Feature 12: Built In Reports Documenting Results Of Analyses

This section provides an on-going summary of the areas that require special attention. Identified are billing errors, operating errors, missing bills or pulses, as well as any changed made to the account. The purpose is to provide management with constant awareness of past and current problems for prompt consideration and resolution. By turning the information provided in the various parts of the system into knowledge this feature spares the user the time and expertise needed to analyze the information in-house.

Feature 13: "User's Guide"—With Hot Links To Specific Sections Within Each Module The System lists the module's sections along with descriptions of their features and benefits. Each listing in the "section" column contains direct links to the corresponding section of the module. The purpose is to acquaint the user with the features and benefits of the system—with minimum time and effort. By reviewing the information in this section the user can quickly become familiar with the module's capabilities and benefits without the need for special training.

Feature 14: Icon-Based "Help" Screen On Each Page—With Description & Purpose

The System provides a "Guru" icon on every screen/page that provides for instant, context sensitive, help. The purpose is to provide for immediate explanation of the provided information in a particular section. By clicking on the "Guru" icon, the user can get instant clarification and description of the information provided on a particular screen—thereby eliminating the need for additional training.

Feature 15: Ranking Reports With Built-In Warning—By Cost Center

The System operates to provide tables of the monthly and year-do-date consumption, cost, and price data of each account included in the system in comparison to the other accounts in the system—for the most recent three-year period—by type of utility and by cost center. Where percentages have decreased by 10% or more, the numbers will appear in blue; where percentages have in creased by 10% or more, the numbers will appear in red.

The purpose is to identify energy consumption and cost trends by cost center, help establish an energy base line—or evaluate consumption with an existing base line—as well as to visually pinpoint extreme consumption and cost patters in color. By examining these comparisons one can quickly problem accounts and determine the magnitude of their problems.

Feature 16: Twelve-Month Summary Of Leading Indicators

In this section the System provides a general monthly overview of cost and consumption for all the electric, gas, and/or oil accounts, as well as provides the monthly differences between the current year's data and the prior year's data. The purpose is to provide an overall snapshot of energy consumption and cost trends for combined accounts in electricity, gas, and oil. By reviewing the information on this page, managers can quickly determine the overall performance of each utility cost center and how it measures up to existing budget allocations.

Feature 17: Ability To Add Custom Designated Modules To Main Pull-Down Menu

The System has the ability to add custom designated modules to the Utilities Guru pull-down menu. The purpose is to provide quick and simple access to the desired information. With one click of the mouse, a user can access any Utilities Guru file or module—no matter how many accounts are included in the system.

Feature 18: Modularity—A System Of Individual Programs

The System is formed of independent files can be accessed individually from a simple pull down menu. The purpose is to allow the user to communicate specific information electronically to others through e-mail or other means—quickly and easily—without the need for vast storage and extensive processing capabilities. By being able to communicate only the pertinent information to other users, the Utilities Guru system allows for quick and efficient dissemination of the information.

The above represents the full and complete documentation of the invention. However, it does not fully describe the capabilities of the Utilities Decision Support System (the software component of the system) which are much greater than what was described above and include the documentation and analysis of gas, oil, steam, coal, and water systems of various sizes. The necessary modification to the program to accommodate application of the system would be apparent. Other applications, changes and variations of the system and method of the subject invention are possible and are fully within the scope of the subject invention.

I claim:

1. A computer implemented method for visually analyzing current and historic patterns of energy consumption in a facility to which energy is supplied by one or more utilities which bill for the energy supplied over consecutive billing periods at rates which may vary during some billing periods to determine the presence of possible operating errors, equipment problems, or hard-to-detect billing errors, comprising a. storing in computer memory data representing critical characteristics of the facility as necessary to allow for evaluation of energy consumption by the facility;

b. storing in computer memory data representing energy consumption by the facility throughout a billing period and the associated costs for such energy consumption;

c. repeating step (b) for subsequent billing periods to create historic and current stored data regarding the consumption of energy by the facility and the associated costs for such energy consumption;

d. processing the stored data, in a computer, to create single period graphs which illustrate and tabulate energy consumption for each billing period and to create multi-period graphs which illustrate and tabulate energy consumption during multiple extended periods formed of consecutive billing periods to allow visual comparison of energy consumption during one billing period with energy consumption during another billing period and to allow visual comparison of energy consumption during one extended period with the energy consumption during a second extended period; and e. creating documented patterns representing unusual circumstances which could represent inefficient operation of the facility, for which solutions are known based on analysis of energy consumption by several large facilities over long periods, to allow identification of the nature of similarly inefficient facility operation as shown in the graphs produced by step (d) and to allow identification of possible solutions.

2. The method of claim 1 for analyzing energy consumption by a facility supplied by a utility whose billing rates include peak billing rates for energy consumption above a predetermined amount, wherein step (a) includes the step of storing in computer memory data representing billing rates and peak billing rates and step (b) includes the step of storing in computer memory data representing peak levels of energy consumption during individual billing periods.

3. The method of claim 1, wherein the energy supplied to the facility is electrical energy and further wherein step (b) includes storing data representing 30 minute by 30 minute electrical energy consumption and peak electrical demand.

4. The method of claim 1, wherein the energy supplied to the facility is electrical energy and further wherein step (b) includes storing data representing 15 minute by 15 minute electrical energy consumption and peak electrical demand data.

5. The method of claim 1, further including the step of storing in computer memory weather data relating to the weather conditions prevailing immediately outside the facility during billing periods for which data is stored, and wherein step (d) includes the step of including the weather data in at least some of the created graphs.

6. The method of claim 1, wherein step (e) further includes the step of creating documented patterns representing (1) excess demand spikes and humps and/or (2) frequent and/or erratic demand spikes and humps.

7. The method of claim 6, wherein step (e) further includes the step of creating documented patterns representing daily peak demand set at odd hours.

8. The method of claim 7, wherein step (e) further includes the step of creating documented patterns representing relatively high morning or nighttime energy consumption or relatively high weekend energy consumption.

9. The method of claim 7, wherein step (e) further includes the step of creating documented patterns representing incorrect cycling of equipment, steady daily peak demand or energy consumption, unusually high energy consumption on certain days, chiller operations started early in April, or electric boiler operations started early in October may be detected via this important feature of the disclosed invention.

10. The method of claim 1 for analyzing energy consumption by a facility supplied by a utility whose billing rates include peak billing rates for energy consumption above a predetermined amount, the energy supplied to the facility is electrical energy and the billing period is a monthly, wherein i. step (a) includes the step of storing data representing peak billing rates, and ii. step (b) includes storing data representing electrical consumption and peak electrical demand for successive time periods of less than an hour.

11. The method of claim 10, wherein step (b) includes storing data representing 30 minute by 30 minute electrical energy consumption and peak electrical demand data.

12. The method of claim 10, wherein step (b) includes storing data representing 15 minute by 15 minute electrical energy consumption and peak electrical demand data.

13. The method of claim 10, further including the step of storing in computer memory weather data relating to the weather conditions prevailing immediately outside the facility during billing periods for which data is stored, and wherein step (d) includes the step of including the weather data in at least some of the created graphs.

14. The method of claim 13, further including the steps of replacing the stored data representing an unusual pattern of energy use or consumption by data representing a normalized pattern of energy use or consumption;
   i. reprocessing the stored data to calculate the effect on the cost under the normalized pattern of energy use or consumption; and
   ii. creating a chart which records the differential in cost of the unusual pattern of energy use or consumption over the normalized pattern of energy use or consumption.

15. The method of claim 14, further including the step of storing in retrievable form within computer memory the result of the comparisons pursuant to step (d) and step (e) after the close of each billing period and repeating this step after the close of each billing period to create accessible current and historical data, information and analysis about the energy consumption of the facility.

16. The method of claim 15, wherein step (iii) includes the step of comparing visually the graphs formed in step (d) on an hourly, daily, monthly and year-to-date basis to allow detection of possible operating errors, equipment problems and billing errors.

17. The method of claim 1, further including the steps of
   i. replacing the stored data representing an unusual pattern of energy use or consumption by data representing a normalized pattern of energy use or consumption;
   ii. reprocessing the stored data to calculate the effect on the cost under the normalized pattern of energy use or consumption; and
   iii. creating a chart which records the differential in cost of the unusual pattern of energy use or consumption over the normalized pattern of energy use or consumption.

18. The method of claim 17, further including the step of storing in retrievable form within computer memory the result of the comparisons pursuant to step (d), step (e) and step (iii) after the close of each billing period and repeating this step after the close of each billing period to create accessible current and historical data, information and analysis about the energy consumption of the facility.

19. The method of claim 17, wherein step (iii) includes the step of generating a modifiable spreadsheet chart using a computer divided into four sections including (1) an input section which represents the billing data from which costs are derived and operating to enable a user to alter the data included in an input section based on desired or projected changes in electric consumption or demand, (2) an output section in which are recorded the results of calculations of the new electric costs based on the changes entered in the input section, (3) a change section in which are recorded the differences in costs to indicate corresponding savings or costs, and (4) a rate table to allow the user to modify individual rate components and examine the corresponding changes in cost with regard to the specified energy data, whereby a user is able to formulate various energy use and rate change scenarios and examine their effects on electric costs.

20. The method of claim 17, further including the steps of
   i. creating a projection of future costs per billing period based on the average consumption for selected prior billing periods, and
   ii. calculating the projected costs for future billing periods using the current billing rates.

21. The method of claim 20, wherein the billing period is monthly and consumption data is stored for at least the last two prior fiscal years, wherein the step of creating a projection of the cost of energy consumption during a future monthly billing period includes the step of determining the projected energy consumption for a future monthly billing period by calculating the average consumption of energy during the same month of each of at least the last two fiscal years and using such average consumption and the current billing rates to determine the cost projection for the future monthly billing period.

22. The method of claim 21, further including the step of determining the cost projection for each monthly billing period by repeating the projected costs calculation for each future monthly billing period remaining in the current fiscal year.

23. The method of claim 22, further including the step of determining a projected balance for each month by adding the difference between the actual billed amounts from the beginning of the fiscal year until the present and the actual billed amounts for the same periods of the previous fiscal year to the monthly projected differences in cost for the remainder of the fiscal year.

24. The method of claim 17, wherein the energy supplied to the facility is electrical energy and wherein the billing period is a month and wherein step (b) includes storing data representing electrical energy consumption and peak electrical demand for successive time periods of less than an hour, and wherein step (d) includes the step of comparing visually the graphs formed in step (d) on an hourly, daily, monthly and year to date basis to allow detection of possible operating errors, equipment problems and billing errors.

25. The method of claim 24, wherein step (d) includes the step of forming charts including selected graphs juxtaposed in side-by-side relationship wherein the side-by-side graphs display data pertinent to the same month of the year.

26. The method of claim 25, wherein one chart includes side-by-side graphs displaying data relating to daily electric peak demand.

27. The method of claim 25, wherein one chart includes side-by-side graphs displaying data relating to daily electric energy consumption.

28. The method of claim 25, wherein one chart includes side-by-side graphs displaying data relating to daily time of the peak day demand.

29. The method of claim 25, wherein one chart includes side-by-side graphs displaying data relating to billing peak day.

30. The method of claim 25, wherein one chart includes side-by-side graphs displaying data relating to daily heating and cooling degree hour.

31. A computerized apparatus for assisting in the analysis of current and historic patterns of energy consumption in a facility to which energy is supplied by one or more utilities which bill for the energy supplied over consecutive billing periods at rates which may vary during some billing periods to determine the presence of possible operating errors, equipment problems, or hard to detect billing errors, comprising
   a. a computer memory for storing data representing
      i. critical characteristics of the facility as necessary to allow for evaluation of energy consumption by the facility,
      ii. energy consumption by the facility throughout a billing period,
      iii. energy consumption by the facility for subsequent billing periods to create historic and current stored data regarding consumption of energy by the facility, and iv. normalized data representing normalized conditions as a replacement for stored data which could represent inefficient operation of the facility, for which solutions are known based on analysis of energy consumption by several large facilities over extended periods of multiple billing periods;

b. a computer processor for processing the data stored in said computer memory and for processing the normalized data and un-replaced stored data and to create a chart which illustrates and tabulates the effect on the cost under the normalized conditions as compared to the unusual circumstances;

c. a graph generator for generating graphs to create single period graphs which illustrate and tabulate energy consumption for each billing period and to create multi-period graphs which illustrate and tabulate energy consumption during multiple extended periods formed of consecutive billing periods to allow visual comparison of energy consumption during one billing period with energy consumption during another billing period and to allow visual comparison of energy consumption during one extended period with the energy consumption during a second extended period; and d. pattern forming means for creating documented patterns representing unusual circumstances, which could represent inefficient operation of the facility having known solutions based on analysis of energy consumption by several large facilities over extended periods of multiple billing periods, to allow identification of the nature of similarly inefficient operation of the facility shown in the graphs produced by said graph generator;

whereby the single period graphs and the multiple period graphs may be compared with the charts to identify possible operating errors, equipment problems or hard-to-detect billing errors and whereby the documented patterns may be visually compared with the graphs to identify possible solutions to low efficiency and excess costs caused by the unusual circumstances.

32. The apparatus of claim 31, wherein the energy supplied to the facility is electrical energy and wherein the billing period is monthly and wherein the data stored in said computer memory includes data representing electrical energy consumption and peak electrical demand for successive time periods of less than an hour, and wherein the data stored in said computer memory includes data representing the results of comparing visually the graphs formed by said graph generator relating to comparisons of hourly, daily, monthly and year to date periods of time to allow detection of possible operating errors, equipment problems and billing errors.

33. The apparatus of claim 31, wherein the data stored in said computer memory includes data representing the weather conditions prevailing immediately outside the facility during billing periods for which data is stored in said computer memory.

34. The apparatus of claim 33, wherein the data stored in said computer memory includes data representing the results of the analysis of energy consumption data for each billing period to create accessible current and historical data, information and analysis about the energy consumption of the facility.

35. The apparatus of claim 31, for analyzing energy consumption by a facility supplied by a utility whose billing rates include peak billing rates for energy consumption above a predetermined amount, wherein the data stored in said computer memory also includes data representing billing rates and peak billing rates and data representing peak levels of energy consumption during individual billing periods.

36. The apparatus of claim 35, wherein the energy supplied to the facility is electrical energy and the data stored in said computer memory includes data representing 30 minute by 30 minute electrical energy consumption and peak electrical demand.

37. The apparatus of claim 35, wherein the energy supplied to the facility is electrical energy and the data stored in said computer memory includes data representing 15 minute by 15 minute electrical energy consumption and peak electrical demand.

* * * * *